US007809550B1

(12) United States Patent
Barrows

(10) Patent No.: US 7,809,550 B1
(45) Date of Patent: Oct. 5, 2010

(54) SYSTEM FOR READING CHINESE CHARACTERS IN SECONDS

(76) Inventor: Joan Barry Barrows, 4510 Wakefield Chapel Rd., Annandale, VA (US) 22003

( * ) Notice: Subject to any disclaimer, the term of this patent is extended or adjusted under 35 U.S.C. 154(b) by 0 days.

(21) Appl. No.: 12/588,246

(22) Filed: Oct. 8, 2009

(51) Int. Cl.
 *G06F 17/20* (2006.01)
(52) U.S. Cl. .................................. 704/4; 704/9; 704/257
(58) Field of Classification Search ............... 704/2, 704/4, 9, 10, 251, 257, 276, 277; 715/262
See application file for complete search history.

(56) References Cited

U.S. PATENT DOCUMENTS 7,403,888 B1 * 7/2008 Wang et al. .................... 704/2
7,424,675 B2 * 9/2008 Lee et al. ..................... 715/262

* cited by examiner

*Primary Examiner*—Huyen X. Vo

(57) ABSTRACT

A method by which a user (who needs no knowledge of character configuration or Pinyin spelling) brings to an electronic device an unknown, user-chosen Chinese or other Oriental character/characters. The method is comprised of entering one or more easy-to-remember symbols (e.g., B, X, 4, 5, lantern, pointer, familiar to users of Western languages and found in all Chinese characters), and a character's stroke and optional stroke range number. The resulting output of character text is then available for use in other software programs, e.g., Microsoft Word. Also, output of a character's associated Pinyin spelling and translation precludes the need for further queries through other hard-copy or electronic translation devices. In addition, other system modes are used for: write-in's, browsing, inputting and retrieving of user-generated words, measure words, games, and dictionary. A single operation from first input to final output can be accomplished, on average, in less than one minute.

23 Claims, 54 Drawing Sheets

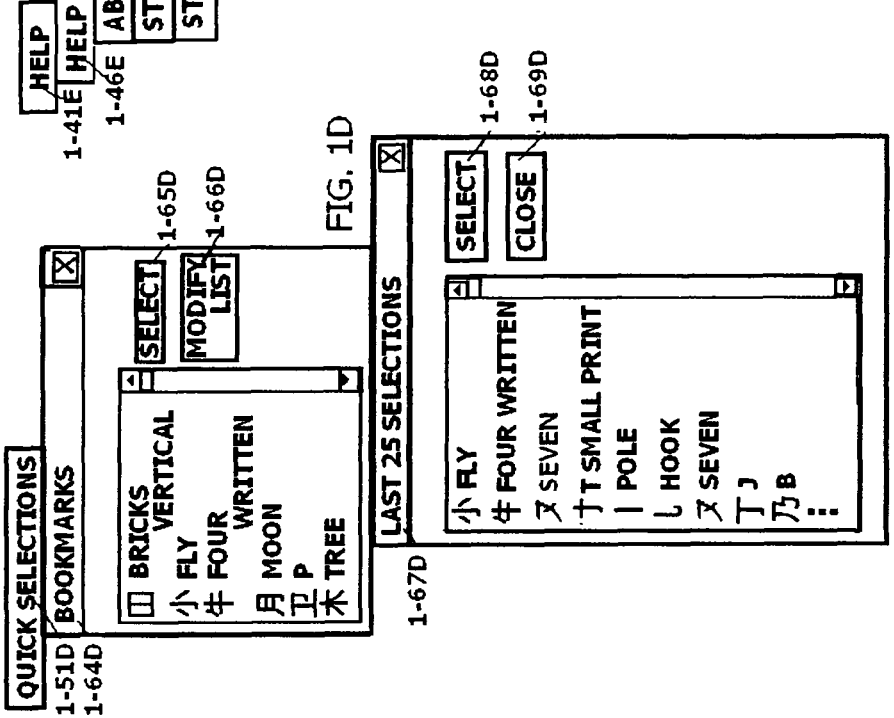
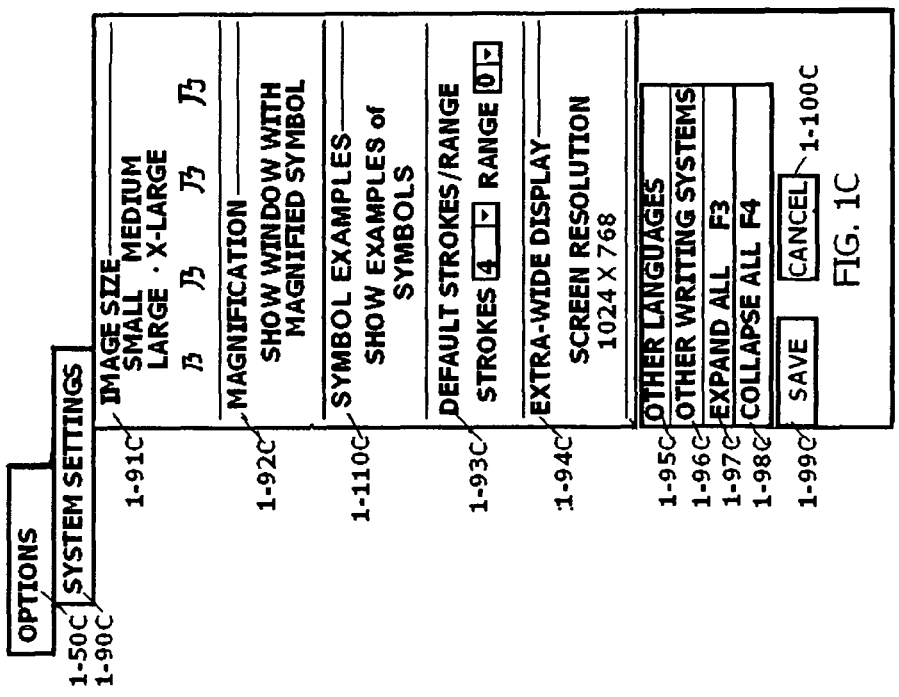

WHAT NEXT: USER WANTS TO COUNT STROKES:
RELAX! JUST REMEMBER TO SELECT A NUMBER FROM THE RANGE MENU IF USER MISCOUNTS.
IF USER WANTS TO LEARN TO COUNT THE CHINESE WAY, READ BELOW. ── 1-48F

DON'T BE SPOOKED
by
STROKES ── 1-101F

A FACT: ANYONE WHO WRITE IN ANY LANGUAGE COUNTS STROKES BUT MOST DO IT WITHOUT THINKING!

AS AN EXAMPLE, USE THE ENGLISH WRITTEN LETTER 'a'. THE WRITER PERFORMS THE TASK WITHOUT PAYING ATTENTION TO THE FACT THAT 'a' IS WRITTEN WITH TWO STROKES. NEXT, TAKE THE EXAMPLE OF THE PRINTED 'A'. AGAIN, WITHOUT CONSIDERED THOUGHT, THE WRITER WOULD MAKE THREE STROKES.

THE CHINESE THINK OF STROKE ONE AS APPLYING A WRITING BRUSH TO A PIECE OF PAPER AND MAKING ONE CONTINUOUS MARK BEFORE LIFTING UP THE BRUSH. STROKE TWO CONTINUES AS THE NEXT SUCH ACTION.

THERE IS ONLY ONE 'NON-INTUITIVE' RULE THAT NEEDS TO BE REMEMBERED. *BRUSH STROKES CAN TURN CORNERS.* THEREFORE, 又 IS COUNTED AS TWO STROKES AND 女 AND 口 ARE BOTH COUNTED AS THREE STROKES.

A FINAL VARIANT: THE "READ CHINESE CHARACTERS IN SECONDS" IS *USER-FRIENDLY!* THEREFORE, IF UNSURE OF THE STROKE NUMBER, COMPENSATE FOR POSSIBLE ERROR BY ADDING A FIGURE TO THE 'RANGE' DROP-DOWN MENU. (ONLY IN THE CHINESE MIND IS COUNTING STROKES CONSIDERED TO BE AN EXACT SCIENCE.)

FIG. 1F

REMEMBER THE *MAXIUM*

*THIS PROGRAM WILL YIELD THE CORRECT RESULTS
EVEN IF
THE NUMBER OF STROKES IS NOT COUNTED ACCURATELY!*

STROKES of ONE: — 1-102G
— 1-103G

As counted by the Chinese, there are only two of the One Stroke Characters. These are: 一 and 乙 . Also, all dots and short lines are considered to be one stroke each. Examples are: the character 汁 (with three left side dashes plus two other strokes for a count of five); or 杰 (with four bottom dashes plus a 木 of four counts for a total of eight).

STROKES of TWO: — 1-104G

There are twenty of the two stroke characters. These are:

二　十　卜　丁　七　匕　八　人　入　厂

刁　儿　几　九　刀　力　乃　又　了　乜

STROKES of THREE: — 1-105G

There are fifty-two of the three stroke Characters. These are:

STROKES OF FOUR: — 1-106H

HERE ARE EXAMPLES OF SOME OF THE MORE PUZZLING FOUR STROKE CHARACTERS.

扎　互　五　车　戈　兮　长　勿　月　册

STROKES OF FIVE: — 1-107H

HERE ARE EXAMPLES OF SOME OF THE MORE PUZZLING FIVE STROKE CHARACTERS.

扔　厉　业　电　凹　凸　汇　目

STROKES OF SIX: — 1-108H

HERE ARE EXAMPLES OF SOME OF THE MORE PUZZLING SIX STROKE CHARACTERS.

肉　缶　血　光　圭

STROKES OF SEVEN: — 1-109H

HERE IS AN EXAMPLE OF THE COMMON SEVEN STROKE CHARACTER FOR THE ENGLISH WORD *I*.

我

**NOW THAT ALL OF THE BASIC CHARACTER STROKES HAVE BEEN SHOWN, THINK AGAIN OF THE *MAXIM*:**

*THIS PROGRAM WILL YIELD THE CORRECT RESULTS EVEN IF THE NUMBER OF STROKES IS NOT COUNTED ACCURATELY!*

| | MODE |
|---|---|
| 1-60I | |
| 1-62I | STANDARD |
| 1-120I | SIDE |
| 1-124I | TOP |
| 1-128I | BOTTOM |
| 1-132I | PAIR |
| 1-136I | TWIN CHARACTERS |
| 1-140I | TRIPLE SYMBOL |
| 1-144I | WRITE-IN |
| 1-154I | BROWSER |
| 1-170I | MEASURE WORD |
| 1-180I | USER-GENERATED |
| 1-206I | GAMES |
| 1-276I | DICTIONARY |

FIG. 1I

| FIXED SYMBOLS Letters | FIXED SYMBOLS Numbers | FIXED SYMBOLS Visuals | FIXED SYMBOLS Visuals |
|---|---|---|---|
| 乃 B | 千 4 | ␣ Bowl | 丨 Pole |
| E E | 丂 5 | ⌐ Cap | ‖ Poles Doubled |
| ɿ i small | 又 7 | ⸜ Curves | 人 Roof/Base |
| T J | | ∷ Dashes | ⌵ Staple |
| 长 K | | ⼒ Fist | ~ Wave |
| 卫 P | | 力 Gate | 女 Woman |
| 几 r small | | ∟ Hook | |
| T T | | 立 Lantern | |
| 乂 X | | 勿 Monster | |
| 丰 Y | | 口 Mouth | |
| Z Z | | ∠ Pointer | |

SYMBOLES LETTRES (1-272K, 1-273K)

- 乃 B
- E E
- 亅 i petite
- 丁 J
- 长 K
- 卫 P
- 儿 r petite
- 丅 T

SYMBOLES LETTRES (1-272K, 1-273K)

- 乂 X
- 丫 Y
- 乙 Z

NOMBRES (1-274K)

- 午 4
- 丂 5
- 又 7

SYMBOLES Visuals (1-272K, 1-275K)

- ⊔ Agrafe
- 口 Bouche
- ⌣ Cuvette
- ⌐ Casquette
- ⺀ Courbe
- ⌊ Crochet
- 女 Femme
- 厶 Flèche
- 立 Lanterne

SYMBOLES Visuals (1-272K, 1-275K)

- | Mât
- || Mât Multiplié en Deux
- / Mât Penché
- 勿 Monstre
- ⁏ Pincée
- 业 Poing
- 力 Porte
- 人 Toit/Pied
- ～ Vague

EXAMPLES: Symbol Letters 1-55L

| | | | | | | | | | | | |
|---|---|---|---|---|---|---|---|---|---|---|---|
| B | 乃 | 及 | 邓 | 也 | | | | | | | |
| E | 曰 | 正 | 臼 | 印 | 窨 | | | | | | |
| i | 订 | 门 | 辽 | 永 | | | | | | | |
| J | 丁 | 乃 | 力 | 才 | 习 | | | | | | |
| K | 长 | 永 | 兆 | 逐 | 苇 | | | | | | |
| P | 卫 | 尸 | 巴 | 仓 | 丰 | | | | | | |
| r | 几 | 儿 | 九 | 风 | 片 | | | | | | |
| T | 七 | 十 | 于 | 千 | 才 | | | | | | |
| X | 丈 | 文 | 风 | 戈 | 区 | | | | | | |
| Y | 半 | 平 | 关 | 伞 | 米 | | | | | | |
| Z | 乙 | 之 | 久 | 丢 | 边 | | | | | | |

EXAMPLES: Symbol Numbers 1-56L

| | | | | | |
|---|---|---|---|---|---|
| 4 | 车 | 牛 | 发 | 叫 | 妎 |
| 5 | 亏 | 与 | 弓 | 冯 | 弗 |
| 7 | 丁 | 刁 | 子 | 夕 | 久 |

FIG. 1L

EXAMPLES: Symbol Visuals
1-57M

| | | | | | | | | | |
|---|---|---|---|---|---|---|---|---|---|
| Bowl | 匕 | 巳 | 也 | 心 | 无 | Mouth | 口 | 户 | 廿 | 中 | 母 | 日 | 皿 |
| Cap | 千 | 勾 | 冗 | 欠 | | Pointer | 么 | 亡 | 也 | | | | |
| Curves | 八 | 乃 | 又 | 少 | | Pole | 卜 | 与 | 十 | 土 | 丰 | 圭 | |
| Dashes | 飞 | 心 | 汁 | 礼 | 母 | 黑 | Poles Doubled | 也 | | | | | |
| Fist | 当 | 光 | 米 | 妥 | | Pole Tilted | 卜 | 刁 | 七 | 匕 | 之 | 才 | |
| Gate | 力 | 九 | 刁 | 门 | | Roof/Base | 人 | 又 | 个 | 久 | 仗 | 水 | |
| Hook | 几 | 七 | 飞 | 巴 | 戈 | Staple | 贝 | 凶 | 区 | 归 | 凹 | 山 | 亡 |
| Lantern | 立 | 产 | 亚 | 亦 | 羊 | 来 | Wave | 之 | 边 | 廷 | | | |
| Monster | 勿 | 犯 | 扬 | 家 | 易 | Woman | 女 | 收 | 努 | 妥 | | | |

FIG. 1M

WHAT NEXT: TO BROWSE THROUGH THE LOCATOR DATA: OPEN THE BROWSER MODE. WRITE LOCATOR SYMBOL NAME IN THE 'SEARCH BLANK SPACE'. SELECT 'SYMBOL DATA' FROM THE 'IN COLUMN' MENU. CLICK FIND BUTTON.

10-33A  1-60I  1-54I  1-50C  1-51D  1-41E

MODE [BROWSER ▼]  OPTIONS  QUICK SELECTIONS  HELP

SEARCH 10-156A          10-157A          10-160A          10-155A
[TREE]   IN COLUMN [SYMBOL DATA ▼]   [FIND]          RESET 10-161A  10-162A  10-163A  10-164A  10-165A  10-166A  10-167A

| CHINESE | SYMBOL | STROKES | TONES | PĪNYĪN | ENGLISH | PART OF SPEECH |
|---|---|---|---|---|---|---|
| 木 | TREE | 4 | 4 | MU 1 | NUMB; TREE; WOOD | ADJECTIVE; NOUN |
| 禾 | TREE | 5 | 2 | HE 1 | GRAIN; CROP; RICE | NOUN |
| 札 | TREE | 5 | 2 | ZHA 2 | HAND-WRITTEN LETTER; LETTER | NOUN |
| 本 | TREE | 5 | 3 | BEN 1 | MEASURE/COPY, BOOK; ORIGIN; PLANT ROOT | NOUN |
| 末 | TREE | 5 | 4 | MO 1 | DUST; TIP; UNIMPORTANT PART | NOUN |
| 机 | TREE | 6 | 1 | JI 12 | HUNGRY; INSUFFICIENT; FAMINE | ADJECTIVE; NOUN |
| 休 | TREE | 6 | 1 | XIU 1 | EXPECT; NEVER; CEASE; GIVE UP; REST | ADVERB; VERB |

FIG. 10A

WHAT NEXT: TO BROWSE THROUGH THE LOCATOR DATA: OPEN THE BROWSER MODE. WRITE LOCATOR SYMBOL NAME IN THE 'SEARCH BLANK SPACE'. SELECT 'SYMBOL DATA' FROM THE 'IN COLUMN' MENU. CLICK FIND BUTTON.

MODE [BROWSER ▼]  OPTIONS  QUICK SELECTIONS  HELP

SEARCH [TREE PAIR]  IN COLUMN [SYMBOL DATA ▼]  [FIND]  RESET

| CHINESE | SYMBOL | STROKES | TONES | PINYIN | ENGLISH | PART OF SPEECH |
|---|---|---|---|---|---|---|
| 林 | TREE PAIR | 8 | 2 | LIN 3 | FOREST; GROVE; THICKET; WOOD | NOUN |
| 株 | TREE PAIR | 10 | 1 | ZHU 16 | MEASURE FOR PLANT/TREE: EXPOSED TREE ROOTS | MEASURE WORD: NOUN |
| 抹 | TREE PAIR | 10 | 4 | MO 10 | FODDER: FEED | NOUN: VERB |
| 彬 | TREE PAIR | 11 | 1 | BIN 2 | ORNAMENTAL; REFINED | ADJECTIVE |
| 婪 | TREE PAIR | 11 | 2 | LAN 8 | COVETOUS; GREEDY | ADJECTIVE |
| 梨 | TREE PAIR | 11 | 2 | LI 28 | PEAR | NOUN |
| 淋 | TREE PAIR | 11 | 2 | LIN 6 | BE CAUGHT IN THE RAIN; SPRINKLE, TAKE A SHOWER | VERB |

| | 10-33A | 1-60I | 1-154I | 1-50C | 1-51D | 1-41E |
|---|---|---|---|---|---|---|
| | | MODE [BROWSER ▼] | | OPTIONS | QUICK SELECTIONS | HELP |
| SEARCH 10-156D | | | 10-157A | 10-160A | | 10-155A |
| [TREE TRIPLE] | | IN COLUMN [SYMBOL DATA ▼] | | [FIND] | | RESET |
| 10-161D | 10-162D | 10-163D | 10-164D · 10-165D | | 10-166D | 10-167D |
| CHINESE | SYMBOL | STROKES | TONES | PĪNYĪN | ENGLISH | PART OF SPEECH |
| 森 | TREE TRIPLE | 12 | 1 | SEN | ABUNDANT; DARK; OVERGROWN; SOMBER | ADJECTIVE |
| 糝 | TREE TRIPLE | 17 | 2 | MI 16 | CORRUPT; DECADENT; ROTTEN; PORRIDGE | ADJECTIVE; NOUN |
| 森林 | TREE TRIPLE | 20 | 1/2 | SEN LIN | FOREST | NOUN |
| 森林員 | TREE TRIPLE | 27 | 1/2/4 | SEN LIN YUAN | FOREST RANGER | NOUN PHRASE |

WHAT NEXT: TO BROWSE THROUGH THE LOCATOR DATA: OPEN THE BROWSER MODE. WRITE LOCATOR SYMBOL NAME IN THE 'SEARCH BLANK SPACE'. SELECT 'SYMBOL DATA' FROM THE 'IN COLUMN' MENU. CLICK FIND BUTTON.

SEARCH 11-156A  
| | 11-34A | 1-60I | 1-154I | 1-50C | 1-51D | | 1-41E |
|---|---|---|---|---|---|---|---|
| | | MODE | BROWSER ▼ | OPTIONS | QUICK SELECTIONS | | HELP |
| HUAN | IN COLUMN | | 11-158A PINYIN DATA ▼ | ※ EXACT WORD 11-168A ○ EXTENDED WORDS | 11-169A | 10-160A FIND | 10-155A RESET |

WHAT NEXT: TO BROWSE THROUGH THE PINYIN DATA: OPEN THE BROWSER MODE. WRITE THE PINYIN WORD IN THE 'SEARCH BLANK SPACE'. SELECT 'PINYIN DATA' FROM THE 'IN COLUMN' MENU. SELECT 'EXACT WORD'. CLICK FIND BUTTON.

| 11-161A | 11-163A | 11-164A | 11-165A | 11-166A | 11-167A |
|---|---|---|---|---|---|
| CHINESE | STROKES | TONES | PINYIN | ENGLISH | PART OF SPEECH |
| 幻 | 4 | 4 | HUAN 1 | UNREAL; IMAGINATIVE; CHANGEABLE: CHANGE | ADJECTIVE: VERB |
| 欢 | 6 | 1 | HUAN 2 | JOLLY; CHEERFUL; MERRY; PLEASED | ADJECTIVE |
| 还 | 7 | 2 | HUAN 3 | RETURN/REPAY; REIMBURSE; GIVE BACK | VERB |
| 奂 | 7 | 4 | HUAN 4 | VIVID; ABUNDANT; FULL; EXCHANGE; CHANGE | ADJECTIVE: VERB |
| 环 | 8 | 2 | HUAN 5 | AROUND;THROUGH:RING; BRACELET:ENCIRCLE | ADVERB; NOUN: VERB |
| 宦 | 9 | 4 | HUAN 6 | OFFICIAL IN ANCIENT CHINA | NOUN |
| 浣 | 10 | 4 | HUAN 7 | WASH; CLEANSE; BATHE | VERB |
| 换 | 10 | 4 | HUAN 8 | CHANGE; EXCHANGE | VERB |
| 唤 | 10 | 4 | HUAN 9 | CALL; HAIL; SUMMON | VERB |

FIG. 11A

| 11-35B | 1-60I | 1-154I | 1-50C | 1-51D | | 1-41E |
|---|---|---|---|---|---|---|
| | | MODE [BROWSER ▼] | OPTIONS | QUICK SELECTIONS | | HELP |
| SEARCH 11-156B | | 11-158A | EXACT WORD | 11-169A | 10-160A | 10-155A |
| [HUAN] IN COLUMN [PINYIN DATA ▼] | | | 11-168A · EXTENDED WORDS | | [FIND] | RESET |

WHAT NEXT: TO BROWSE THROUGH THE PINYIN DATA: OPEN THE BROWSER MODE. WRITE THE PINYIN WORD IN THE SEARCH BLANK SPACE. SELECT PINYIN DATA FROM THE 'IN COLUMN' MENU. SELECT 'EXTENDED WORD'. CLICK THE FIND BUTTON.

| 11-161B | 11-163B | 11-164B | 11-165B | 11-166B | 11-167B |
|---|---|---|---|---|---|
| CHINESE | STROKES | TONES | PINYIN | ENGLISH | PART OF SPEECH |
| 偿还 | 18 | 2/2 | CHANGHUAN | PAY BACK | VERB |
| 欢呼 | 14 | 1/4 | HUAN HU | CHEER; HAIL | VERB |
| 还价 | 13 | 3/1 | HUAN JIA | COUNTER-OFFER | NOUN |
| 还款 | 19 | 2/3 | HUAN KUAN | PAY BACK | VERB |
| 欢乐 | 12 | 1/4 | HUAN LE | HAPPY; JOYOUS | ADJECTIVE |
| 还盘 | 18 | 2/2 | HUAN PAN | COUNTER-OFFER | NOUN |
| 喜欢 | 18 | 3/1 | XI HUAN | BE FOND OF; LIKE | VERB |
| 置换 | 24 | 4/4 | ZHI HUAN | DISPLACE; REPLACE; SUBSTITUTE | VERB |

FIG. 11B

WHAT NEXT: TO BROWSE THROUGH THE PINYIN DATA: OPEN THE BROWSER MODE. WRITE THE PINYIN WORD IN THE 'SEARCH BLANK SPACE'. SELECT 'PINYIN DATA' FROM THE 'IN COLUMN' MENU. SELECT 'EXACT WORD'. CLICK THE SHOW SYMBOLS BUTTON. CLICK THE FIND BUTTON.

| 11-36C | 1-60I | 1-154I | 1-50C | 1-51D | 1-41E |
|---|---|---|---|---|---|
| | MODE [BROWSER ▼] | OPTIONS | QUICK SELECTIONS | HELP | HELP |

SEARCH 11-156C IN COLUMN 11-158A • EXACT WORD 11-169A • SHOW 11-178C 10-160A 10-155A
[HUAN] [PINYIN DATA ▼] 11-168A EXTENDED SYMBOLS [FIND] RESET

| 11-161C | 11-162C | 11-163C | 11-164C | 11-165C | 11-166C | 11-167C |
|---|---|---|---|---|---|---|
| CHINESE | SYMBOLS | STROKES | TONES | PINYIN | ENGLISH | PART OF SPEECH |
| 构思 | BOWL BOTTOM | 17 | 4/1 | GOU SI | DESIGN: MEDITATE | NOUN:VERB |
| 构思 | CAP LEFT | 17 | 4/1 | GOU SI | DESIGN: MEDITATE | NOUN:VERB |
| 构思 | DASHES BOTTOM | 17 | 4/1 | GOU SI | DESIGN: MEDITATE | NOUN:VERB |
| 构思 | POINTER | 17 | 4/1 | GOU SI | DESIGN: MEDITATE | NOUN:VERB |
| 构思 | ROOF/BASE | 17 | 4/1 | GOU SI | DESIGN: MEDITATE | NOUN:VERB |
| 构思 | WINDOW | 17 | 4/1 | GOU SI | DESIGN: MEDITATE | NOUN:VERB |

FIG. 11C

WHAT NEXT: TO BROWSE THROUGH THE ENGLISH DATA: OPEN THE BROWSER MODE. WRITE THE ENGLISH WORD IN THE 'SEARCH BLANK SPACE'. SELECT 'ENGLISH DATA' FROM THE 'IN COLUMN' MENU. SELECT 'EXACT WORD'. CLICK THE FIND BUTTON.

12-39A  1-60I  1-154I  1-50C  1-5,1D  1-41E

MODE [BROWSER ▼]  OPTIONS  QUICK SELECTIONS  HELP

SEARCH 12-156A        12-159A            ⦿ EXACT WORD  11-169A  10-160A  10-155A
[BUILD]  IN COLUMN [ENGLISH DATA ▼]  11-168A ○ EXTENDED WORDS  [FIND]  RESET 12-161A        12-163A  12-164A  12-165A          12-166A               12-167A

| CHINESE | STROKES | TONES | PINYIN | ENGLISH | PART OF SPEECH |
|---|---|---|---|---|---|
| 搭 | 12 | 1 | DA 7 | BUILD; HANG; JOIN | VERB |
| 盖 | 11 | 4 | GAI 5 | COVER; SEAL; STAMP; BUILD | VERB |
| 个子 | 6 | 4/0 | GE ZI | BUILD; HEIGHT; STATURE | NOUN |
| 构 | 8 | 4 | GOU 6 | BUILD; CONSTRUCT | VERB |
| 建 | 9 | 4 | JIAN 16 | ESTABLISH; FOUND; CREATE; BUILD | VERB |
| 垒 | 12 | 3 | LEI 9 | FORTRESS; BUILD WITH BRICKS | NOUN; VERB |
| 修 | 9 | 1 | XIU 4 | BUILD; ERECT; MEND; REPAIR | VERB |

FIG. 12A

WHAT NEXT: TO BROWSE THROUGH THE ENGLISH DATA: OPEN THE BROWSER MODE. WRITE THE ENGLISH WORD IN THE 'SEARCH BLANK SPACE'. SELECT 'ENGLISH DATA' FROM THE 'IN COLUMN' MENU. SELECT 'EXTENDED WORD'. CLICK THE FIND BUTTON.

12-40B   1-60I   1-154I   1-50C   1-51D   1-41E

MODE [BROWSER ▼]   OPTIONS   QUICK SELECTIONS   HELP

SEARCH 12-156B [BUILD]    12-159A    EXACT WORD 11-169A   10-160A   10-155A

IN COLUMN [ENGLISH DATA ▼]   11-168A · EXTENDED WORDS [FIND]   RESET 12-161B   12-163B   12-164B · 12-165B    12-166B    12-167B

| CHINESE | STROKES | TONES | PINYIN | ENGLISH | PART OF SPEECH |
|---|---|---|---|---|---|
| 阁 | 9 | 2 | GE 8 | CHAMBER; STORIED BUILDING, PAVILION | NOUN |
| 家 | 10 | 1 | JIA 12 | MEASURE/BUILDING: SUFFIX/SCHOLASTIC | MEASURE: PARTICLE |
| 楼 | 13 | 2 | LOU 5 | MULTI-STORIED BUILDING; TOWER | NOUN |
| 楼房 | 21 | 2/2 | LOU FANG | BUILDING | NOUN |
| 院 | 9 | 4 | YUAN 6 | COURTYARD; PUBLIC BUILDING | NOUN |
| 座 | 10 | 4 | ZUO 4 | MEASURE/STRUCTURE (BUILDING; BRIDGE) | NOUN |

FIG. 12B

WHAT NEXT:
TO LOCATE A CLASS OF MEASURE WORDS:
OPEN MEASURE WORD MODE. CLICK THE 'FIND' BUTTON.

| 13-43B | 1-60I | 1-170I | 1-50C | 1-51D | 1-41E |
|---|---|---|---|---|---|
| | MODE MEASURE WORD ▼ | | OPTIONS | QUICK SELECTIONS | HELP |

SEARCH 13-156A                                    10-160A  10-155A
[        ]                                          FIND    RESET

| 13-161B | 13-163B | 13-164B | 13-165B | 13-166B | 13-167B |
|---|---|---|---|---|---|
| CHINESE | STROKES | TONES | PINYIN | ENGLISH | PART OF SPEECH |
| 把 | 7 | 3 | BA 7 | MEASURE FOR ITEMS WITH HANDLES | MEASURE WORD |
| 班 | 10 | 1 | BAN 15 | MEASURE FOR ASSIGNED NUMBER | MEASURE WORD |
| 磅 | 15 | 4 | BANG 11 | MEASURE FOR POUND | MEASURE WORD |
| 包 | 5 | 1 | BAO 1 | MEASURE FOR PARCEL | MEASURE WORD |
| 杯 | 8 | 1 | BEI 5 | MEASURE FOR CUP | MEASURE WORD |
| 笔 | 10 | 3 | BI 15 | MEASURE FOR MONEY | MEASURE WORD |
| 遍 | 12 | 4 | BIAN 10 | MEASURE FOR NUMBER OF TIMES | MEASURE WORD |
| 层 | 7 | 2 | CENG 1 | MEASURE FOR FLOORS OF BUILDING | MEASURE WORD |

FIG. 13B

WHAT NEXT: TO ADD CHARACTERS TO THE DATABASE: WRITE THE PINYIN WORD IN FIRST BLANK SPACE. CLICK PINYIN SEARCH #1. SELECT TRANSLATION. REPEAT WITH SECOND PINYIN WORD. CLICK COMBINE WORDS. ADJUST TRANSLATION.

HIGHLIGHT 14-181A  1-60I   1-180I   14-182A   #1   14-183A  14-44A
PINYIN WORD #1  MODE USER-GENERATED   DIAN        PINYIN SEARCH #1

| #1 PINYIN 14-184A | CHINESE 14-185A | STROKES 14-186A | TONES 14-187A | ENGLISH 14-188A | SPEECH PART 14-189A |
|---|---|---|---|---|---|
| DIAN 1 | 口 | 5 | 4 | ELECTRICITY | NOUN |
| DIAN 2 | 典 | 8 | 3 | RULE OF LAW/RECORD/RITE | NOUN |
| DIAN 3 | 店 | 8 | 4 | SHOP; STORE; INN; TAVERN | NOUN |

HIGHLIGHT 14-190A           14-191A    #2    14-192A
PINYIN WORD #2              NAO              PINYIN SEARCH #2

| #2 PINYIN 14-193A | CHINESE 14-194A | STROKES 14-195A | TONES 14-196A | ENGLISH 14-197A | SPEECH PART 14-198A |
|---|---|---|---|---|---|
| NAO 3 | 恼 | 9 | 3 | ANGRY, ANNOYED, WORRIED | ADJECTIVE |
| NAO 4 | 脑 | 10 | 3 | BRAIN | NOUN |

14-199A
COMBINE WORDS                      14-234A            14-235A
                                    SAVE               RESET

| PINYIN 14-200A | CHINESE 14-201A | STROKES 14-202A | TONES 14-203A | ENGLISH 14-204A | SPEECH PART 14-205A |
|---|---|---|---|---|---|
| DIAN NAO | 电脑 | 15 | 4/3 | COMPUTER | NOUN |

FIG. 14A

WHAT NEXT: LOCATE A USER-ADDED CHARACTER: SELECT BROWSER MODE. ENTER AN ENGLISH WORD IN 'SEARCH BLANK SPACE'. SELECT EXTENDED WORD. CLICK 'FIND' BUTTON.

SEARCH 14-156B [COMPUTER] IN COLUMN [ENGLISH/DATA ▼] 11-168A • EXTENDED/WORDS [FIND] RESET

MODE [BROWSER ▼]   OPTIONS   QUICK SELECTIONS   HELP 14-45B  1-60I  1-154I  12-159A  1-50C  1-51D  EXACT WORD 11-169A  10-160A 10-155A  1-41E

| 14-161B | 14-163B | 14-164B | 14-165B | 14-166B | 14-167B |
|---|---|---|---|---|---|
| CHINESE | STROKES | TONES | PĪNYĪN | ENGLISH | PART OF SPEECH |
| 电脑 | 15 | 4/3 | DIAN NAO | COMPUTER | NOUN |
| 电子计算机 | 41 | 4/4/4/4 | DIAN ZI JI SUAN JI | ELECTRONIC COMPUTER | NOUN |
| 计算机中断 | 39 | 4/4/1/1/1 | JI SUAN JI ZHONG DUAN | COMPUTER TERMINAL | NOUN PHRASE |

FIG. 14B

SEARCH 15-207A  MODE [GAMES ▼]  [ ] OPTIONS  QUICK SELECTIONS  HELP
[TANG]  IN COLUMN [PINYIN DATA ▼]  15-215A •EXACT WORD  15-216A  15-209A [FIND]  15-210A RESET
                        15-208A                    EXTENDED/WORDS

WHAT NEXT: COMPILE A WORD GAME LIST: SELECT THE GAME MODE. WRITE A PINYIN WORD IN THE 'SEARCH BLANK SPACE'. SELECT 'PINYIN DATA' FROM THE 'IN COLUMN' MENU. SELECT 'EXACT WORD'. CLICK THE FIND BUTTON.

15-221A  15-222A 15-223A 15-224A  15-225A  15-226A

| CHINESE | STROKES | TONES | PINYIN | ENGLISH | PART OF SPEECH |
|---|---|---|---|---|---|
| 汤 | 8 | 1 | TANG 1 | BROTH; HOT WATER; SOUP; SURNAME | NOUN; PROPER NOUN |
| 唐 | 10 | 2 | TANG 2 | TANG DYNASTY; SURNAME | NOUN; PROPER NOUN |
| 倘 | 10 | 3 | TANG 3 | SUPPOSE | VERB |
| 堂 | 11 | 2 | TANG 4 | RELATIVE OF DIFFERENT BRANCH; MEETING PLACE | IDIOM: NOUN |
| 淌 | 11 | 3 | TANG 5 | DRIP; FLOW | VERB |
| 烫 | 11 | 4 | TANG 6 | SCALDING; BURN; IRON; SCALD | ADJECTIVE: VERB |
| 棠 | 12 | 2 | TANG 7 | CRAB-APPLE TREE; WILK PLUM TREE | NOUN |

FIG. 15A 15-47B

WHAT NEXT: COMPOSE STORIES AND PUNS INSPIRED BY A GAME WORD LIST (FIG. 15A): DEVISE A 'STORY LINE' FROM THE MANY DIFFERENT ENGLISH WORDS THAT ARE ALL TRANSLATED INTO THE SAME CHINESE SOUND. (AUXILIARY WORDS HELP TO HOLD THE NARRATIVE TOGETHER.)

A TANG STORY — 15-230B

In Pinyin — 15-231B

Tăng táng láng táng táng de tăng yú táng biān zhī táng xiā, táng táng táng zhù, yù táng tàng qīng táng tăng xiān tāng chāo cī táng zhī táng tàng táng tāng, táng táng tàng hū ?

In Chinese Characters — 15-232B

倘螳螂堂堂地躺于塘边之棠下，螳膛搪住，于烫烫枪膛淌向唐朝祠堂之烫烫糖汤，螳膛烫呼？

In English — 15-233B

If a <u>praying mantis</u> of <u>great dignity lies down</u> on an <u>embankment</u> near a <u>pond</u> under a <u>wild plum tree</u> and the <u>mantis' breast blocks</u> the <u>flow</u> of <u>semi-fluid hot water, dripping</u> like <u>scalding candy</u> through a <u>gun barrel</u> into a <u>pond</u> near the <u>Tang Dynasty clan's meeting place:</u> Do you <u>suppose</u> her <u>breast was scalded?</u>

FIG. 15B

EN FRANCAISE:
UTILIZER: MODE STANDARD, SYMBOLES PRINCIPALS, MES SELECTIONS, CHIFFRE DU TRAIT, GAMME, ET RECHERCHER.

16-20A  书

CHOISIER 16-256A   SELECTION 16-257A   AIDER 16-258A   16-58A  16-20A
                                                        16-259A  书

16-255A
SYMBOLES PRINCIPAUX
- 乃 B 336
299 乃 B GRANDE
书 B LIVRE 343
及 B FIGURE
也 B BATON PAR DEUX
阝 B PETITE
官 B PETITE CARREE
丑 B GUERRE
女 LA FEMME 16-260A
MES SELECTIONS
书 B LIVRE

REINITIALISER 16-261A    CHIFFRE GAMME 16-262A
[?] [4] [▼] [+] [0] [▼]
16-267A  16-270A  RECHERCHER
         UN MOT A TROUVER
         16-263A 16-264A
书   1 to 4

16-266A
| PINYIN | SHU 1 |
| CHIFFRE | 4 |
| TON | 1 |
| FRANCAIS | LIVRE, M |
| PARTI DU NOM | DISCOURS |

书
16-265A 1-60I
1-62I MODE
STANDARD ▼

SYMBOLES 1-272K
LETTRES 1-273K
NOMBRES 1-274K
VISUELS 1-275K
VOIR FIG. 1K

FIG. 16A

SYSTEM FOR READING CHINESE CHARACTERS IN SECONDS

FIELD

This invention relates to a method to output, from an electronic device, Chinese (or other Oriental) character texts, associated Pinyin spellings, and translation into English (or another language) of unknown, user-introduced characters.

BACKGROUND-PRIOR ART

Unlike the newer writing systems, such as Greek, Cyrillic or Latin, the ancient language system of the Chinese does not have an alphabet and uses a writing system based on picture characters to depict the written word. Each character is a unique picture that represents a unique idea, like a fingerprint. Therefore, the Chinese must learn to read by the rote memorization of several thousand characters: one character at a time. The Chinese, themselves, rarely use their non-alphabetized, time-consuming dictionaries. They depend, rather, on their own memories (developed through all their childhood years of standing upright with hands clasped behind their backs) tediously learning character after character by mind power alone.

In addition to the lack of an alphabet, the Chinese language also lacks a significant correlation between characters and their meaning. Yet both of these problems represent just the beginnings of the difficulties in grasping an understanding of written Chinese. Even as the Chinese language is made up literally of words of just one syllable, the entire body of the Chinese language is comprised of only a limited number of syllables. For example, the single syllable ji is the unique sound of seventy-two basic and unrelated words, each represented by its own unique character picture. Each one of these ji one syllable words includes such disparate ideas as the verbs to mock, to calculate, and to strike, as well as an assortment of other words such as almost, how many, and while.

A reader of Chinese must be able to understand at least 3,500 characters in order to be considered literate. This is the number required to read a newspaper. However, even in the face of such tedious memorization, the striking thing is that, in all the centuries prior to the advent of the computer, the Chinese never devised a written alphabet or applied spelling to their picture characters, and continued to learn their characters one picture at a time.

The advent of the personal computer changed all of that forever in the following ways:

(a) First, the Chinese devised the alphabetic writing system called Pinyin. (Pinyin means to spell phonetically. It is derived from pīn meaning to arrange, and yīn meaning sound. Pinyin is a system for applying a Latinized alphabetic spelling to Chinese ideograms in which tones are indicated by diacritics and unaspirated consonants are transcribed as voiced. For example, the two words that represent the Chinese characters meaning Chinese written language are written in Pinyin as zhōng wén. The macron or straight line over the 'o' in the first Pinyin word indicates that zhōng is pronounced in a level, singing tone. The acute accent or upward slanting diacritic mark over the 'é' in the second Pinyin word indicates that wén is pronounced in an ascending, singing tone.) Therefore, anyone who wished to use a computer first needed to learn the Pinyin spelling that has been assigned to each Chinese character.

(b) As with Asian languages in general, the large Chinese character set makes it impractical to design keyboards with enough keys to generate each character. Hence, after the advent of computers, Chinese typewriters (any one of which filled the space of an entire room) disappeared.

(c) There was a serious effort to devise an input system and font that could computerize character pictures. One of the more successful ventures in the early days was a product called "Tien Ma" (International Geosystems Corporation, 1987). However, it had many drawbacks to its usefulness. Tian Ma's greatest problem was that both the Pinyin spelling and character configurations needed to be known to the user before the system could be used. Another drawback was that the system was cumbersome and required that an additional piece of hardware be added to a personal computer. It also required about 15 minutes to print in a legible, large font, a single page containing about nineteen Chinese characters intermixed with English text.

(d) In current times there have been developed more successful methods of entering Chinese characters into a computer using Pinyin. However, even modern Pinyin systems are tedious to use and it must be stressed that to perform this action the user must already know exactly how to read and write the Chinese character before input into the computer can be accomplished. In other words, the Pinyin and character configuration must already be known to the user. Therefore, the Pinyin system is useless to anyone who does not already read Chinese characters. If the user knows both the Pinyin and the exact drawing of the Chinese character, he/she can use one of several methods of the Pinyin system to input a character into a computer. An example of piào liàng, meaning pretty, describes the complex process. In one of the more popular of these methods, the user types the first of the two Pinyin word examples, that of piào, into an edit field that yields a string of 61 character pictures (all with the meaning of piào) from which the fourth character is to be selected. The procedure is next repeated for the Pinyin word liàng with a yield of a string of 52 characters from which the tenth is to be selected.

(e) In mainland China a system called Wǔ bǐ has also been devised for the input of Chinese characters into a computer. Wǔ bǐ is a primary, shape-based input method used to create and transcribe text. Wǔ bǐ is based on the structure, or shape, of characters rather than on their pronunciation. The main concept behind Wǔ bǐ is that characters can be built by combining roots. The system can be used only by highly-trained Chinese writing specialists who compose characters using a classical five-writing-brush-stroke method of: lateral, vertical, left sweep, dot/right sweep, and bend.

Prior discussion has outlined the difficulties of putting characters into a computer, but the job of translation also presents problems. One large problem is that there is no system to translate a character directly from the character picture itself. Therefore, without prior knowledge of the Pinyin word that had been assigned to a given Chinese character, only non-alphabetized Chinese dictionaries are available to translators. The use of these dictionaries entails tedious hours (and considerable eye strain) looking through pages of fine-print columns. The translator needs to tease out the Pinyin from one or more of the 214 radicals that might or might not be found in a given character. (Radicals are distinctive stroke patterns that, when found in a given character, might or might not give a clue to either the sound or the subject of the character.) It is not unusual to work for several hours of vigorous effort to produce the Pinyin of just one single word.

Only after the Pinyin has finally been ascertained can a user revert to a computerized or hard-copy Chinese/other language dictionary to locate and translate the character.

In a continuing, unending search for simplification, the Chinese have printed any number of specialized picture dictionaries in a broad range of subjects such as engineering, military, commerce, and marine transport, among others. A user must search through many categories of pictures, narrow the search to the desired choice, and be rewarded by a notation of the Chinese character's Pinyin and English. One such publication is the "Longman, Chinese-English Visual Dictionary of Chinese Culture" (Longman Asia limited, Hong Kong, 1997). It has 602 pages of diagrams and pictures, each with numbered references in small-print Pinyin and English to names of structures, activities, and articles. There are two indexes. The first is written in Chinese characters with occasional Pinyin guides to beginning letters of the characters. The second is written in characters by stroke order. There is no index in English.

Circa 2005, Motorola Corporation developed for the Chinese market an input/handwriting recognition function device used as an adjunct to a Motorola handset mobile phone sold under the trademark MING. The adjunct device is used as an aid for literate Chinese to reproduce a more accurate Chinese written character. Pinyin is required as input. It is of limited value and the MING mobile phone and its inclusive hand-writing recognition function is not warranted by Motorola in the United States.

The Chinese, themselves, have devised a variety of handheld electronic devices to verify the accuracy of a Chinese character and to translate that character into other languages. However, all such devices are useless to those who do not already know the Pinyin associated with a given picture character.

The Chinese have also devised a reverse dictionary. This is used when a phrase of two characters is to be translated. If the Pinyin of the first character is unknown to the user, but the second character seems familiar, there is an entire dictionary to which the translator has recourse. One such tome is the 1,343 page work, "A Reverse Chinese-English Dictionary" (The Commercial Press, Beijing, 1985). The last part of the book is devoted to yet another appendix called: "A List of Active Reverse Head Characters." In page after page of long lines of columns on tissue-thin paper, these lists are organized alphabetically by Pinyin to show a given last character along with all preceding first characters that are joined with the given last character to make other words. Even after a lengthy search, the user often continues to be far from a valid translation.

In Chinese, it is next to impossible to translate a phrase consisting of several characters. Take, as an example, the eight-character phrase guó jì xìn tuō tóu zī gōng sī. Unless the phrase is well known, each individual character must first be translated separately through a tedious dictionary confrontation. Finally, after a lengthy struggle with Chinese/foreign language dictionaries, one would be faced with: guó=country, jì=border; xìn=honest, sincere; tuō=support, stand; tóu=cast, deliver, hurl, jump, throw; zī=consult, inquire; gōng=public; and sī=bureau. This is still far from the proper translation which is International Trust and Investment Corporation.

In another demonstration of the continuing search to improve reading knowledge of Chinese characters, the US Government gives two-week courses to small groups of agents who work in such occupations as drug enforcement, immigration, law, customs and import/export control. Along with transmitting some sense of the immense cultural differences, bare recognition of Chinese characters is the only goal to which the teachers may realistically aspire. Agents are given an introduction to non-alphabetic Chinese writing and to the fact that Pinyin must be learned before further reading progress will be possible. The group is next presented with five separate Chinese/Pinyin/English dictionaries and given lectures on stroke counting. Finally, the agents are instructed in all the tedious steps of locating radicals and seeking the reference points needed to translate just one single character. Ultimately, visual recognition and memorization of a few of the more common characters is considered enough to declare a modicum of success. (For example, prior to completing the course, it was not unusual for an agent to report the two-character Chinese salutation of Mr. (Xīan Shēng) as a suspect's actual first and last name!)

The front page of *The Washington Post*, Friday, Sep. 22, 2005, ran a feature article, "Across Latin America, Mandarin Is in the Air," stating, "China is voraciously scouring Latin America for everything from oil to lumber, and there is money to be made. That prospect has . . . business people in much of Latin America flocking to learn the Chinese language, increasingly heard in boardrooms and on executive junkets. 'It's fundamental to communicate in their language when you go there or they come here,' said Zamora, 40, a sales executive for the German drug-makers Bayer, which is growing dramatically in China. Zamora already speaks German and English, but struggles to learn written Chinese characters and to mimic tones unknown in Spanish.

BRIEF DESCRIPTION OF THE INVENTION

A method by which a user (who needs no knowledge of character configuration or Pinyin spelling) brings to an electronic device an unknown, user-chosen Chinese or other Oriental character/characters. The method is comprised of entering one or more easy-to-remember symbols (e.g., B, X, 4, 5, lantern, pointer, familiar to users of Western languages and found in all Chinese characters), and a character's stroke and optional stroke range number. The resulting output of character text is then available for use in other software programs, e.g., Microsoft Word. Also, output of a character's associated Pinyin spelling and translation precludes the need for further queries through other hard-copy or electronic translation devices. In addition, other system modes are used for: write-in's, browsing, inputting and retrieving user-generated words, measure words, games, and dictionary. A single operation from first input to final output can be accomplished, on average, in less than one minute.

LIST OF DRAWINGS

Further objects and advantages of the present invention will be apparent from the following description, references being had to the accompanying drawings wherein a preferred embodiment of the present invention is clearly shown.

In the drawings, closely related figures begin with the same number but have different alphabetic suffixes.

FIGS. 1C to 1E give details of menu choices of: OPTIONS, SELECTIONS, and HELP.

FIGS. 1F to 1H present a strokes tutorial called, "Don't Be Spooked by Strokes."

FIG. 1I presents a MODE list of: STANDARD; SIDE; TOP; BOTTOM; PAIR; TWIN CHARACTERS; TRIPLE SYMBOL; WRITE-IN, BROWSER, MEASURE WORD, USER-GENERATED WORDS, GAMES, and DICTIONARY.

FIG. 1J presents a FIXED SYMBOLS list of 32 easy-to-remember Primary Symbols (11 letters such as P and X; three numbers of 4, 5, and 7; and 18 visuals such as a lantern and a pointer). All of the symbols are familiar to users of Western languages and are found in all Chinese characters.

FIG. 1K presents the list of Primary Symbols in the French language to be used with FIG. 16A.

FIGS. 1L and 1M present examples of Letter Symbols, Number Symbols, and Visual Symbols as demonstrated by their use in characters.

FIGS. 2A to 2I demonstrate a STANDARD MODE, to which input criteria of symbols, stroke number, and (optional) stroke range number are applied, resulting in an output of Chinese (or other Oriental) character text, Pinyin spelling, and translation into English (or another language) of an unknown character brought by a user using an electronic device.

Figure 3A:
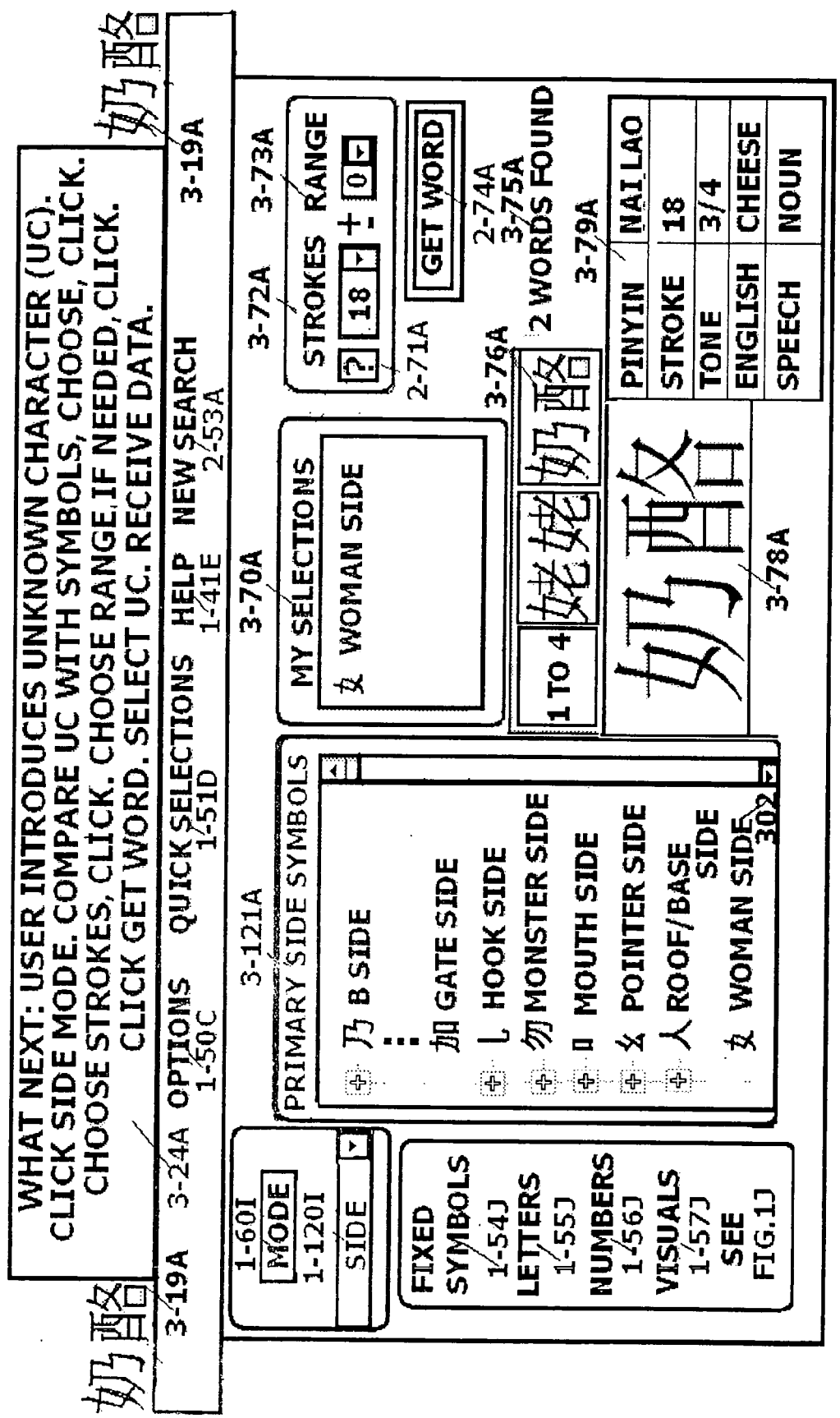
Figure 3B:
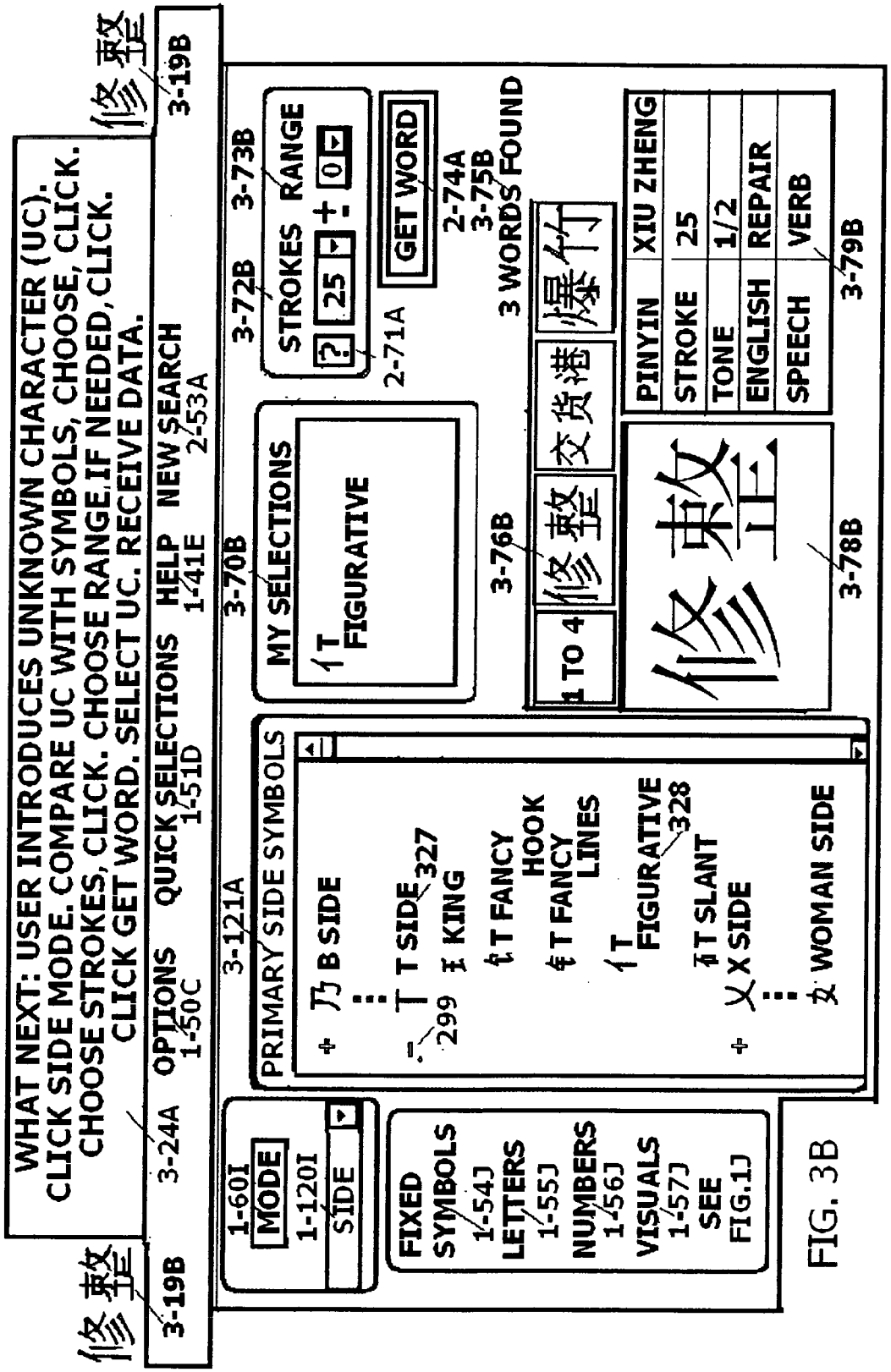

FIGS. 3A and 3B demonstrate a SIDE MODE to show the ease of output when a user-introduced, unknown character has a distinctive symbol on its left side (as seen from the perspective of a user).

Figure 4A:
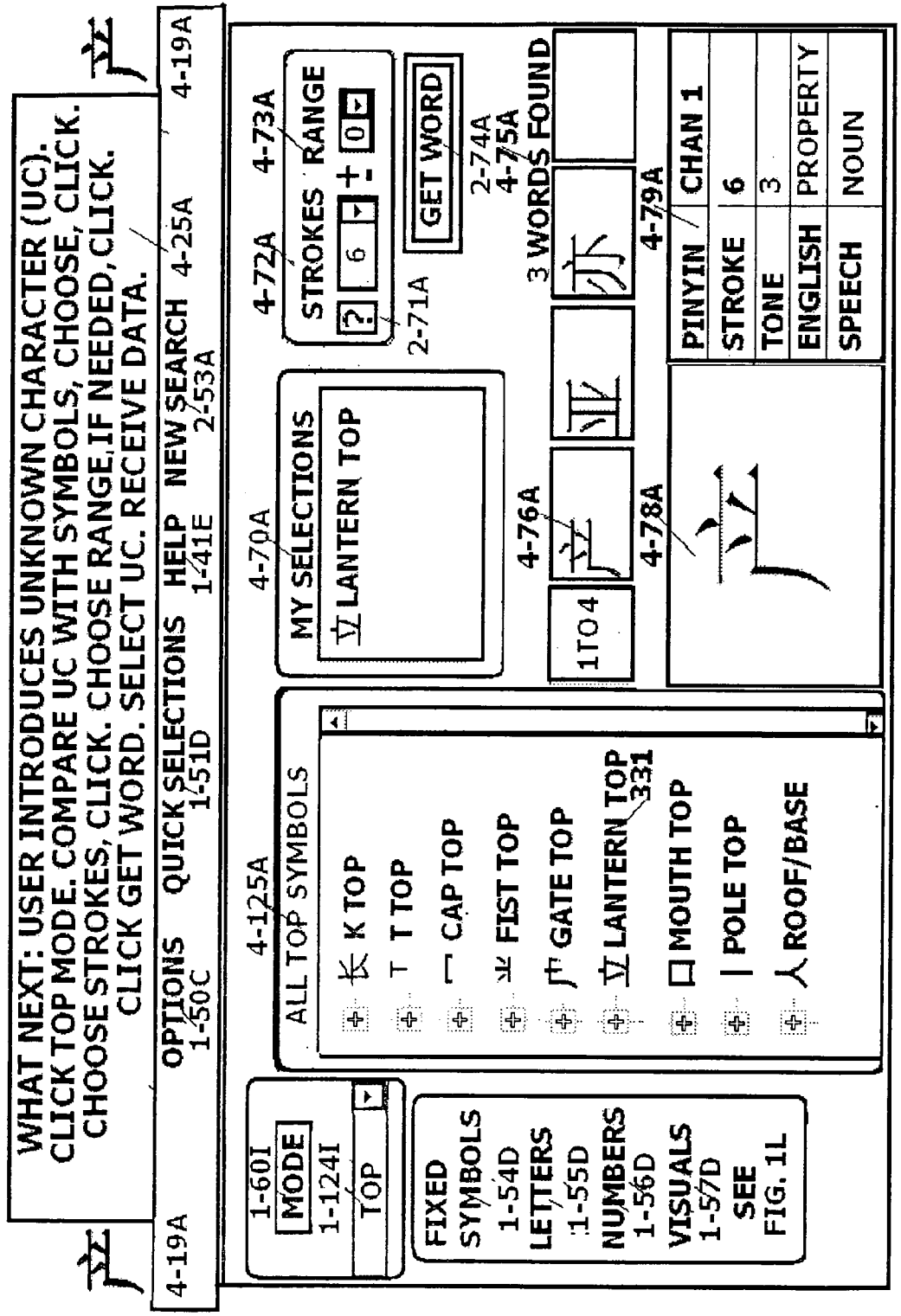
Figure 4B:
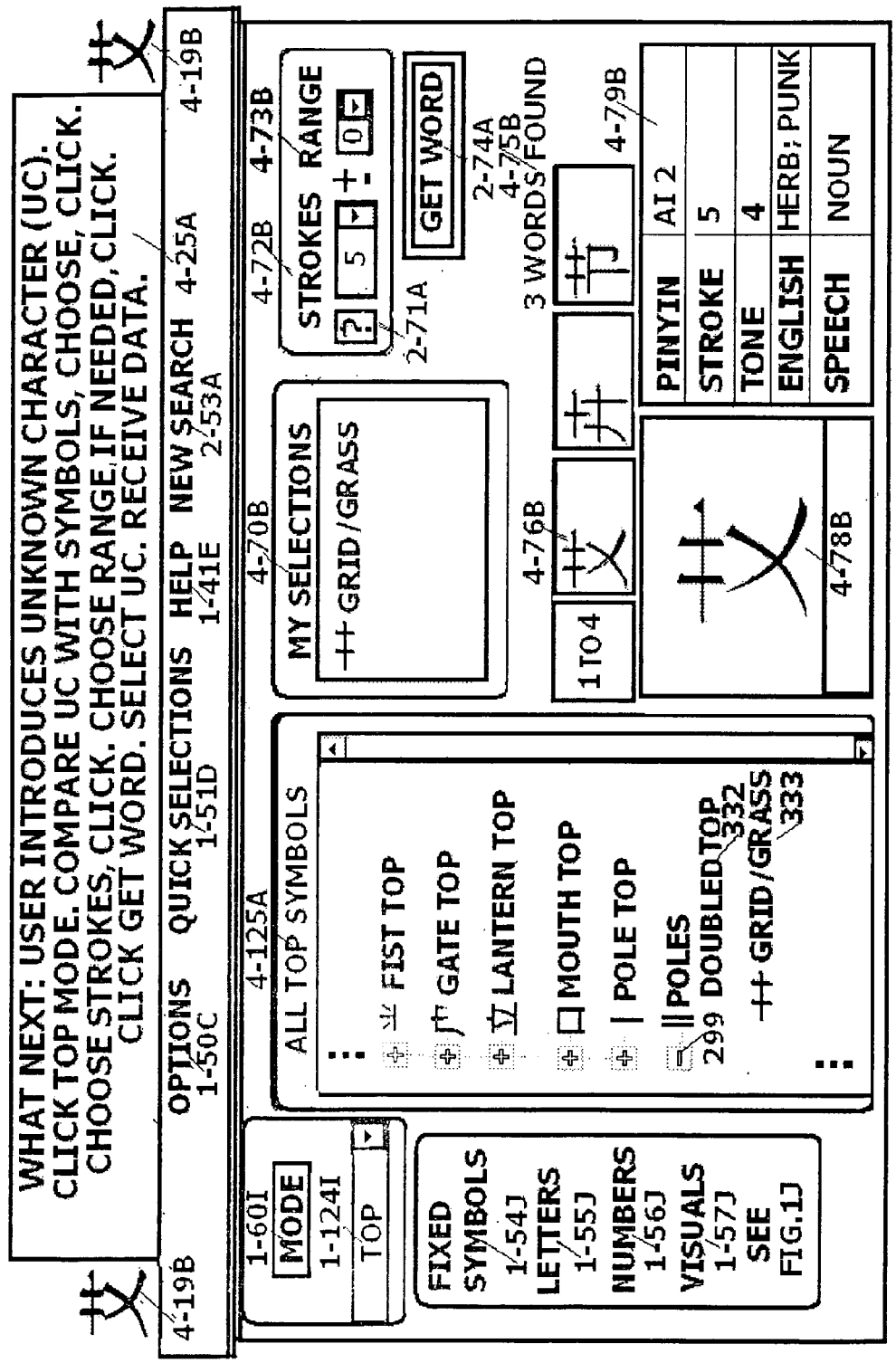

FIGS. 4A and 4B demonstrate a TOP MODE to show the ease of output when a user-introduced, unknown character has a distinctive symbol at its top.

Figure 5:
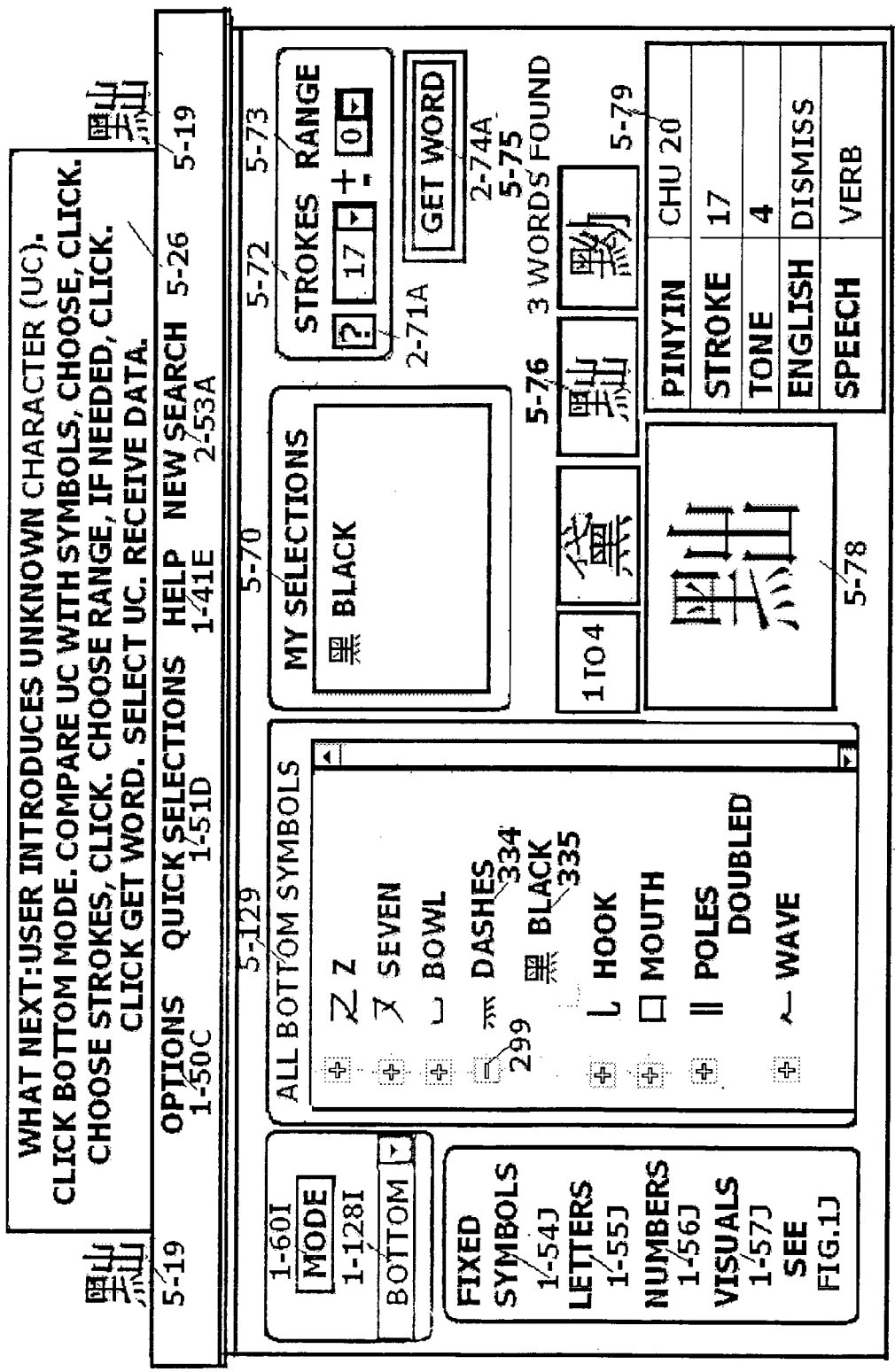

FIG. 5 demonstrates a BOTTOM MODE to show the ease of output when a user-introduced, unknown character displays a distinctive symbol at its bottom.

Figure 6A:
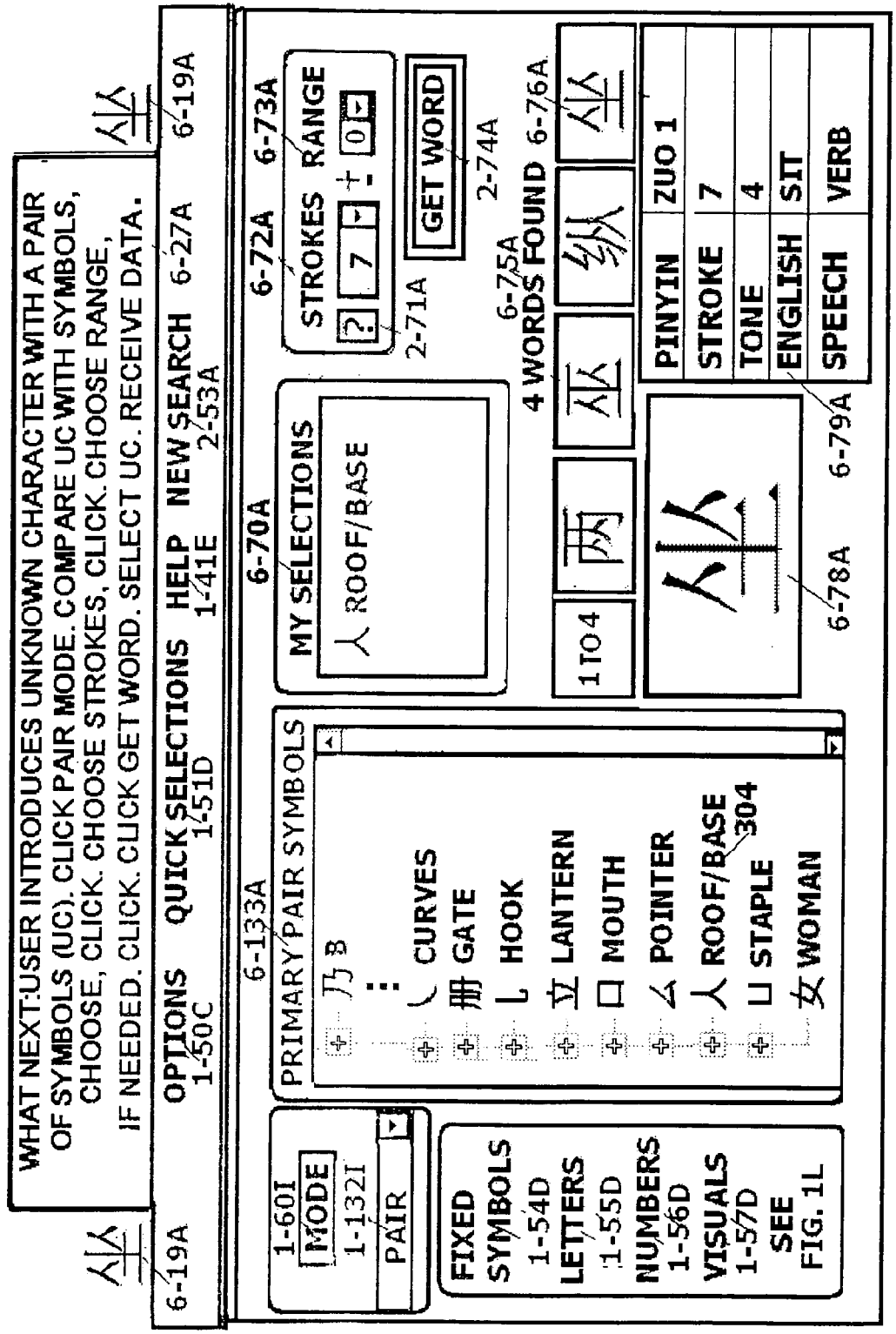
Figure 6B:
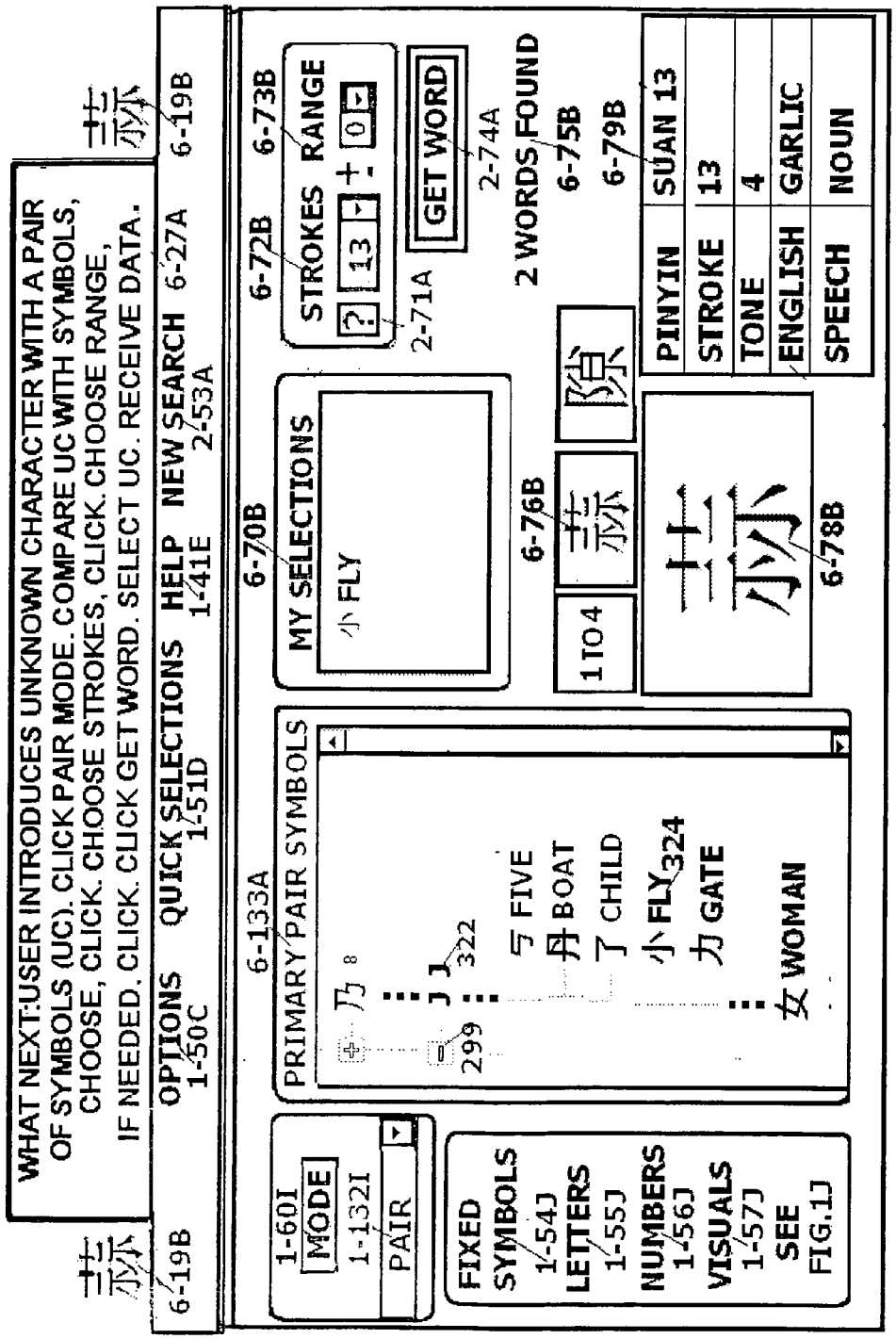
Figure 6C:
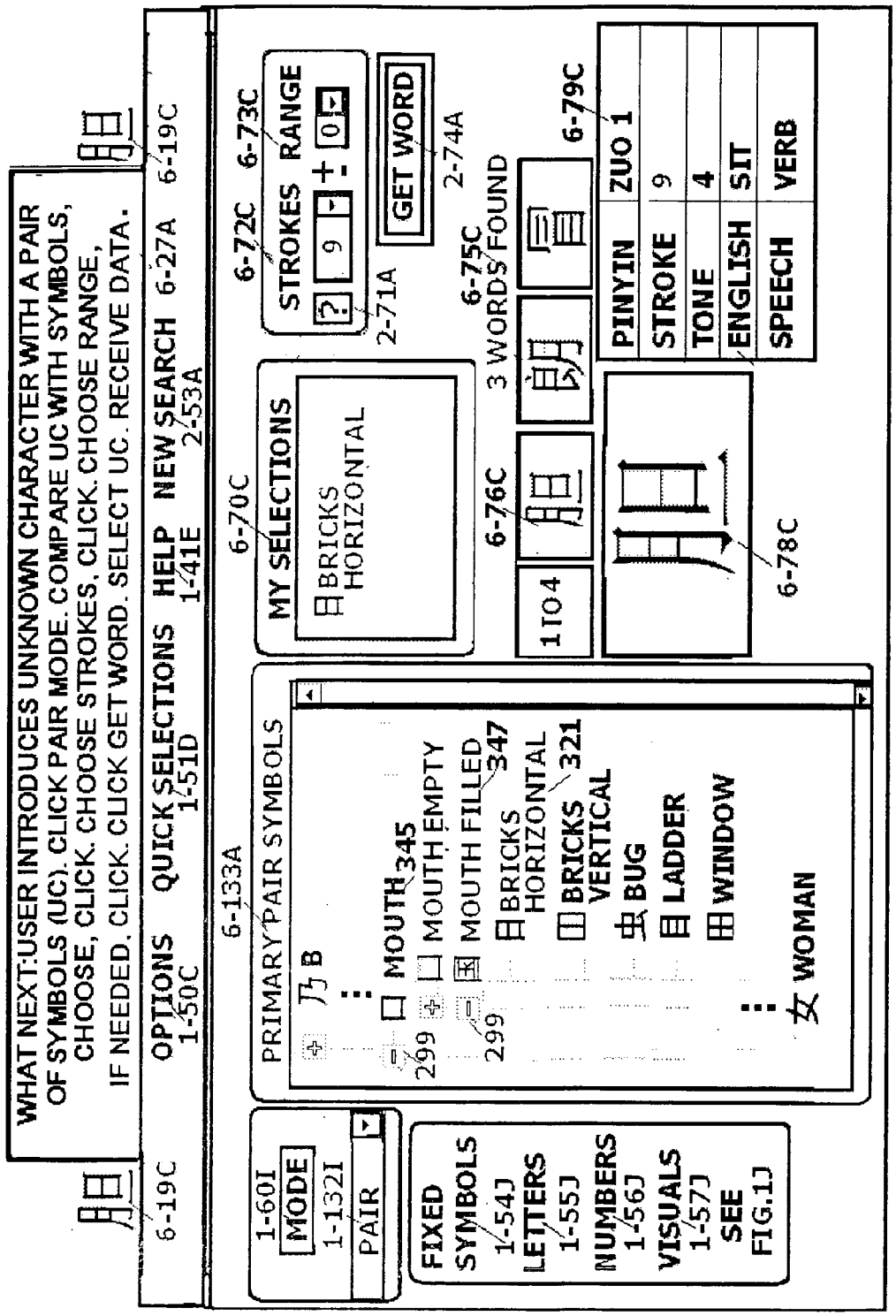

FIGS. 6A to 6C demonstrate a PAIR MODE to show the ease of output when a user-introduced, unknown character displays a pair of the same symbol.

Figure 7A:
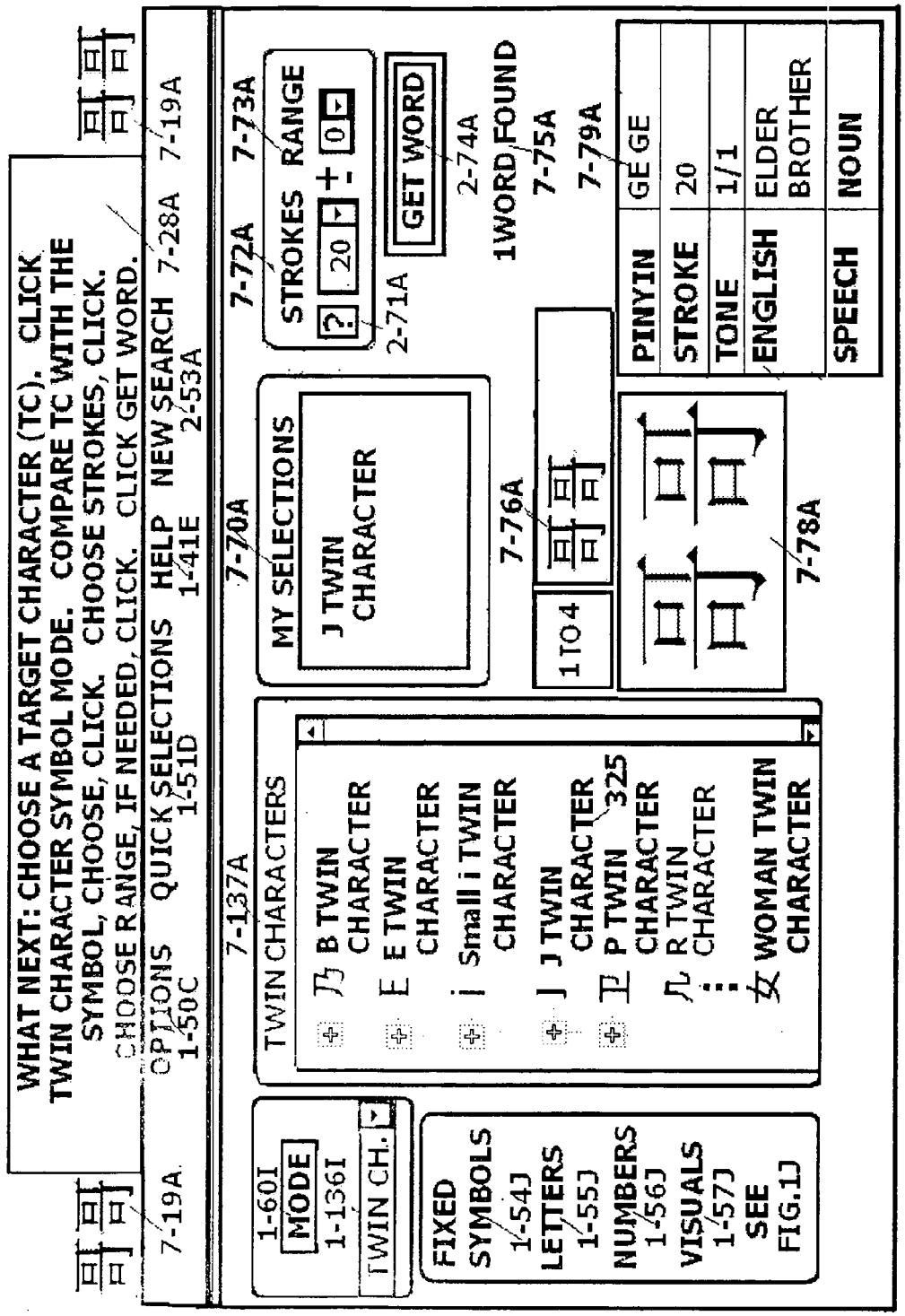
Figure 7B:
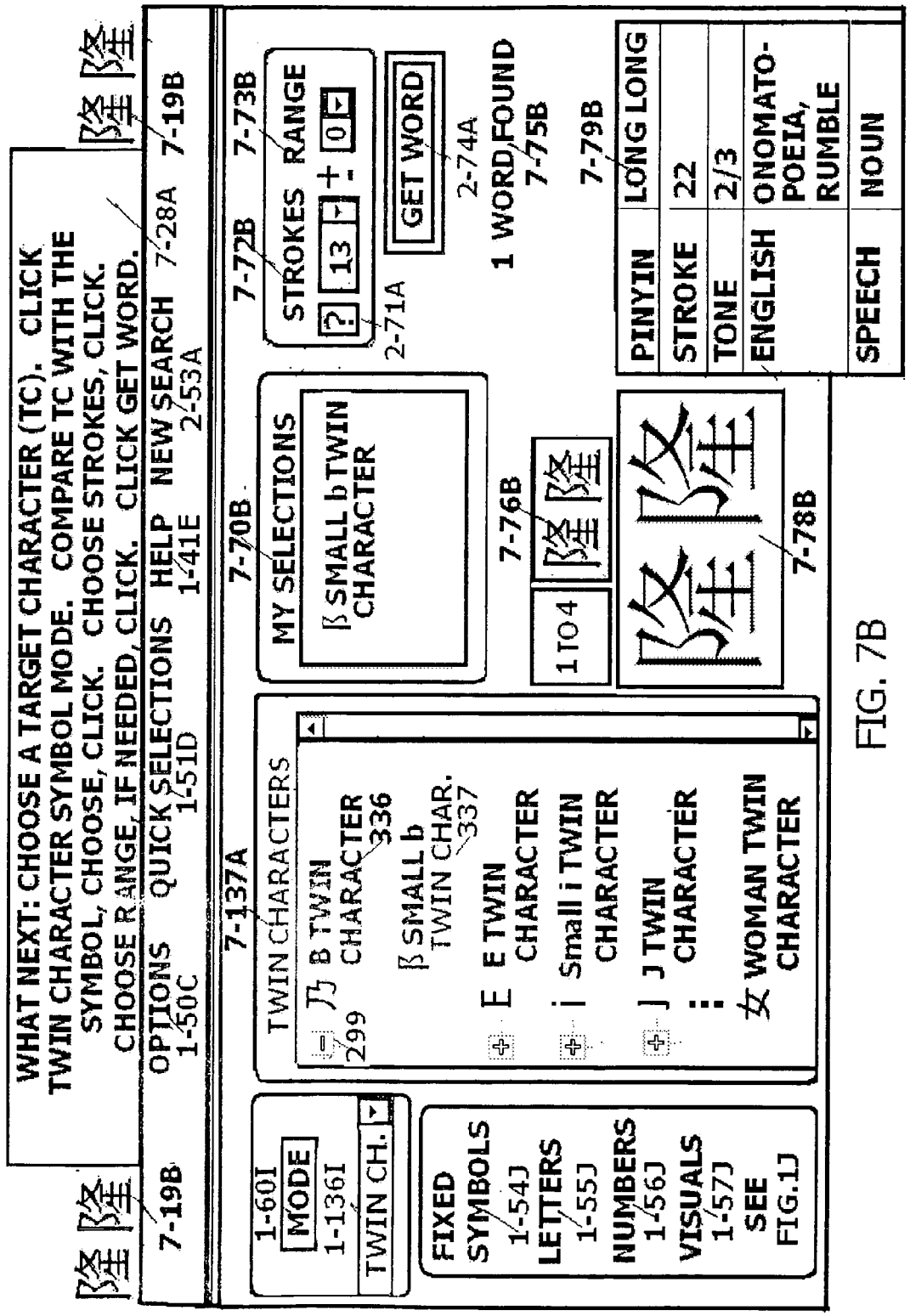

FIGS. 7A and 7B demonstrate a TWIN CHARACTERS MODE to show the ease of output when two identical, unknown characters are introduced by a user.

Figure 8:
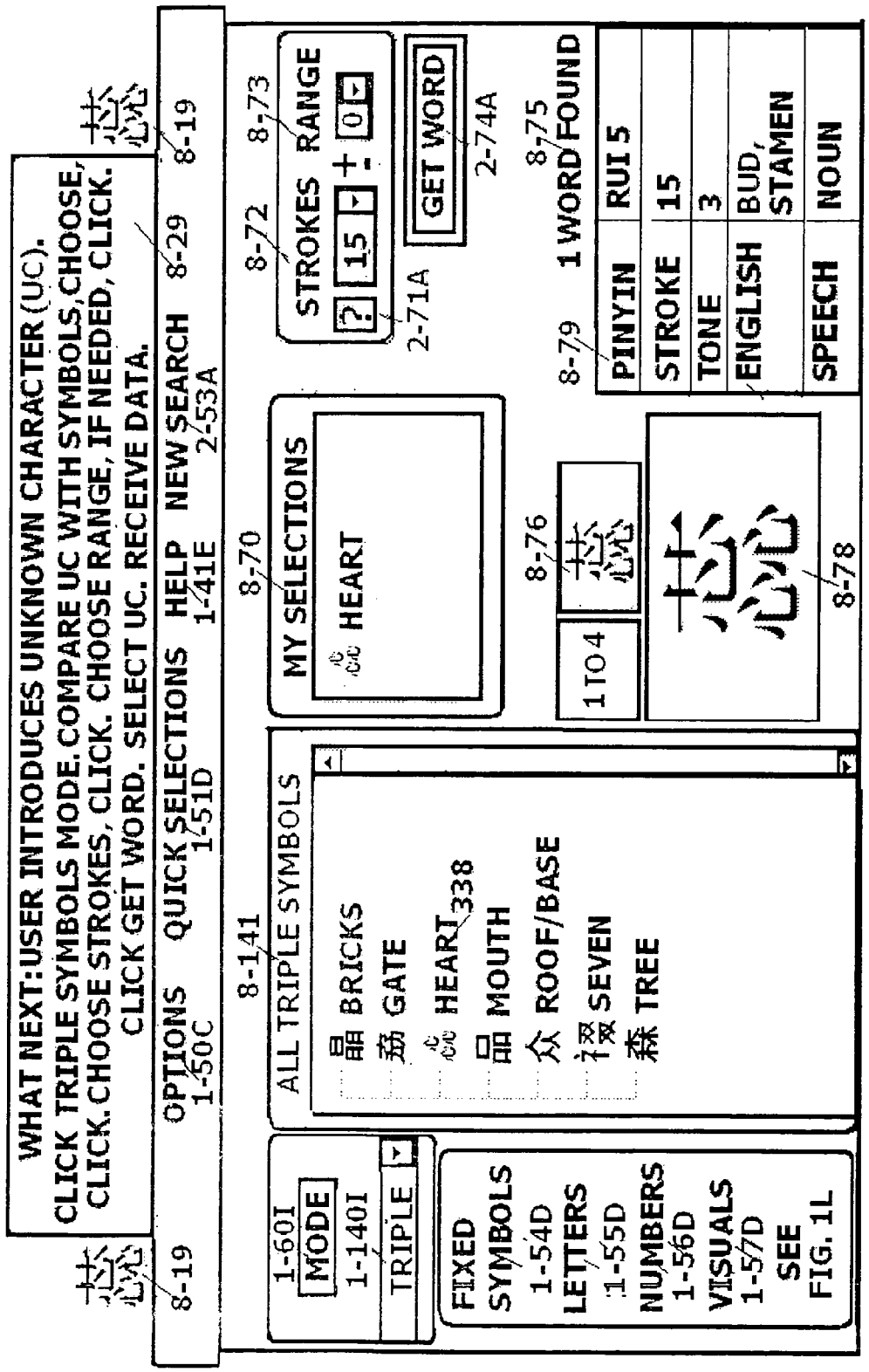

FIG. 8 demonstrates a TRIPLE SYMBOL MODE to show the ease of output when a user-introduced, unknown character displays three of the same symbol.

Figure 9A:
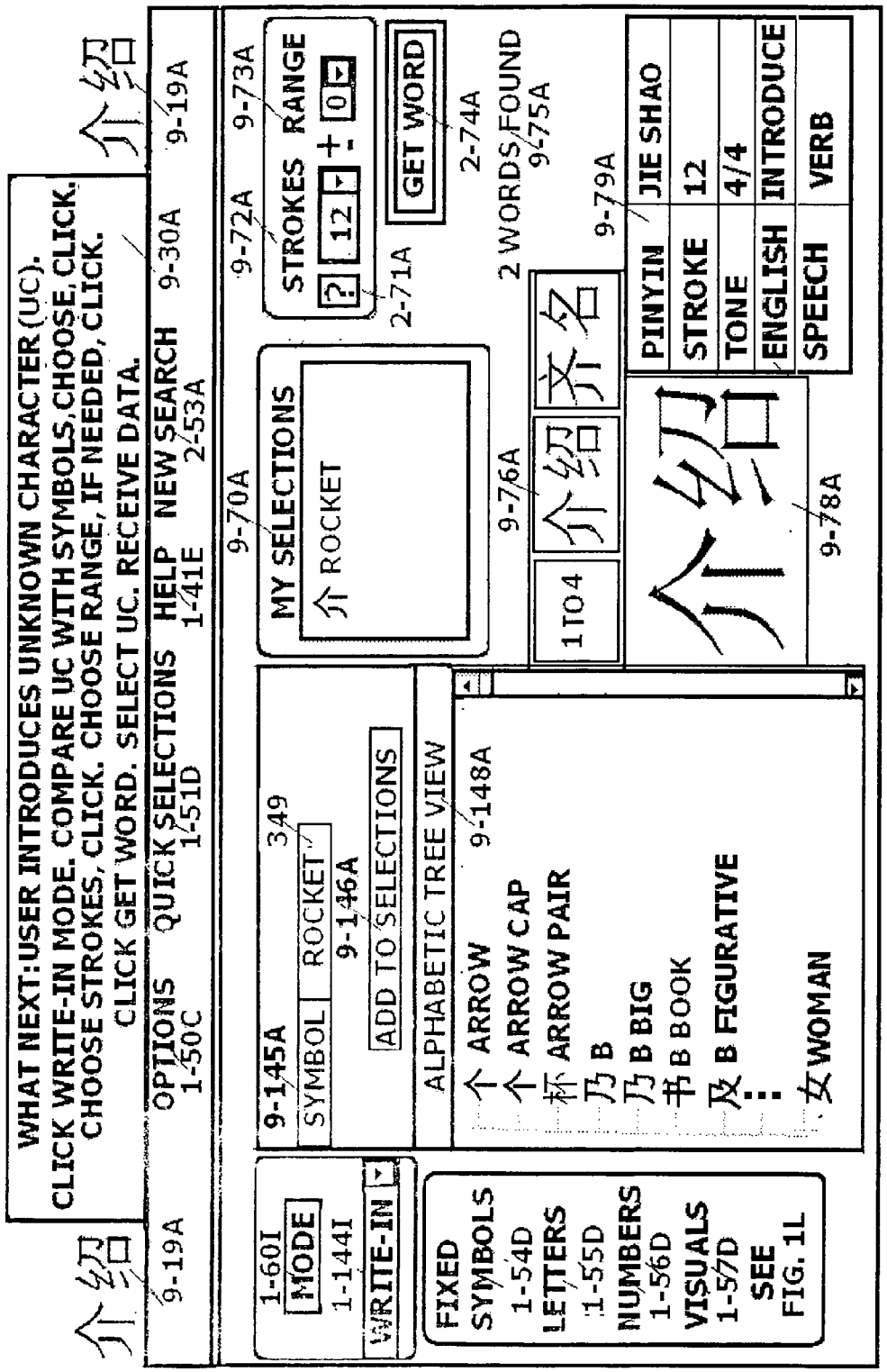
Figure 9B:
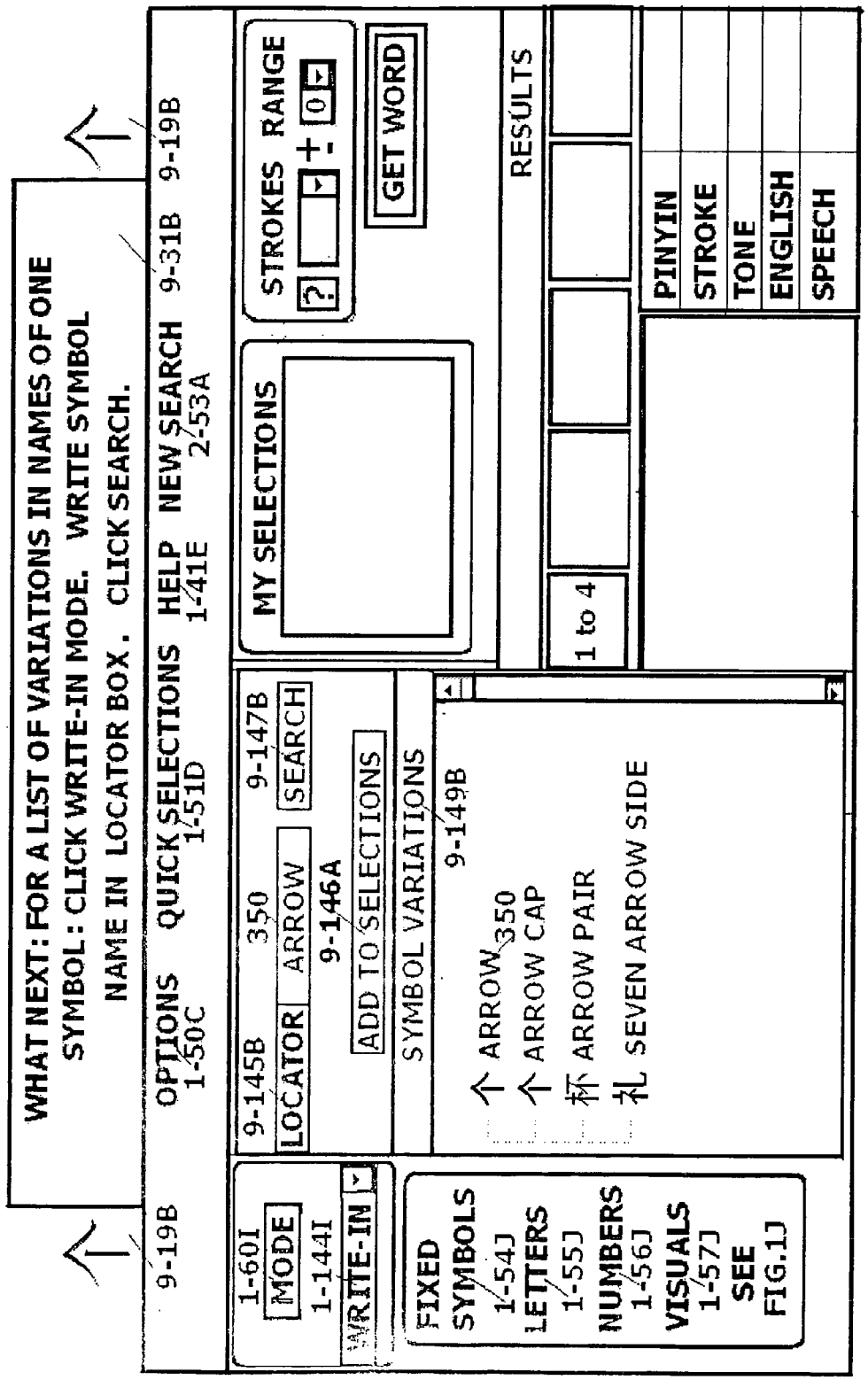
Figure 9C:
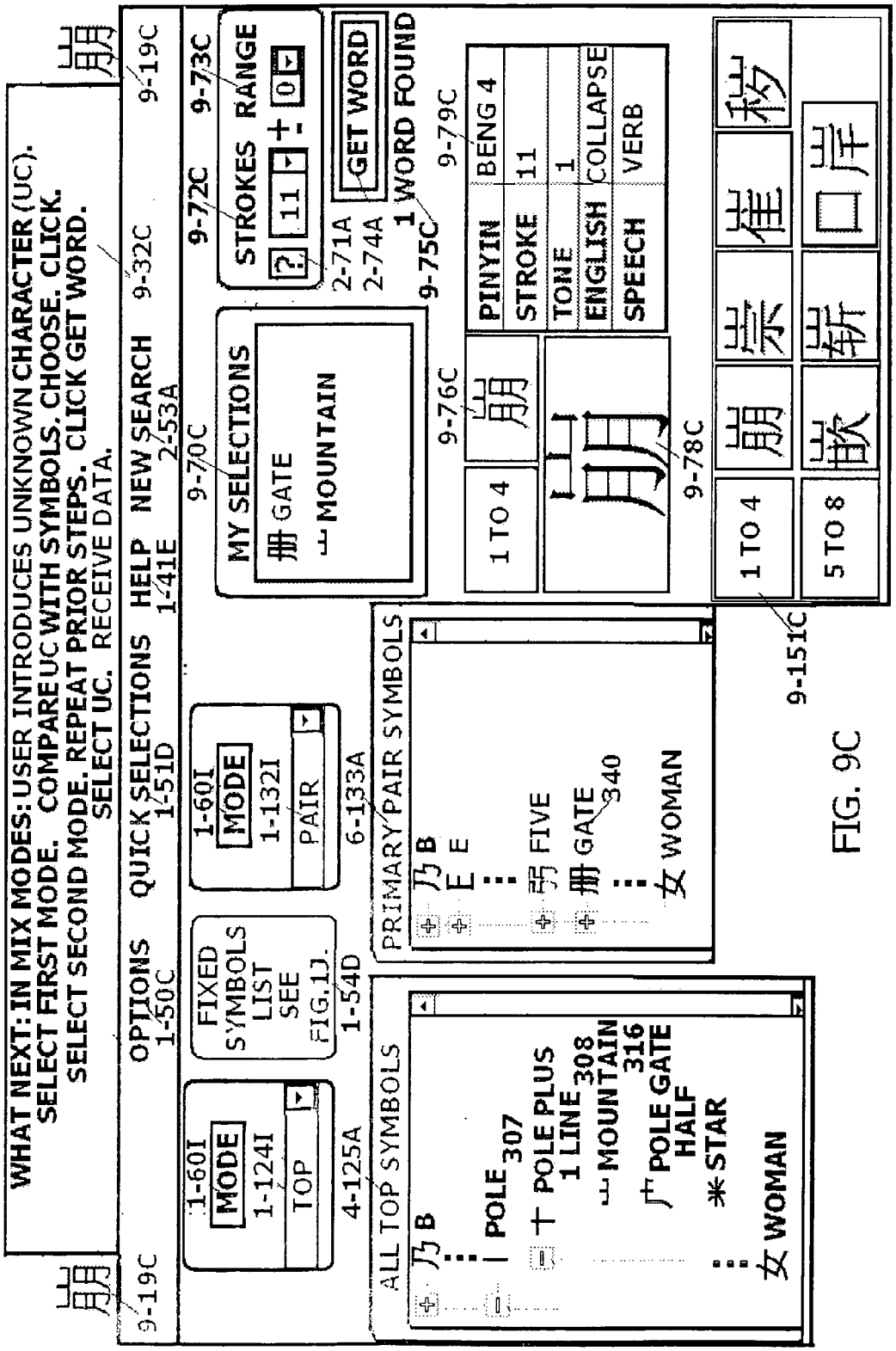

FIGS. 9A to 9C demonstrate a WRITE-IN MODE to show the ease of output when a user-introduced, unknown character displays a symbol, the name of which is known to a user.

FIGS. 10A to 10D demonstrate the use of a BROWSER MODE for the purpose of comparing changes in the use of a given symbol through its various iterations of single, compound, pair, twin character and triple symbol modes.

FIGS. 11A to 11C demonstrate the use of a BROWSER MODE for the purpose of: locating Pinyin words in their exact form, e.g., huan, in their extended form, e.g., huan jia or in their inverted form, e.g., chuang huan; and for studying details of assigned symbols of given Pinyin words as an aid to memorization.

FIGS. 12A and 12B demonstrate the use of the BROWSER MODE as an English/Chinese translation system that locates all versions of an English word (e.g., input build with output of the Pinyin definitions for build as: stature, or build as construction or build as in multi-stoned building, etc.).

Figure 13A:
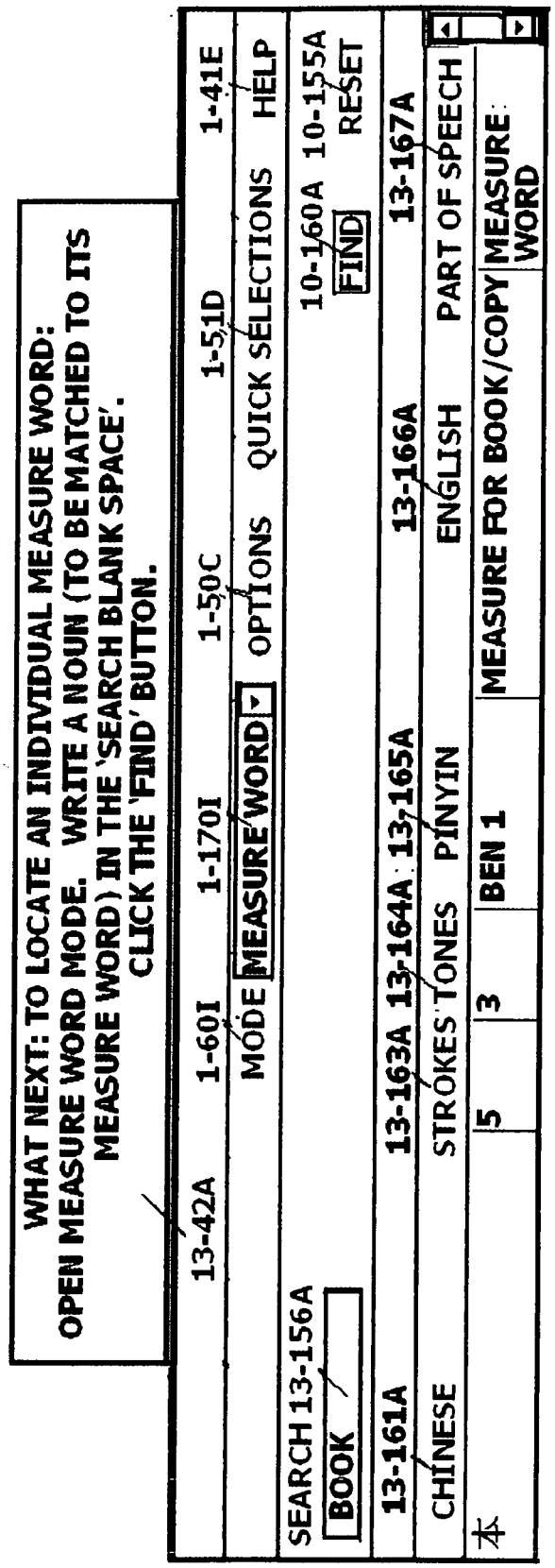

FIGS. 13A and 13B provide specific measure words that must be inserted between a noun and its number modifier, and gives a list of Chinese measure words (not available in hard-backed or electronic dictionaries or grammars).

FIGS. 14A and 14B show how to add and retrieve new, user-generated words.

Figure 15C:
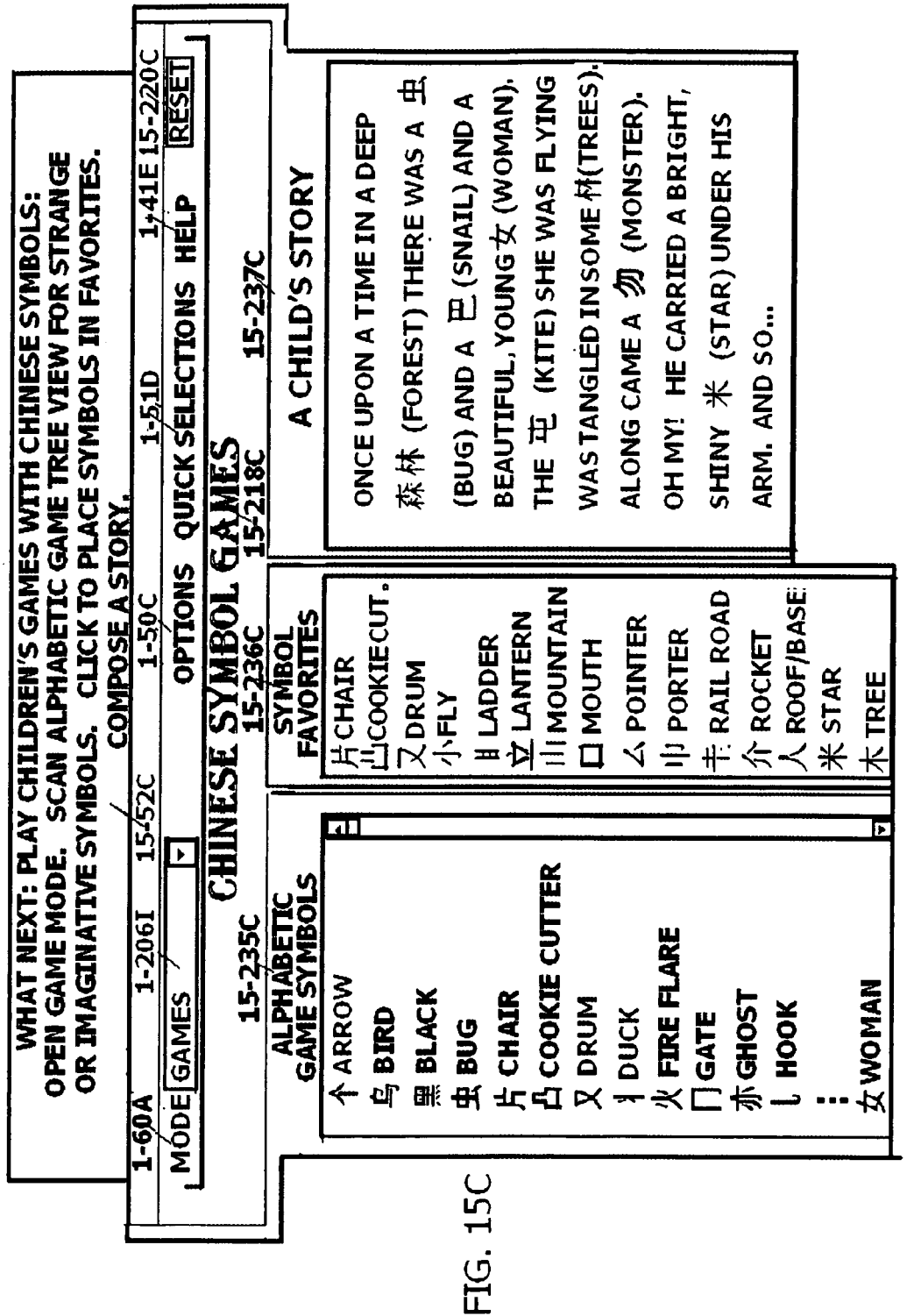

FIGS. 15A to 15C show the use of the system to devise and play adult and children's games.

Figure 16B:
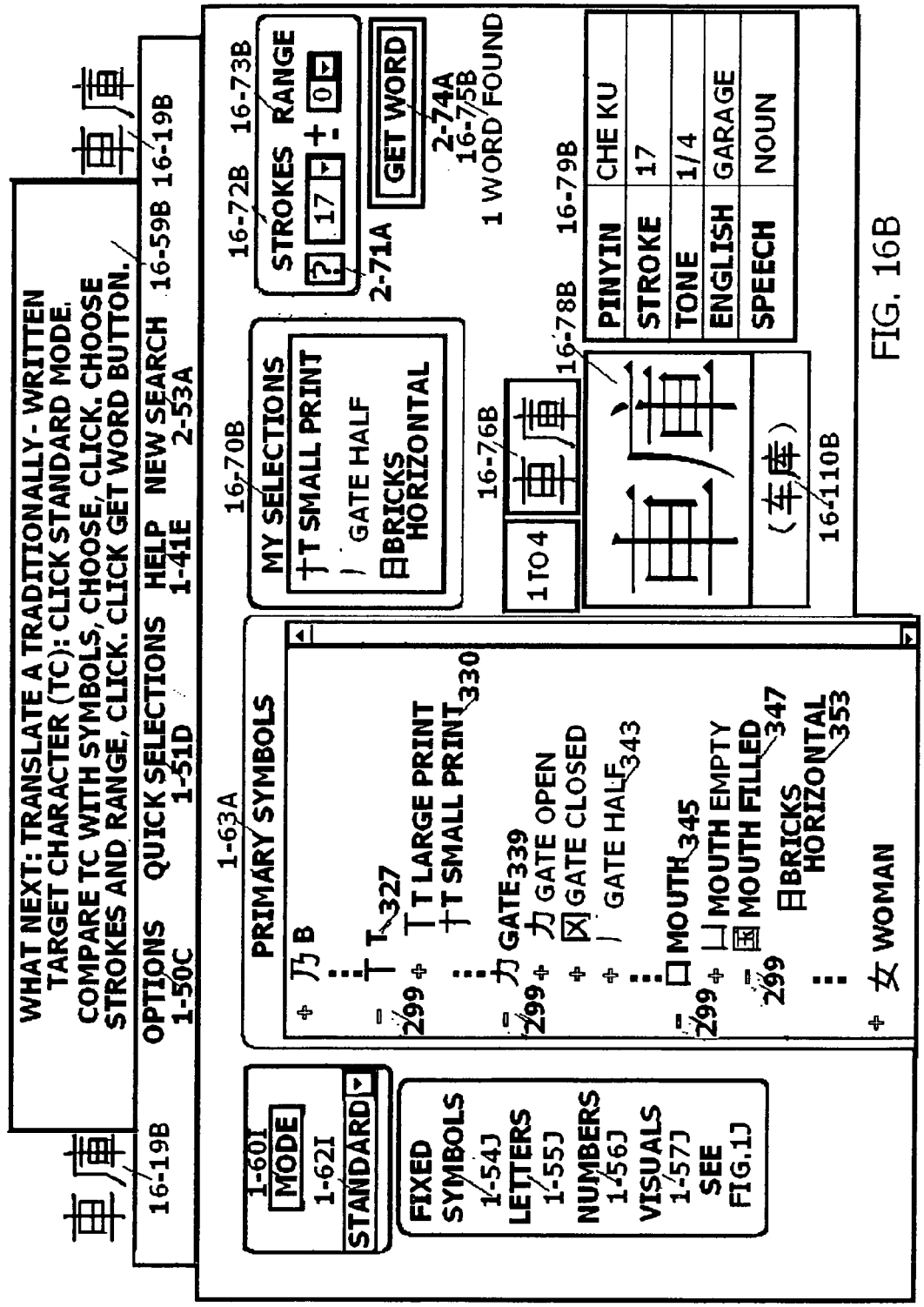

FIGS. 16A and 16B demonstrate the use of the system in outputting character text, Pinyin spelling, stroke number, tone, and translation of other character-based, Oriental writing systems (as demonstrated by a Chinese Traditional Writing System.)

Figure 17A:
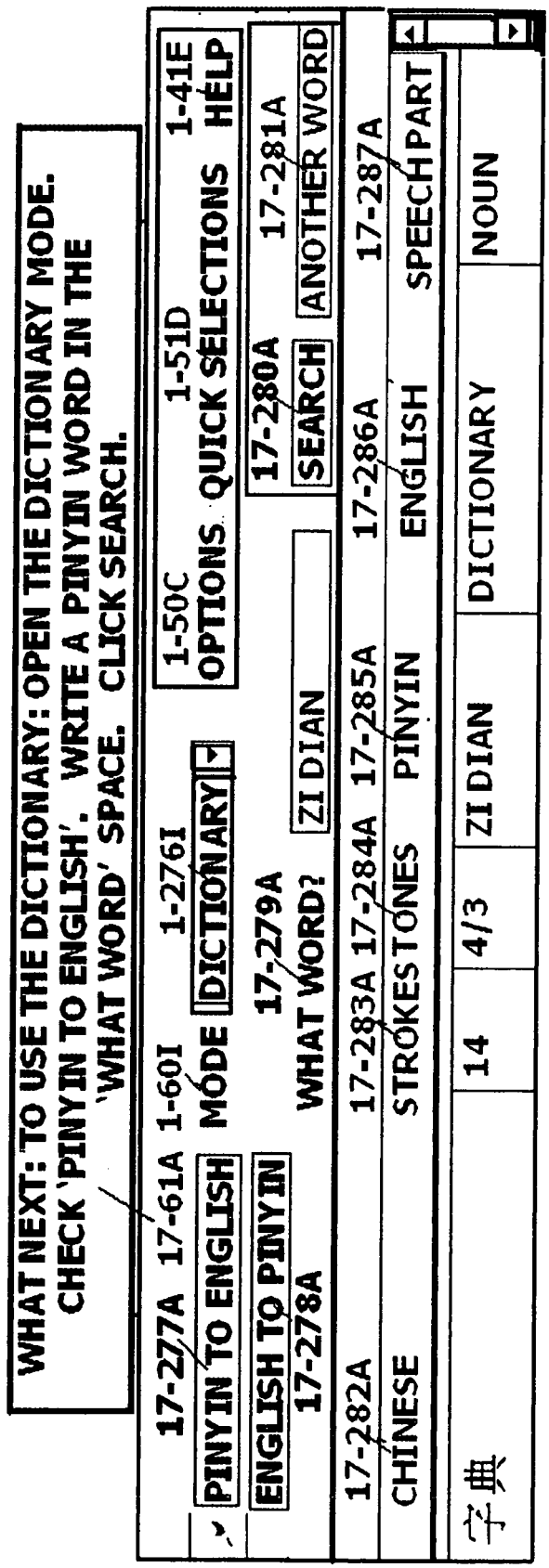
Figure 17B:
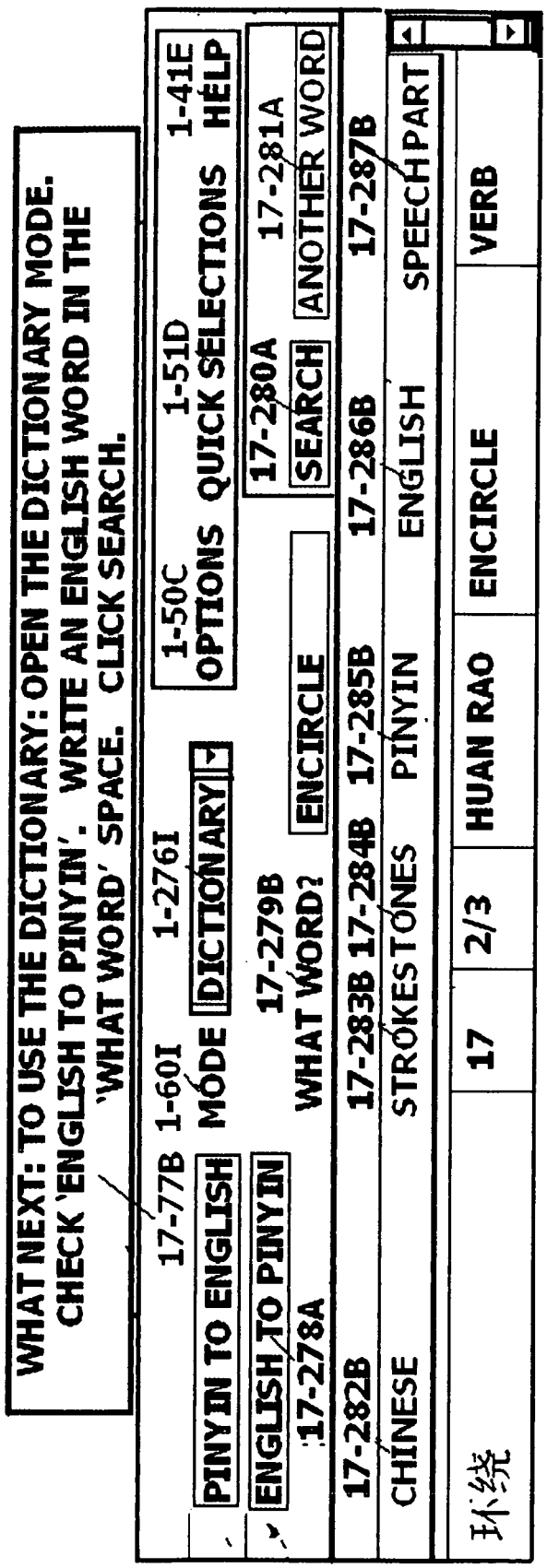

FIGS. 17A and 17B show the use of the system as a dictionary of English to Chinese Pinyin and vice versa.

DRAWINGS

Reference Numerals

The numbering system is coded as follows: the first digit refers to a figure number; succeeding digits refer to a specific reference; and the last letter refers to a sequence of the figure (e.g. number 1-41E refers to reference number 41 of FIG. 1E). The three digit numbers that begin with 299 refer to a minus sign and to specific primary and secondary symbols.

| | | | |
|---|---|---|---|
| 1-41E | help | 1-46E | help topics |
| 1-48F | what next: strokes | 1-50C | options |
| 1-51D | quick selections | 1-54J | fixed symbols |
| 1-55J | letter symbols | 1-56J | number symbols |
| 1-57J | visual symbols | 1-60I | mode drop-down menu |
| 1-62I | standard mode | 1-64D | bookmarks |
| 1-65D | select (bookmarks) | 1-66D | modify list |
| 1-67D | last 25 selections | 1-68D | select selections |
| 1-69D | dose selections | 1-90C | system settings |
| 1-91C | image size | 1-92C | magnification |
| 1-93C | default strokes/range | 1-94C | extra wide display |
| 1-95C | other languages | 1-96C | other writing systems |
| 1-97C | expand all | 1-98C | collapse all |
| 1-99C | save | 1-100C | cancel |
| 1-101F | "Don't be Spooked by Strokes" | 1-102G | maxim |
| 1-103G | strokes of one | 1-104G | strokes of two |
| 1-105G | strokes of three | 1-106H | strokes of four |
| 1-107H | strokes of five | 1-108H | strokes of six |
| 1-109H | strokes of seven | 1-110C | symbol examples |
| 1-120I | side mode | 1-124I | top mode |
| 1-128I | bottom mode | 1-132I | pair mode |
| 1-136I | twin character mode | 1-140I | triple symbol mode |
| 1-144I | write-in mode | 1-154I | browser mode |
| 1-170I | measure word mode | 1-180I | user-generated mode |

-continued

| | | | |
|---|---|---|---|
| 1-206I | games mode | 1-272K | symbols fixes (fixed symbols) |
| 1-273K | lettres (letters) | 1-274K | nombres (numbers) |
| 1-275K | visuels (visuals) | 1-276I | dictionary mode |
| 1-500A | electronic device | 1-502A | memory |
| 1-504A | central processing unit | 1-506A | user interface |
| 1-508A | display unit | 1-512A | keyboard |
| 1-610B | start | 1-612B | select mode |
| 1-614B | modes: standard, side, top, bottom, pair, twin, triple, write-in | 1-618B | input symbol |
| 1-620B | input stroke number | 1-622B | input (optional) range |
| 1-624B | display candidate list of characters | 1-626B | input additional symbols (optional) |
| 1-630B | receive character text | 1-632B | receive Pinyin |
| 1-634B | receive translation | 1-636B | end |
| 1-638B | input symbol | 1-640B | input stroke number |
| 1-642B | modes: browser, measure word, user-generated, games, dictionary | 1-644B | select symbol data, Pinyin data, English data |
| 1-645B | perform search (on user-introduced word) | 1-647B | yes |
| 1-648B | no | 1-649B | receive character text |
| 2-19A to 2-19I | unknown character | 2-21A | what next: standard |
| 2-22G and 2-22H | what next: translation | 2-23I | what next: character phrase |
| 2-53A | new search button | 2-63A | primary symbols tree view |
| 2-70A to 2-70I | my selections | 2-71A | stroke question mark |
| 2-72A to 2-72I | strokes | 2-73A to 2-73I | range |
| 2-74A | GET WORD | 2-75A to 2-75I | results |
| 2-76A to 2-76I | candidate character texts | 2-78A to 2-78I | enlarged character text |
| 2-79A to 2-79I | translation | 2-80G | translation bin |
| 2-81G | down arrow | 2-82G | 1st character text hold |
| 2-83G | empty (advisory) | 2-84G | clear bin |
| 2-85H | 2$^{nd}$ character text hold | 2-86H | data (advisory) |
| 2-87H | coupled translation | 2-88H | coupled text |
| 2-89H | dose coupled translation | | |
| 3-19A and 3-19B | unknown character | 3-24A | what next: side |
| 3-70A and 3-70B | my selections | 3-72A and 3-72B | strokes |
| 3-73A and 3-73B | range | 3-75A and 3-75B | results |
| 3-76A and 3-76B | candidate character texts | 3-78A and 3-78B | enlarged character text |
| 3-79A and 3-79B | translation | 3-121A | primary side symbols tree view |
| 4-19A and 4-19B | unknown character | 4-25A | what next: top mode |
| 4-70A and 4-70B | my selections | 4-72A and 4-72B | strokes |
| 4-73A and 4-73B | range | 4-75A and 4-75B | results |
| 4-76A and 4-76B | candidate character texts | 4-78A to 4-78B | enlarged character text |
| 4-79A and 4-79B | translation | 4-125A | all top symbols tree view |
| 5-19 | unknown character | 5-26 | what next: bottom mode |
| 5-70 | my selections | 5-72 | stroke |
| 5-73 | range | 5-75 | results |
| 5-76 | candidate character texts | 5-78 | enlarged character text |
| 5-79 | translation | 5-129 | all bottom symbols tree view |
| 6-19A to 6-19C | unknown character | 6-27A | what next: pair mode |
| 6-70A to 6-70C | my selections | 6-72A to 6-72C | strokes |
| 6-73A to 6-73C | range | 6-75A to 6-75C | results |
| 6-76A to 6-76C | candidate character texts | 6-78A to 6-78C | enlarged character text |
| 6-79A to 6-79C | translation | 6-133A | primary pair symbols tree view |
| 7-19A and 7-19B | unknown character | 7-28A | what next: twin character mode |
| 7-70A and 7-70B | my selections | 7-72A and 7-72B | stroke |
| 7-73A and 7-73B | range | 7-75A and 7-75B | results |
| 7-76A and 7-76B | candidate character texts | 7-78A and 7-78B | enlarged character texts |
| 7-79A and 7-79B | translation | 7-137A | twin characters tree view |
| 8-19 | unknown character | 8-29 | what next: triple symbols mode |
| 8-70 | my selections | 8-72 | strokes |
| 8-73 | range | 8-75 | results |
| 8-76 | candidate character texts | 8-78 | enlarged character text |
| 8-79 | translation | 8-141 | all triple symbols tree view |
| 9-19A to 9-19C | unknown character | 9-30A | what next: write-in mode |
| 9-31B | what next: symbol variations list | 9-32C | what next: mixed modes |
| 9-70A and 9-70C | my selections | 9-72A and 9-72C | strokes |
| 9-73A and 9-73C | range | 9-75A and 9-75C | results |
| 9-76A and 9-76C | candidate characters | 9-78A and 9-78C | enlarged character |
| 9-79A and 9-79C | translation | 9-145A AND 9-145B | locator blank space |
| 9-146A | add to selections | 9-147B | search button |
| 9-148A | alphabetic tree view | 9-149B | symbol variations tree view |
| 9-151C | candidate characters, 2$^{nd}$ group | | |
| 10-33A | what next: browser symbol data | 10-155A | reset (browser button) |
| 10-156A to 10-156D | search (blank space) | 10-157A | in column symbol data |
| 10-160A | find (browser button) | 10-161A to 10-161D | Chinese |
| 10-162A to 10-162D | locator | 10-163A to 10-163D | strokes |
| 10-164A to 10-164D | tones | 10-165A to 10-165D | Pinyin |
| 10-166A to 10-166D | English | 10-167A to 10-167D | part of speech |
| 11-34A | what next: browser Pinyin exact | 11-35B | what next: browser Pinyin extended |
| 11-36C | what next: browser Pinyin symbols | 11-156A to 11-156D | search blank space |

-continued

| | | | |
|---|---|---|---|
| 11-158A | in column Pinyin data | 11-161A to 11-161C | Chinese |
| 11-162C | symbols | 11-163A to 11-163C | strokes |
| 11-164A to 11-164C | tones | 11-165A to 11-165C | Pinyin |
| 11-166A to 11-166C | English | 11-167A to 11-167C | part of speech |
| 11-168A | exact word | 11-169A | extended word |
| 11-178C | show symbols | | |
| 12-39A | what next: browser English exact | 12-40B | what next: browser English extended |
| 12-156A and 12-156B | search blank space | 12-159A | in column English data |
| 12-161A and 12-161B | Chinese | 12-163A and 12-163B | strokes |
| 12-164A and 12-164B | tones | 12-165A and 12-165B | Pinyin |
| 12-166A and 12-166B | English | 12-167A and 12-167B | part of speech |
| 13-42A | what next: measure word individual | 13-43B | what next: measure word list |
| 13-156A | search blank space | 13-161A and 13-161B | Chinese |
| 13-163A and 13-163B | strokes | 13-164A and 13-164B | tones |
| 13-165A and 13-165B | Pinyin | 13-166A and 13-166B | English |
| 13-167A and 13-167B | part of speech | | |
| 14-44A | what next: user-generated word | 14-45B | what next: retrieve user-generated word |
| 14-156B | search (blank space) | 14-161B | Chinese |
| 14-163B | strokes | 14-164B | tones |
| 14-165B | Pinyin | 14-166B | English |
| 14-167B | part of speech | 14-181A | highlight Pinyin word #1 |
| 14-182A | blank space #1 | 14-183A | Pinyin search #1 |
| 14-184A | Pinyin #1 | 14-185A | Chinese #1 |
| 14-186A | Strokes #1 | 14-187A | Tones #1 |
| 14-188A | English #1 | 14-189A | part of speech #1 |
| 14-190A | highlight Pinyin word #2 | 14-191A | blank space #2 |
| 14-192A | Pinyin search #2 | 14-193A | Pinyin #2 |
| 14-194A | Chinese #2 | 14-195A | strokes #2 |
| 14-196A | tones #2 | 14-197A | English #2 |
| 14-198A | part of speech #2 | 14-199A | combine words #3 |
| 14-200A | Pinyin #3 | 14-201A | Chinese #3 |
| 14-202A | strokes #3 | 14-203A | tones #3 |
| 14-204A | English #3 | 14-205A | part of speech #3 |
| 14-234A | save | 14-235A | reset |
| 15-49A | what next: word game list | 15-52C | what next: a child's story |
| 15-207A | game search blank space | 15-208A | game Pinyin data |
| 15-209A | find game | 15-210A | reset word game |
| 15-215A | exact word game | 15-216A | extended word game |
| 15-218C | Chinese symbol games | 15-220C | reset child's game |
| 15-221A | game Chinese | 15-222A | game strokes |
| 15-223A | game tones | 15-224A | game Pinyin |
| 15-225A | game English | 15-226A | game part of speech |
| 15-230B | the tang story | 15-231B | in Pinyin |
| 15-232B | in Chinese characters | 15-233B | in English |
| 15-235C | alphabetic game symbols | 15-236C | symbol favorites |
| 15-237C | a child's story | | |
| 16-19B | unknown character | 16-20A | ecriture inconnu (unknown character) |
| 16-58A | en Française (what next: French) | 16-59B | what next: traditional characters |
| 16-70B | my selections | 16-72B | strokes |
| 16-73B | range | 16-75B | results |
| 16-76B | candidate character texts | 16-78B | enlarged character text |
| 16-79B | translation | 16-255A | symboles principales (primary symbols) |
| 16-256A | choisier (choices) | 16-257A | selection (selection) |
| 16-258A | aider (help) | 16-259A | réinitialiser (new search) |
| 16-260A | mes selections (my selections) | 16-261A | chiffre |
| 16-262A | gamme | 16-263A | confirmer (result) |
| 16-264A | texts candidates (candidate texts) | 16-265A | grand dessin (enlarged haracter) |
| 16-266A | traduction (translation) | 16-267A | question de ciffre |
| 16-270A | rechercher (get word) | | |
| 17-47A and 17-47B | what next: (dictionary) | 17-277A | Pinyin to English |
| 17-278A | English to Pinyin | 17-279A and 17-279B | what word? |
| 17-280A | search | 17-281A | another word |
| 17-282A and 17-282B | Chinese | 17-283A and 17-283B | strokes |
| 17-284A and 17-284B | tones | 17-285A and 17-285B | Pinyin |
| 17-286A and 17-286B | English | 17-287A and 17-287B | part of speech |
| 299 | minus sign | 300 | staple (primary) |
| 301 | woman (primary) | 302 | woman side (primary) |
| 303 | fist (primary) | 304 | roof/base (primary) |
| 305 | roof/base pair (primary) | 306 | person (secondary) |
| 307 | pole (primary) | 308 | pole plus 1 line (secondary) |
| 309 | porter gate (secondary) | 310 | pole plus 2 lines (secondary) |
| 311 | bricks extended (secondary) | 312 | earth (secondary) |
| 313 | pole plus 3 lines (secondary) | 314 | king (secondary) |
| 315 | pole top (primary) | 316 | mountain (secondary) |
| 318 | Z letter (primary) | 319 | bricks vertical (secondary) |
| 320 | bug (secondary) | 322 | J letter (primary) |
| 323 | thumb mouth (secondary) | 324 | fly (secondary) |
| 325 | J twin character (primary) | 326 | pointer (primary) |

-continued

| | | | |
|---|---|---|---|
| 327 | T side (primary) | 328 | T figurative (secondary) |
| 329 | T letter (primary) | 330 | T small print (secondary) |
| 331 | lantern top (primary) | 332 | pole doubled (primary) |
| 333 | grid/grass (secondary) | 334 | dashes (primary) |
| 335 | black (secondary) | 336 | B twin character (primary) |
| 337 | small b twin character (secondary) | 338 | heart (secondary) |
| 339 | B lettres (B letter) (primary) | 340 | gate (primary) |
| 343 | livre (book) (secondary) | 344 | dashes (primary) |
| 345 | mouth (primary) | 347 | mouth filled (secondary) |
| 353 | bricks horizontal (secondary) | | |

DESCRIPTIONS OF EMBODIMENTS

Figure 1A:
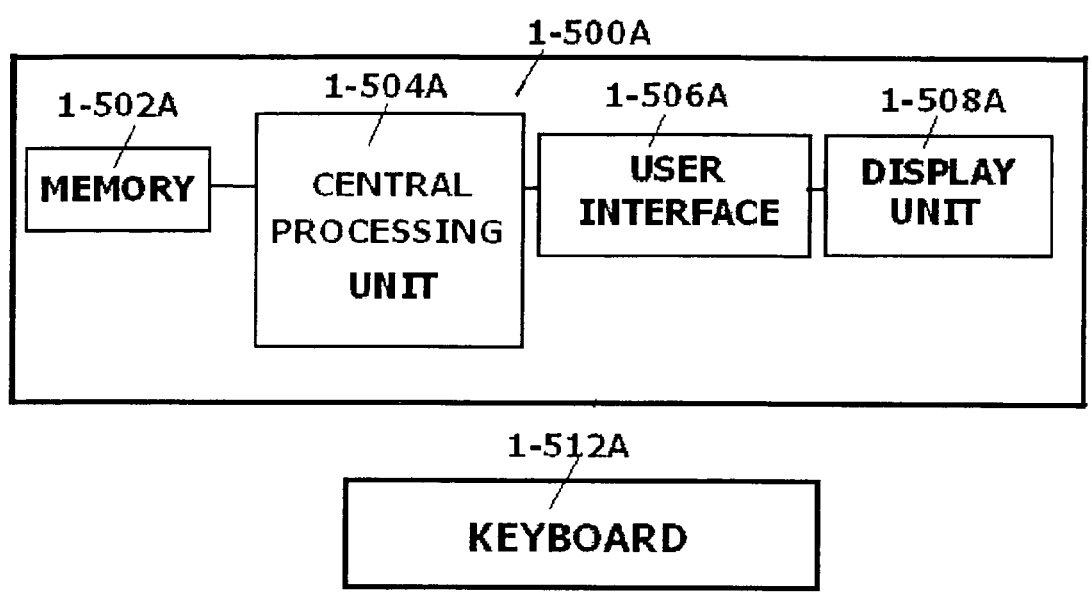
FIG. 1A is an example of an electronic device used to output (for an unknown character brought by a user using an electronic device), a Chinese (or other Oriental) character text, Pinyin spelling, and translation into English (or another language).

FIG. 1A—Electronic Device:

FIG. 1A illustrates an example of a structure of an electronic device 1-500A used to output Chinese (or other Oriental) character texts, Pinyin words, and English (or other language) translations. The electronic device 1-500A may be, for example, a computer, a laptop, a PDA (Personal Digital Assistant) or a mobile communication device. The electronic device 1-500A may also be a combination of two electronic devices, such as a computer with a mobile communication device connected to the computer.

The electronic device 1-500A comprises a central processing unit 1-504A to control the operation of the electronic device 1-500A.

The electronic device 1-500A further comprises a user interface 1-506A connected to the central processing unit 1-504A. The user interface 1-506A may comprise at least one display unit 1-508A for displaying information. The user interface 1-506A may also comprise a keyboard or another user input device. The user interface 1-506A may also be implemented with a touch sensitive display.

The electron device 1-500A further comprises a memory unit 1-502A to store data required for the operation of the electronic device 1-500A. The memory unit 1-502A may store applications used in the electronic device 1-500A but also any information input to the electronic device 1-500A.

The electronic device 1-500A may also comprise a communication unit to communicate with other electronic devices. Said communication unit may transmit and receive information using a wireless communication system. Alternatively, the electronic device 1-500A may be connected to a fixed network.

In this example, the interface 1-506C comprises a computer keyboard 1-512A. The USER INTERFACE 1-506A may also comprise other components, but these are omitted from this example for the sake of clarity. However, it should be appreciated that user interfaces of other types are also possible. Criteria are displayed in the order that they are entered. Criteria in the input field may be deleted and new criteria added by the user. (FIGS. 2A through 17B show examples of figures using a user interface 1-506A of an electronic device 1-500A.)

Figure 1B:
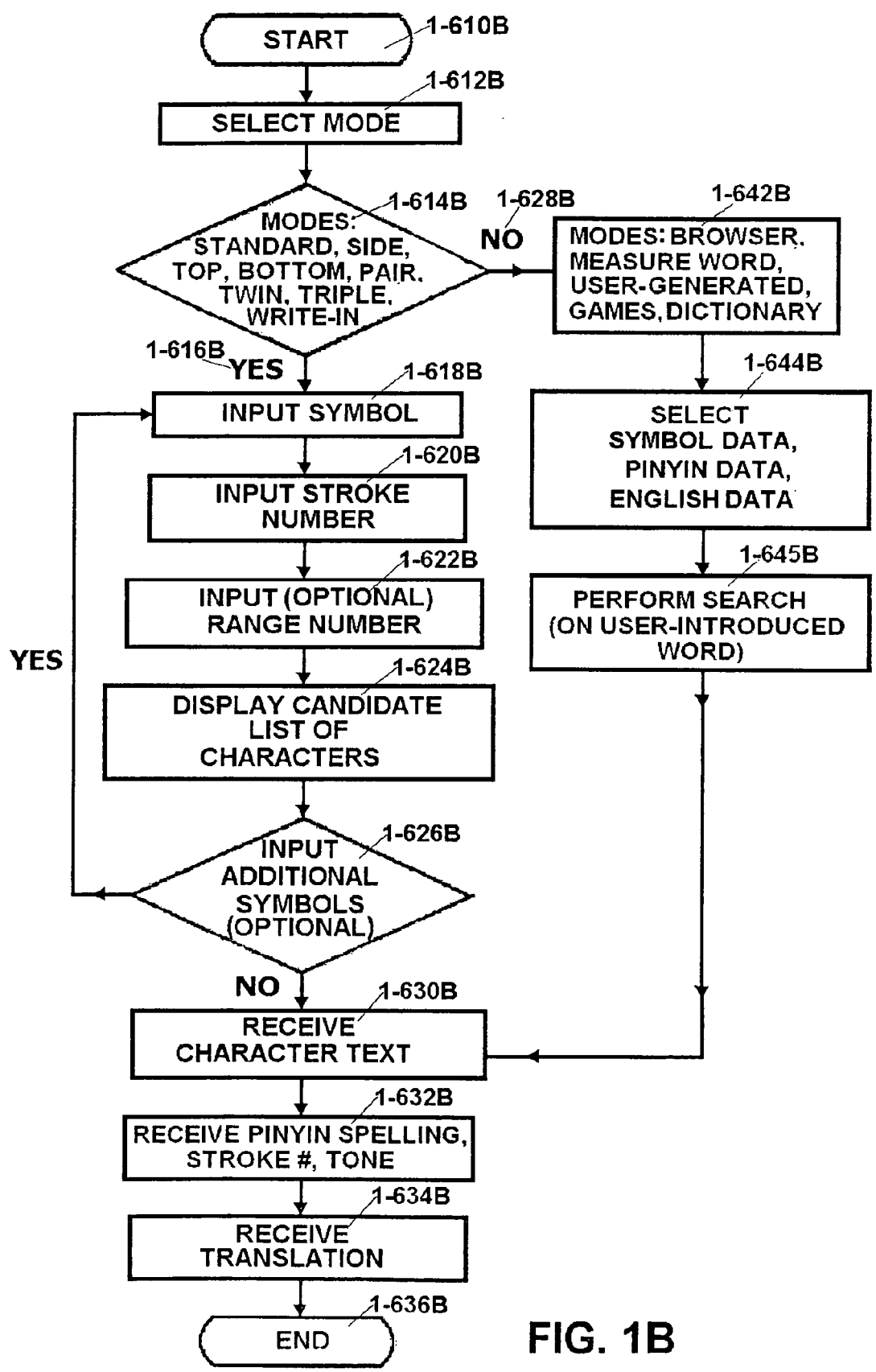
FIG. 1B is a flow chart illustrating an embodiment of the invention.

FIG. 1B—Flow Chart:

At START 1-610B an unknown Chinese (or other Oriental) character is brought from outside of the system by a user using an electronic device. (The unknown, user-introduced character, which will be acted upon by the electronic device, may have been chosen by a user from, for example, a book, technical document, or street sign, etc.)

The next step is to select a mode 1-612B. There are 13 modes. The first group is: 1. Standard; 2. Side; 3. Top; 4. Bottom; 5. Pair; 6. Twin Characters; 7. Triple Symbol; and 8. Write-In 1-614B. The second group is: 9. Browser; 10. Measure Word; 11. User-Generated Word; 12. Games; and 13. Dictionary 1-642B.

For modes one through eight 1-614B, a first input is in the form of one or more easy-to-remember symbols (familiar to Western languages and found in all Chinese characters). The list of 32 symbols includes: 11 letters, such as B and K, the numbers 4, 5, and 7, and such visual symbols as lantern and pointer.) For modes nine through thirteen 1-642B, a selection 1-644B is made from SYMBOL DATA, PINYIN DATA, or ENGLISH DATA and search is performed on a user-entered symbol name, Pinyin word, or English word. Output for all modes is: CHARACTER TEXT 1-630B and the character's related PINYIN SPELLING, STROKE NUMBER, TONE 1-632B, and TRANSLATION (into English or another language) 1-634B. End Flow Chart 1-636B.

Figure 2A:
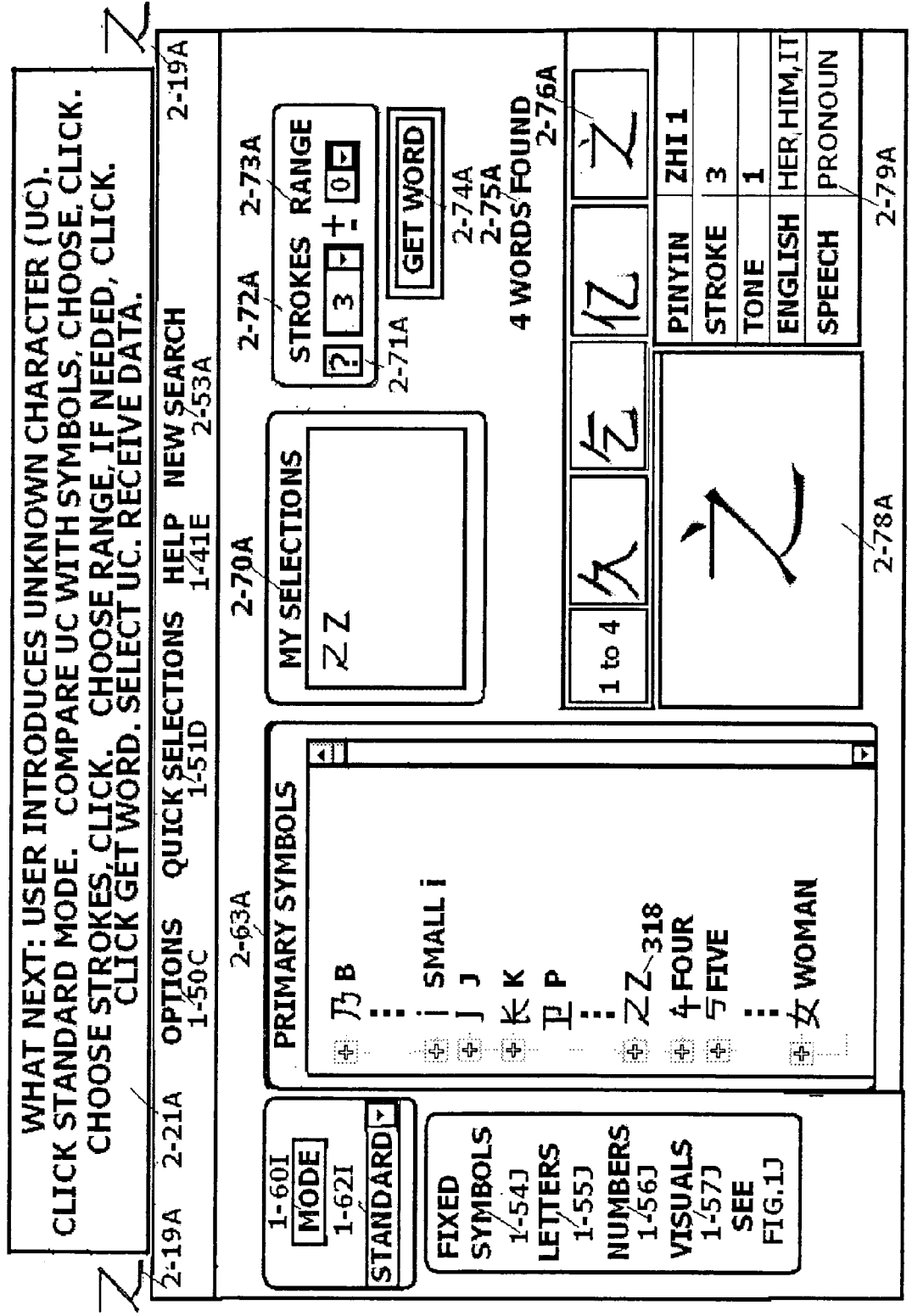

FIG. 1C—OPTIONS Menu Choice:

FIG. 1C provides a menu choice called: OPTIONS 1-50C that appears at the top of each screen just below the WHAT NEXT direction displays (as shown in FIG. 2A). A click on the word OPTIONS 1-50C opens the menu to: System Settings 1-90C, with four choices of image sizes 1-91C from small through extra-large; a magnification feature 1-92C; a symbol example list 1-110C operated by a right click on any symbol to displays examples of a given symbol as found in different characters; a Default Strokes/Range setting 1-93C; an Extra-Wide Display feature 1-94C; Other Languages 1-95C; Other Writing Systems 1-96C; two tree view control features of Expand All 1-97C and Collapse All 1-98C; SAVE 1-99C and Cancel 1-00C features.

FIG. 1D—QUICK SELECTIONS Menu Choice:

FIG. 1D shows, for a user's convenience, a QUICK SELECTIONS 1-51D menu that appears at the top of a display unit below a WHAT NEXT display (as shown in FIG. 2A). A click on the word QUICK SELECTIONS 1-51D opens the menu to: a Bookmarks section 1-64D with choices of: Select Bookmarks 1-65D; Modify List 1-66D; Last 25 Selections 1-67D; Select Selections 1-68D; and, Close Selections 1-69D.

FIG. 1E—HELP Menu Choice:

FIG. 1E provides a menu choice called: HELP 1-41E that offers a drop-down menu with Help Topics 1-46E.

FIGS. 1F to 1H—STROKE Counting:

FIGS. 1F to 1H show a tutorial called "Don't Be Spooked by Strokes" 1-101F. To reach the tutorial click HELP 1-52A or click a QUESTION MARK button 2-71A shown on the display unit. The tutorial includes a "What Next" explanation 1-48E; a maxim 1-106G 'The Program Will Still Yield the Correct Results Even if the Number of Strokes Is Not Counted Accurately'; followed by examples of Strokes of One 1-103G; Two 1-104G; Three 1-105G; Four 1-106H; Five 1-107H; Six 1-108H; and Seven 1-109H.

FIG. 1I—MODES:

A MODE drop-down menu 1-60A may be clicked on any screen to display a selection of thirteen different ways to access the system. FIG. 1I shows the drop-down MODE menu 1-60I with its list of: STANDARD 1-62I; SIDE 1-120I; TOP 1-124I; BOTTOM 1-128I; PAIR 1-132I; TWIN CHARACTERS 1-136I; TRIPLE SYMBOL 1-140I; WRITE-IN 1-144I; BROWSER 1-154I; MEASURE WORD 1-170I; USER-GENERATED 1-180I; GAMES 1-206I; and DICTIONARY 1-276I. Each MODE offers a different kind of query into the system. Select and click the name of a specific mode to activate. Details of the operation of each MODE are presented in FIGS. 2A through 17B.

FIG. 1J—Fixed Symbols

FIG. 1J presents a FIXED SYMBOLS list 1-54J that remains on the screen as a permanent reference when the STANDARD 1-62I MODE 1-62I is activated. Although symbols criteria must be selected through the PRIMARY SYMBOLS tree view 1-63J, the FIXED SYMBOLS list 1-54J has the advantage of displaying all primary symbols without the need for scrolling. The FIXED SYMBOLS list 1-54J is shown as: Letters 1-55J, Numbers 1-56J, and Visuals 1-57J.

FIG. 1K—SYMBOLES (FIXED SYMBOLS):

FIG. 1K presents a SYMBOLES (FIXED SYMBOLS) list 1-272K. (This is the same list as 1-54I but has been translated into French for use with FIG. 16A. The list remains on the screen as a permanent reference when OPTIONS 1-50C, OTHER LANGUAGES 1-95C has been selected for the STANDARD MODE 1-62A. The SYMBOLES (FIXED SYMBOLS) list 1-272K is shown as: Lettres (Letters) 1-273K, Nombres (Numbers) 1-274K, and Visuels (Visuals) 1-275K.

FIGS. 1L and 1M—Examples of Letter, Number, and Visual Symbols:

FIGS. 1L and 1M are reached through the HELP menu 1-41E and give examples of all primary symbols as displayed in different characters. To see examples for any individual primary symbol, right click on the symbol at any time.

FIGS. 2A to 2I—STANDARD MODE:

A STANDARD MODE, illustrated in FIGS. 2A to 2I, is the first and most basic way to interface with this system. (Any user, even one who knows nothing about character configuration or Pinyin spelling, can use this simple system successfully. From the first input step to the last output step takes a user, on an average, of less than a minute to complete.)

FIG. 2A—Use the STANDARD MODE and One Primary Symbol to Output Character Text, Pinyin Spelling, and Translation of a User-Introduced, Unknown Character:

EXAMPLE: A user brings to an electronic device an unknown character from outside of the system, e.g., as found in a newspaper, technical journal or on a street sign, etc. In this case a user has seen a character that resembles an English Z A right click on any symbol in the tree view 2-63A will present several examples of that symbol as used in different characters. (As a part of the output from the system, the unknown character will be made available as character text for input into other software systems, e.g., Microsoft Word. The system also outputs the character's associated Pinyin spelling, stroke number, tone and translation into English or another language that precludes the need for other hard-copy or electronic translation devices.) For purpose of this example, an unknown character chosen by a user is shown on each side of the top of the display of FIG. 2A and marked as 2-19A. A WHAT NEXT box 2-21A at the top of the figure provides simple directions. (Any user, even one who knows nothing about character configuration or Pinyin spelling, can use this simple system successfully, on an average, in less than a minute from beginning of search to output of character text, Pinyin and translation.)

STEP ONE: Click STANDARD 1-62I from a MODE drop-down menu 1-60I.

STEP TWO: Look among the symbols in a PRIMARY SYMBOLS tree view 2-63A to locate a primary symbol that resembles the unknown character 2-19A. (A right click on any symbol in the tree view 2-63A will activate a box to show several examples of the use of that symbol as seen in different characters.) It is, of course, the symbol 'Z' and will be found as the last letter symbols 342 in PRIMARY SYMBOLS tree view 2-63A. (A handy guide to PRIMARY SYMBOLS is always available in a FIXED SYMBOLS list 1-54J located to the left of the PRIMARY SYMBOLS tree view 2-63A. (Note: All directions as given from the perspective of the user.) (A FIXED SYMBOLS list 1-54J divides easy-to-remember PRIMARY SYMBOLS into 11 LETTER SYMBOLS 1-55J between 'B' and 'Z', three NUMBER SYMBOLS 1-56J of '4', '5', and '7', and 18 VISUAL SYMBOLS 1-57J such as 'lantern', 'pointer', etc. The FIXED SYMBOLS list 1-54J shows all primary symbols at one glance without scrolling. See FIG. 1J for details.)

STEP THREE: Double click symbol name 'Z' to place the symbol in MY SELECTIONS list box 2-70A. (The user may double-click any number of symbols, in turn, to place them in MY SELECTIONS list box. To delete an unwanted symbol, select it from MY SELECTIONS list box 2-70A and double-click.)

STEP FOUR: A user next counts strokes in the unknown character that is here marked as 2-19A. User enters a count of three in a STROKES drop-down menu 2-72A. (Do not be concerned if stroke count is not exact. One option is to use a stroke range drop-down menu to insert a user's plus or minus search number that compensates for user error in stroke counting. A stroke tutorial, "Don't Be Spooked by Strokes," FIGS. 1F to 1H, can be reached by clicking a QUESTION MARK button 2-71A that is located next to the STROKES drop-down menu 2-72A.) In this example, the RANGE drop-down menu 2-73A reads zero to indicate that the user is sure that the stroke count is accurate and that a numerical choice of range is unnecessary.

STEP FIVE: The final step is to click a GET WORD button 2-74A. A RESULTS set display 2-75A indicates that there are four characters that meet the selected criteria of symbol and stroke count. A CANDIDATE CHARACTERS TEXT display 2-76A shows that the user-chosen, unknown character is in the fourth box. Click the character to transfer it to an ENLARGED CHARACTER box 2-78A. Output provides the character text 2-78A and its TRANSLATION 2-79A that gives the character's Pinyin spelling, number of strokes, tones, English (or other language), and part of speech of the ENLARGED CHARACTER 2-78A, formerly known as the unknown character 2-19A. (Note: To access the character text, etc. of any character in the CANDIDATE CHARACTERS TEXT display 2-76A click to transfer the chosen character text to the ENLARGED CHARACTER display 2-78A.)

A NEW SEARCH button 2-53A is used to find another target character.

Figure 2B:
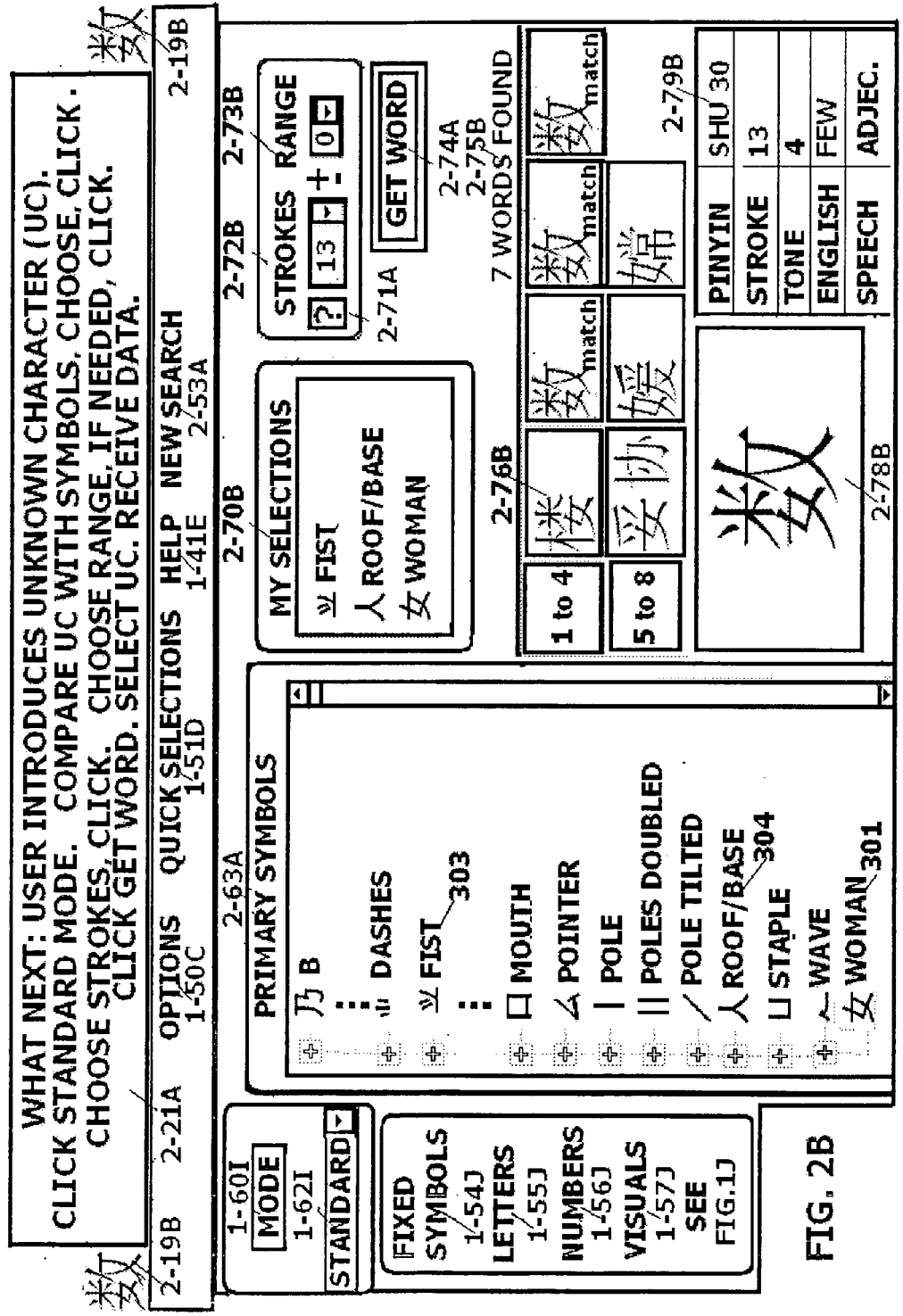

FIG. 2B—Use the STANDARD MODE and More than One Primary Symbol to Output Character Text, Pinyin Spelling, and Translation of a User-Introduced, Unknown Character:

EXAMPLE: A user brings to an electronic device an unknown character from outside of the system, e.g., as found in a newspaper, technical journal or on a street sign, etc. (As a part of the output from the system, the unknown character will be made available as character text for input into other software systems, e.g., Microsoft Word. The system also outputs the character's associated Pinyin spelling, stroke number, tone and translation into English or another language that precludes the need for other hard-copy or electronic translation devices.) For purpose of this example, the unknown character chosen by the user is shown on each side of the top of the display (FIG. 2B) as 2-19B. Again, a WHAT NEXT box 2-21A at the top of the figure provides simple directions. (Any user, even one who knows nothing about character configuration or Pinyin spelling, can use this simple system successfully, on an average, in less than a minute from beginning of search to output of character text, Pinyin and translation.)

STEP ONE: Click STANDARD 1-62I from the MODE drop-down menu 1-60I.

STEP TWO: Go to a PRIMARY SYMBOLS tree view 2-63A and select three primary symbols that are found in the target character 2-19B. These are: 'Fist' 303 (shown on the upper left of the character component), 'Roof/Base' 304 (shown in all three components of the character), and 'Woman' 301 (shown at the bottom left of the character). (NOTE: All descriptions of a component's composition are given from the user's perspective.) (A handy guide to PRIMARY SYMBOLS is always available in a FIXED SYMBOLS list 1-54J located to the left of the PRIMARY SYMBOLS tree view 2-63A. The FIXED SYMBOLS list 1-54J divides easy-to-remember PRIMARY SYMBOLS into 11 LETTER SYMBOLS 1-55J between 'B' and 'Z', three NUMBER SYMBOLS 1-56J of '4', '5', and '7', and 18 VISUAL SYMBOLS 1-57J such as 'lantern', 'pointer', etc. The FIXED SYMBOLS list 1-54J shows all primary symbols at one glance without scrolling. See FIG. 1J for details.)

STEP THREE: Double-click, in turn, the symbol name of each of the three chosen primary symbols to add them to MY SELECTIONS list box 2-70B. (To delete an unwanted symbol from MY SELECTIONS list box 2-70B, double click.) MY SELECTIONS list box now contains: 'Fist' 303, 'Roof/Base' 304, and 'Woman' 301.

STEP FOUR: A user next counts strokes in the unknown character 2-19B. User enters a count of 13 in a STROKES drop-down menu 2-72B. Do not be concerned if the stroke count is not exact. One option is to use a stroke range drop-down menu to insert a user's plus or minus search number that compensates for user error in stroke counting. A stroke tutorial, "Don't Be Spooked by Strokes," FIGS. 1F to 1H, can be reached by clicking a QUESTION MARK button 2-71A located next to the STROKES drop-down menu 2-72B. In this example, the RANGE drop-down menu 2-73B shows a zero to indicate that the user is sure that the stroke count is accurate and that a numerical choice of range is unnecessary.

STEP FIVE: The final step is to click a GET WORD button 2-74A. A RESULTS set display 2-75B indicates that there are seven characters that meet all of the selected criteria. A CANDIDATE CHARACTERS TEXT display 2-76B indicates a "MATCH" for character texts numbers two, three, and four. This shows that all three texts represent the unknown character 2-19B that now appears as three examples in the CANDIDATE CHARACTERS TEXT display 2-76B. (About fifteen percent of all Chinese characters use an identical character 'picture' to represent different sounds and/or tones and different translations.) A click on any one of the matched candidate character texts will transfer the character to an ENLARGED CHARACTER box 2-78B. Output consists of the character text and its TRANSLATION 2-79B that gives the character's Pinyin spelling, stroke number, tone, English (or another language), and part of speech of the ENLARGED CHARACTER 2-76B (formerly known as the unknown character 2-19B). In this example, two of the selected characters answer to the Chinese word shu, but with different tones. The last look-alike character answers to the Chinese word shuò. A user depends on content to make a final selection. (Note: To access the character text, etc. of any character in the CANDIDATE CHARACTERS TEXT display 2-76B click to transfer the chosen character text to the ENLARGED CHARACTER display 2-78B.)

A NEW SEARCH button 2-53A is used to find another user-introduced character.

Figure 2C:
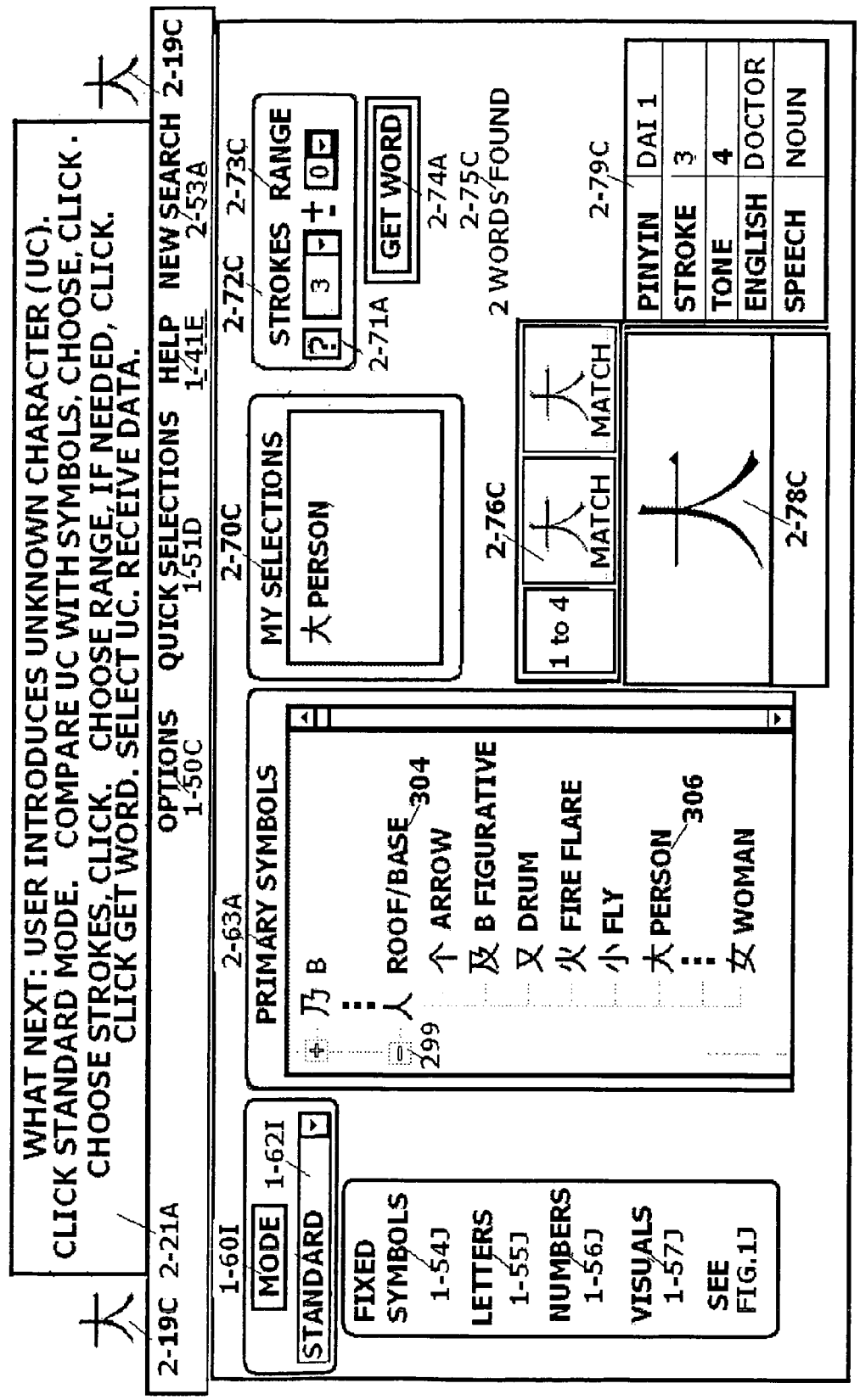

FIG. 2C—Use the STANDARD MODE and One Secondary Symbol to Output Character Text, Pinyin Spelling, and Translation of a User-Introduced, Unknown Character:

When searching for an unknown character that appears deceptively simple, with less than four strokes, it is sometimes better to fine-tune a search by using a secondary symbol.

EXAMPLE: A user brings to an electronic device an unknown character from outside of the system, e.g., as found in a newspaper, technical journal or on a street sign, etc. (As a part of the output from the system, the unknown character will be made available as character text for input into other software systems, e.g., Microsoft Word. The system also outputs the character's associated Pinyin spelling, stroke number, tone and translation into English or another language that precludes the need for other hard-copy or electronic translation devices.) For purpose of this example, the unknown character chosen by the user is shown on each side of the top of the display (FIG. 2C) as 2-19C. Again, a WHAT NEXT box 2-21A at the top of the figure provides simple directions. (Any user, even one who knows nothing about character configuration or Pinyin spelling, can use this simple system successfully, on an average, in less than a minute from beginning of search to output of character text, Pinyin and translation.)

STEP ONE: Click STANDARD 1-62I from a MODE drop-down menu 1-60I.

STEP TWO: Decide which primary symbol resembles most closely the unknown character 2-19C. To do so, refer to a PRIMARY SYMBOLS tree view 2-63A. (A right click on any symbol in the tree view 2-62A will present several examples of that symbol as used in different characters. A handy guide to PRIMARY SYMBOLS is always available in a FIXED SYMBOLS list 1-54J located to the left of the PRIMARY SYMBOLS tree view 2-63A. The FIXED SYMBOLS list 1-54J divides easy-to-remember PRIMARY SYMBOLS into 11 LETTER SYMBOLS 1-55J between 'B' and 'Z', three NUMBER SYMBOLS 1-56J, '4', '5', and '7', and 18 VISUAL SYMBOLS 1-57J such as 'lantern', 'pointer', etc. The FIXED SYMBOLS list 1-54J shows all of the primary symbols at one glance without scrolling. See FIG. 1J for details.) Scroll a PRIMARY SYMBOL tree view list 2-63A to reach a primary symbol called 'roof/base' 304. (The symbol 'roof/base' looks like a peaked roof and is often found in any position within a character. In this case, it is found at the bottom.) Click a plus sign to the left of the primary symbol 'roof/base' to open to its secondary symbols. (A minus sign 299 is shown here to the left of the primary symbol 'roof/base' 304 to indicate that a primary symbol has been opened to display all of its secondary symbols.)

STEP THREE: Scroll to view secondary symbols of the primary symbol 'roof/base' to find a secondary symbol that most closely resembles the unknown character 2-19C. This is the secondary symbol 'person' 306. Double click the symbol name 'person' 306 to move the symbol to MY SELECTIONS list box 2-70C. (The user may double click any number of symbols, in turn, to place them in MY SELECTIONS list box.

To delete an unwanted symbol, select it from MY SELECTIONS list box 2-70C and double click.)

STEP FOUR: A user next counts strokes in the unknown character 2-19C and enters a count of three in a STROKES drop-down menu 2-72C. Do not be concerned if the stroke count is not exact. One option is to use a stroke range drop-down menu to insert a user's plus or minus search number that compensates for user error in stroke counting. For further information about stroke counting see a stroke tutorial, "Don't Be Spooked by Strokes," FIGS. 1F to 1H, that can be reached by clicking a QUESTION MARK button 2-71A located next to the STROKES drop-down menu 2-72C. In this example, the RANGE drop-down menu 2-73C shows a zero to indicate that the user is sure that the stroke count is accurate and that a numerical choice of range is unnecessary.

STEP FIVE: The final step is to click a GET WORD button 2-74A. A RESULTS set display 2-75C indicates that there are two characters that have the required criteria of symbol and stroke number. A CANDIDATE CHARACTERS display 2-76C shows a word 'MATCH' to indicate that picture number one and picture number two both represent the same target character but with different translations. (About fifteen percent of all Chinese characters represent identical characters with different sounds and/or tones and translations.) A click on either one of the CANDIDATE CHARACTER TEXTS 2-76C will transfer that character to an ENLARGED CHARACTER display 2-78C. Click on a chosen character text for an output of its TRANSLATION 2-79C that gives the character's Pinyin spelling, stroke number, tone, English (or another language), and part of speech of the ENLARGED CHARACTER 2-76C. The final choice between the first and second character text depends on the context of the translation. (This TRANSLATION display 2-79C highlights the character dài meaning doctor 2-78C, (formerly known as the unknown character 2-19C). (Note: To access the character text, etc. of any character in the CANDIDATE CHARACTERS TEXT display 2-76C click to transfer the chosen character text to the ENLARGED CHARACTER display 2-78C.)

(A reminder: When searching for a simple character that has four strokes or less, it is sometimes faster to fine-tune the search by using a secondary symbol. The exception to this is an unknown character that is, itself, a primary symbol, such as B or Z.)

A NEW SEARCH button 2-53A is used to find a new user-introduced character.

Figure 2D:
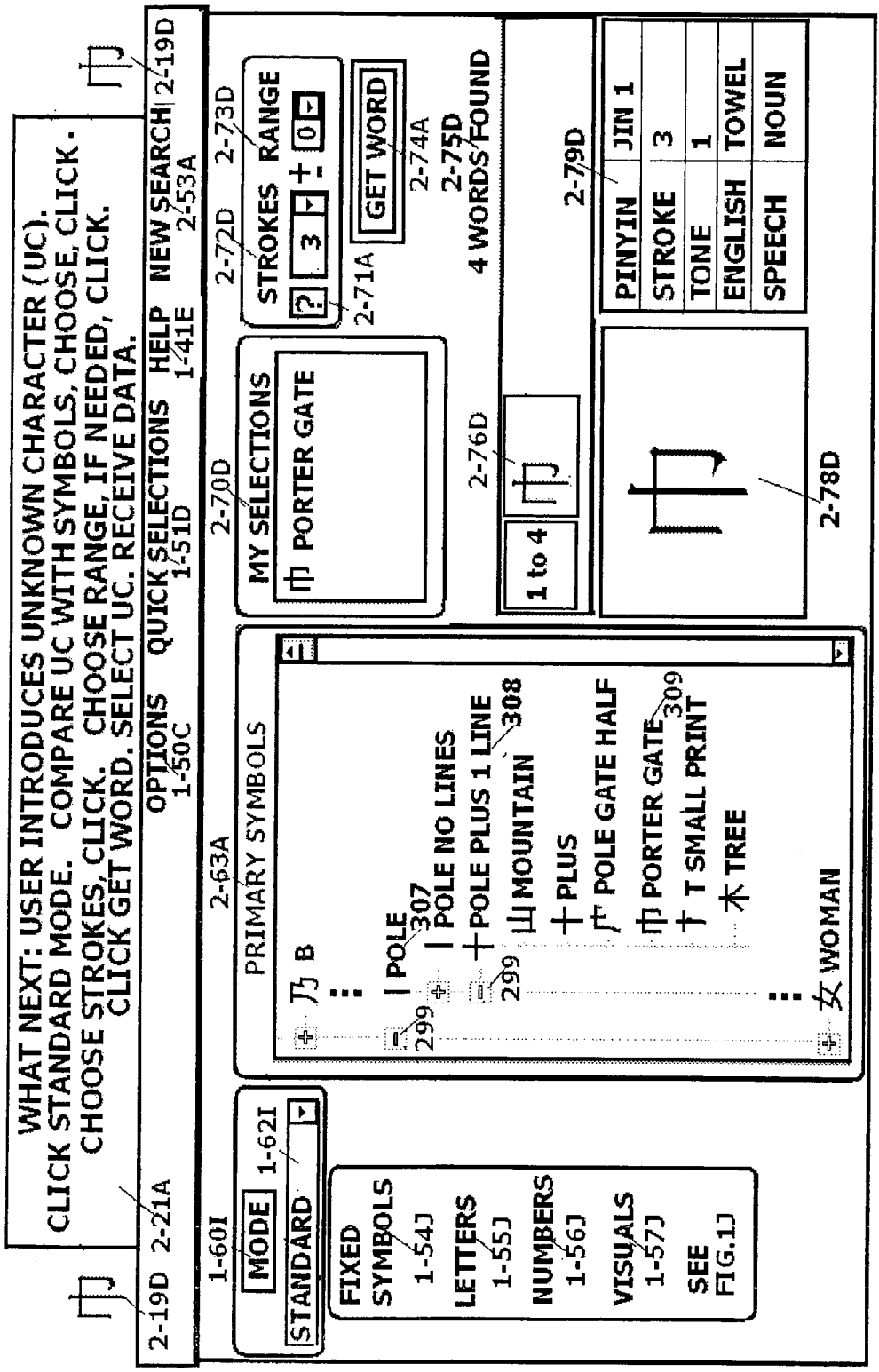

FIG. 2D—Use the STANDARD MODE and a Primary Symbol 'pole' to Locate an Appropriate Secondary Symbol to Output Character Text, Pinyin Spelling, and Translation of a User-Introduced, Unknown Character:

A primary symbol 'pole' 307, represented by a straight, vertical line, is a special case because it is found in many Chinese characters. It is useful, however, because it breaks down into outstanding and immediately-recognized secondary symbols simply by counting horizontal lines that cross through or lean horizontally against the top or bottom of the vertical line of 'pole' 307. These can be conveniently presented as: 'pole with no cross lines', 'pole plus 1 line', 'pole plus 2 lines', 'pole plus 3 lines', and 'pole plus 4 or more lines'. (This example uses pole plus 1 line 308.)

EXAMPLE: A user brings to an electronic device an unknown character from outside of the system, e.g., as found in a newspaper, technical journal or on a street sign, etc. (As a part of the output from the system, the unknown character will be made available as character text for input into other software systems, e.g., Microsoft Word. The system also outputs the character's associated Pinyin spelling, stroke number, tone and translation into English or another language that precludes the need for other hard-copy or electronic translation devices.) For purpose of this example, the unknown character chosen by a user is shown on each side of the top of the display (FIG. 2D) as 2-19D. Again, a WHAT NEXT box 2-21A at the top of the figure provides simple directions. (Any user, even one who knows nothing about character configuration or Pinyin spelling, can use this simple system successfully, on an average, in less than a minute from beginning of search to output of character text, Pinyin and translation.)

STEP ONE: Click STANDARD 1-62I from a MODE drop-down menu 1-60I.

STEP TWO: Decide which primary symbol resembles most closely the unknown character 2-19D. To do so, refer to a PRIMARY SYMBOLS tree view 2-63A. (A right click on any symbol in the tree view 2-63A will present several examples of that symbol as used in different characters.) Because a symbol 'pole' appears in the unknown character 2-19D click a plus sign to the left of the primary symbol 'pole' 307 to open to its secondary symbol 'pole plus 1 line' 308. (A minus sign 299 to the left of 'pole' 307 Indicates that the symbol has been opened to reach its secondary symbols.) Next, select and click a plus sign to the left of secondary symbol 'pole plus one line' 308 to open other related secondary symbols. (Again, a minus sign to the left of 'pole plus 1 line' 308 indicates that the symbol has been opened to reach its related secondary symbols.) Among this last list is the searched for character 'porter gate' 309 that is identical to the unknown character 2-19D that is being sought. (A handy guide to PRIMARY SYMBOLS is always available in a FIXED SYMBOLS list 1-54J located to the left of the PRIMARY SYMBOLS tree view 2-63A. The FIXED SYMBOLS list 1-54J divides easy-to-remember PRIMARY SYMBOLS into 11 LETTER SYMBOLS 1-55J between 'B' and 'Z', three NUMBER SYMBOLS 1-56J, '4', '5', and '7', and 18 VISUAL SYMBOLS 1-57J such as 'lantern', 'pointer', etc. The FIXED SYMBOLS list 1-54J shows all of the primary symbols at one glance without scrolling. See FIG. 1J for details.)

STEP THREE: Double click the symbol name 'porter gate' 309 to move the symbol to MY SELECTIONS list box 2-70D. (The user may double click any number of symbols, in turn, to place them in MY SELECTIONS list box. To delete an unwanted symbol, select it from MY SELECTIONS list box 2-70D and double click.)

STEP FOUR: A user next counts strokes in the unknown character 2-19D and enters a count of three in a STROKES drop-down menu 2-72D. Do not be concerned if the stroke count is not exact. One option is to use a stroke range drop-down menu to insert a user's plus or minus search number that compensates for user error in stroke counting. A stroke tutorial, "Don't Be Spooked by Strokes," FIGS. 1F to 1H, can be reached by clicking a QUESTION MARK button 2-71A that is located next to the STROKES drop-down menu 2-72D. In this example, a RANGE drop-down menu 2-73D shows a zero to indicate that the user is sure that the stroke count is accurate and that a numerical choice of range is unnecessary.

STEP FIVE: A final step is to click a GET WORD button 2-74A. A RESULTS set display 2-75D indicates that only one character answers to the user's criteria of symbol and stroke number. Therefore, it is displayed in both the CANDIDATE CHARACTERS TEXT display 2-76D and in the ENLARGED CHARACTER display 2-78D. Output is a character text 2-78D and its TRANSLATION 2-79D that gives the character's Pinyin spelling, number of strokes, tones, English (or other language), and part of speech of the ENLARGED CHARACTER 2-78D, formerly known as the unknown character 2-19D. (Note: To access the character text, etc. of any character in the CANDIDATE CHARACTERS TEXT display 2-76D click to transfer the chosen character text to the ENLARGED CHARACTER display 2-78D.)

(A reminder: When searching for an unknown character that has four strokes or less, it is better to fine-tune the search by using a secondary symbol. The exception to this is an unknown character that is, itself, a primary symbol, such as B or Z.)

A NEW SEARCH button 2-53A is used to find another user-introduced character.

Figure 2E:
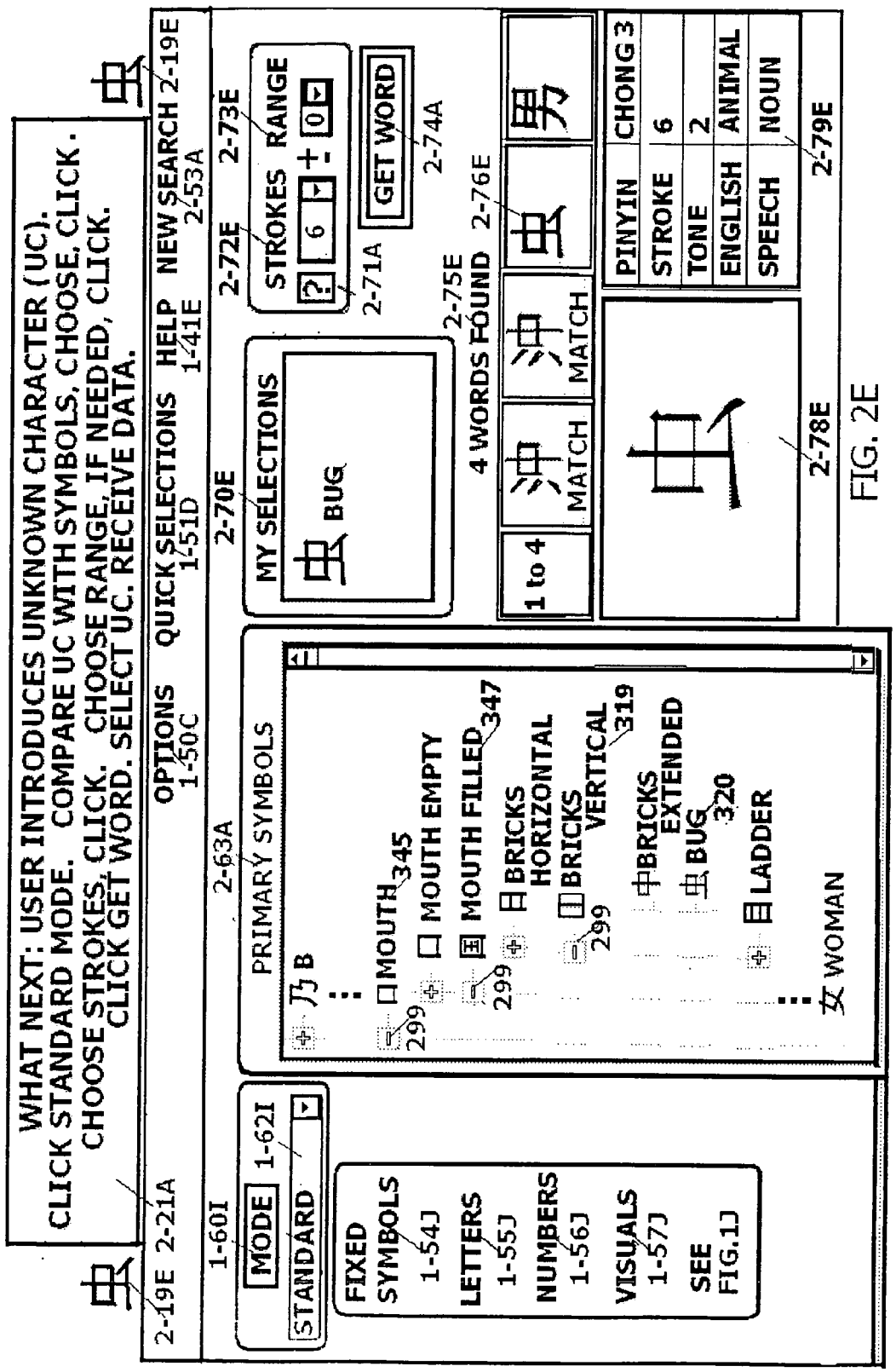

FIG. 2E—Use the STANDARD MODE and a Primary Symbol 'mouth' to Output Character Text, Pinyin Spelling, and Translation of a User-Introduced, Unknown Character:

Both the primary symbol 'mouth' (shown as a square), along with the primary symbol 'pole' featured in FIG. 2D, are found so frequently in characters that they must receive special treatment in the way their secondary symbols are displayed.

The primary symbol 'mouth' is important because it breaks down into immediately-recognized, secondary symbols that, in turn, subdivide into other specific and easily-located choices. These are:

'mouth empty' 346 with eleven individual secondary symbols; and,

'mouth filled' 347 with ten individual secondary symbols, some of which are so important as to merit further sorting.

EXAMPLE: A user brings to the computer an unknown character from outside of the system, e.g., as found in a newspaper, technical journal or on a street sign, etc. (As a part of the output from the system, the unknown character will be made available as character text for input into other software systems, e.g., Microsoft Word. The system also outputs the character's associated Pinyin spelling, stroke number, tone and translation into English or another language that precludes the need for other hard-copy or electronic translation devices.) For purpose of this example, the unknown character chosen by the user is shown on each side of the top of the display (FIG. 2E) as 2-19E. Again, a WHAT NEXT box 2-21A at the top of the figure provides simple directions. (Any user, even one who knows nothing about character configuration or Pinyin spelling, can use this simple system successfully, on an average, in less than a minute from beginning of search to output of character text, Pinyin and translation.)

STEP ONE: Click STANDARD 1-62I from the MODE drop-down menu 1-60I.

STEP TWO: Compare the symbols with the unknown character 2-19E. (A right click on any symbol in the tree view 2-63A will present several examples of that symbol as used in different characters.) Both the primary symbols 'mouth' and 'pole' are to be found within the unknown character. (This example uses the primary symbol 'mouth'.) Click a plus sign to the left of the primary symbol 'mouth' 345 to open to its secondary symbols including 'mouth filled' 347. (A minus sign 299 shows that the primary symbol 'mouth' 345 has already been opened to view its secondary symbol 'mouth filled' 347.) The unknown character 2-19E most closely resembles 'mouth filled' 347 because it has a vertical line running through it. (A handy guide to PRIMARY SYMBOLS is always available in a FIXED SYMBOLS list 1-54J located to the left of the PRIMARY SYMBOLS tree view 2-63A. The FIXED SYMBOLS list 1-54J divides easy-to-remember PRIMARY SYMBOLS into 11 LETTER SYMBOLS 1-55J between 'B', and 'Z', three NUMBER SYMBOLS 1-56J, '4', '5', and '7', and 17 VISUAL SYMBOLS 1-57J such as 'lantern', 'pointer', etc. The FIXED SYMBOLS list 1-54J shows all of the primary symbols at one glance without scrolling. See FIG. 1J for details.)

STEP THREE: A double-click on 'mouth filled' 347 leads to 'bricks vertical 319 under which is to be found the secondary symbol 'bug' 320 that is Identical to the unknown character 2-19E. (A minus sign 299 to the left of the secondary symbol 'bricks vertical' 350 shows that the symbol has been opened to display its related secondary symbols.)

STEP FOUR: Double click the symbol name 'bug' 352 to move the symbol to MY SELECTIONS list box 2-70E. (The user may double click any number of symbols, in turn, to place them in MY SELECTIONS list box. To delete an unwanted symbol, select it from MY SELECTIONS list box 2-70E and double click.)

STEP FIVE: A user next counts strokes in the unknown character 2-19E and enters a count of six in a STROKES drop-down menu 2-72E. Do not be concerned if the stroke count is not exact. One option is to use a stroke range drop-down menu to insert a user's plus or minus search number that compensates for user error in stroke counting. A stroke tutorial, "Don't Be Spooked by Strokes," FIGS. 1F to 1H, can be reached by clicking a QUESTION MARK button 2-71A that is located next to the STROKES drop-down menu 2-72E. In this example, a RANGE drop-down menu 2-73E shows a zero to indicate that the user is sure that the stroke count is accurate and that a numerical choice of range is unnecessary.

STEP SIX: A final step is to click a GET WORD button 2-74A. A RESULTS set display 2-75E indicates there are four characters that meet the given criteria of symbol and stroke number. User selects the unknown character 2-19E that is the third character in the CANDIDATE CHARACTERS TEXT display 2-76E and clicks to transfer it to the ENLARGED CHARACTER display 2-78E. A TRANSLATION box 2-79E shows the appropriate Pinyin spelling, number of strokes, tones, English (or other language) translation and part of speech of the ENLARGED CHARACTER TEXT 2-78E formerly known as the unknown character 2-19E. (Note: To access the character text, etc. of any character in the CANDIDATE CHARACTERS TEXT display 2-76E click to transfer the chosen character text to the ENLARGED CHARACTER display 2-78E.)

A NEW SEARCH button 2-53A is used to find another user-introduced character.

Figure 2F:
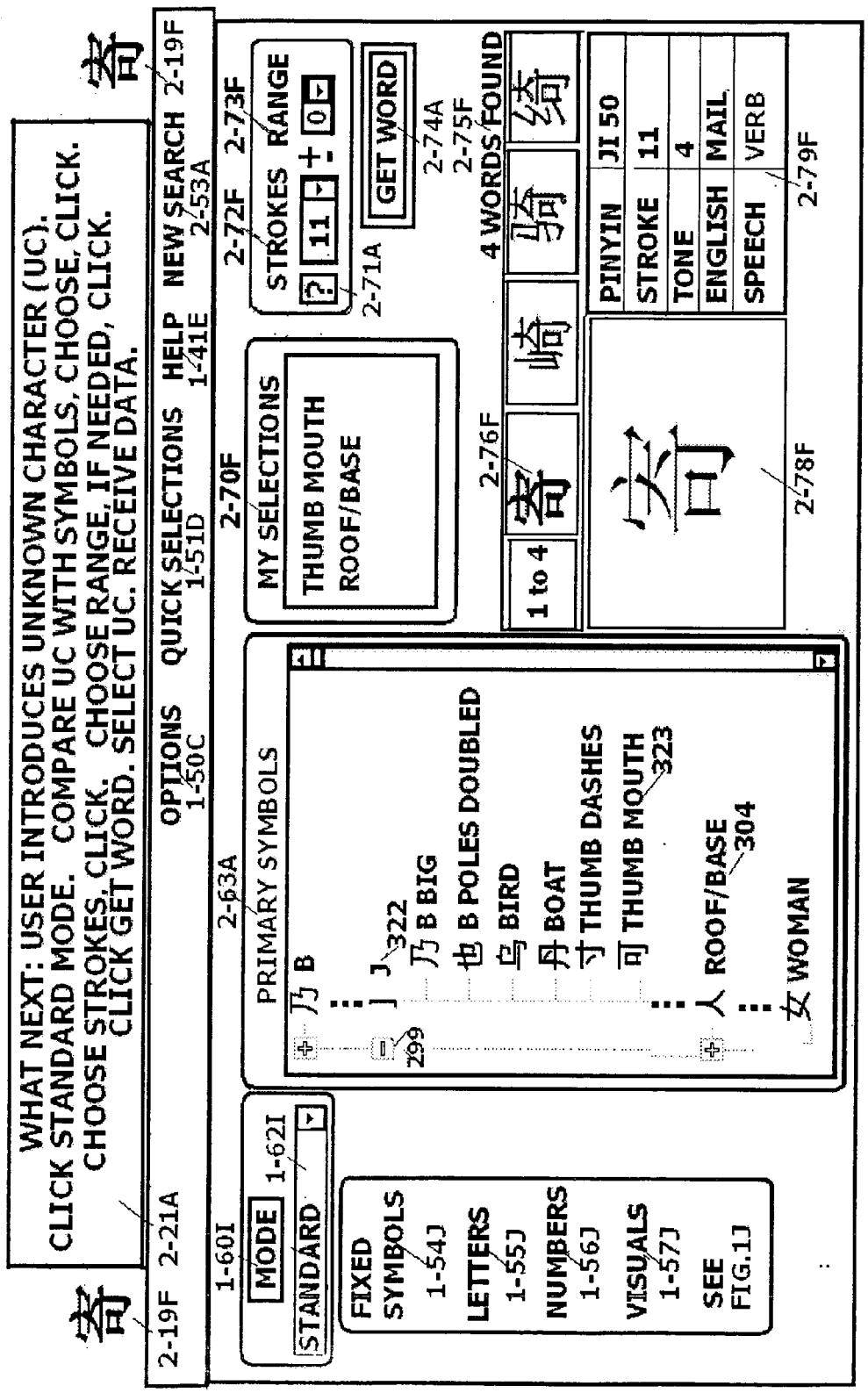

FIG. 2F—Use the STANDARD MODE and a Mix of Primary and Secondary Symbols to Output Character Text, Pinyin Spelling, and Translation of a User-Introduced, Unknown Character:

When a target character has a mixture of obvious primary and secondary symbols, the swiftest way to a translation may be to use both as criteria.

EXAMPLE: A user brings to the computer an unknown character from outside of the system, e.g., as found in a newspaper, technical journal or on a street sign, etc. (As a part of the output from the system, the unknown character will be made available as character text for input into other software systems, e.g., Microsoft Word. The system also outputs the character's associated Pinyin spelling, stroke number, tone and translation into English or another language that precludes the need for other hard-copy or electronic translation devices.) For purpose of this example, an unknown character chosen by a user is shown on each side of the top of the display (FIG. 2F) as 2-19F. Again, a WHAT NEXT box 2-21A at the top of the figure provides simple directions. (Any user, even one who knows nothing about character configuration or Pinyin spelling, can use this simple system successfully, on an average, in less than a minute from beginning of search to output of character text, Pinyin and translation.)

STEP ONE: Click STANDARD 1-62I from a drop-down MODE menu 1-60I.

STEP TWO: Note that a distinctive primary symbol 'roof/base' 304 is to be found in the unknown character 2-19F. (A right click on any symbol in the tree view 2-63A will present several examples of that symbol as used in different characters.) Select 'roof/base' 304 from a PRIMARY SYMBOL tree view 2-63A. (A handy guide to PRIMARY SYMBOLS is always available in a FIXED SYMBOLS list 1-54J located to the left of the PRIMARY SYMBOLS tree view 2-63A. The FIXED SYMBOLS list 1-54J divides the easy-to-remember PRIMARY SYMBOLS into 11 LETTER SYMBOLS between 'B' and 'Z', three NUMBER SYMBOLS, '4', '5', and '7', and 18 VISUAL SYMBOLS such as a 'lantern', 'pointer', etc. The FIXED SYMBOLS list 1-54J shows all of the primary symbols at one glance without smiling. See FIG. 1J for details)

STEP THREE: Decide which other primary symbols closely resemble a part of the unknown character 2-19F. There are two: 'J' and 'mouth'. This example uses 'J' 322. Scroll the PRIMARY SYMBOLS tree view 2-63A and select primary symbol 'J' 322. Click a plus sign located on the left side of the primary symbol 'J' to open to all of the 'J' secondary symbols. (In FIG. 2F, a minus sign 299 on the left side of the primary symbol 'J' 322 indicates that the primary symbol 7 has been opened.) Scroll the list of the 'J' secondary symbols to reach secondary symbol 'thumb mouth' 323 that is identical to a part of the unknown character. Double click symbol name 'thumb mouth' 323 to place the symbol in MY SELECTIONS list box 2-70F. (The user may double click any number of symbols, in turn, to place them in MY SELECTIONS list box. To delete an unwanted symbol, select it from MY SELECTIONS list box 2-70F and double click.)

STEP FOUR: A user next counts strokes in the unknown character 2-19F and enters a count of 11 in a STROKES drop-down menu 2-72F. Do not be concerned if the stroke count is not exact. One option is to use a stroke range drop-down menu to insert a user's plus or minus search number that compensates for user error in stroke counting. A stroke tutorial, "Don't Be Spooked by Strokes," FIGS. 1F to 1H, can be reached by clicking a QUESTION MARK button 2-71A that is located next to the STROKES drop-down menu 2-72F. In this example, a RANGE drop-down menu 2-73F shows a zero to indicate that the user is sure that the stroke count is accurate and that a numerical choice of range is unnecessary.

STEP FIVE: As a final step, click a GET WORD button 2-74A. A RESULTS set display 2-75F indicates that there are four choices that meet the given criteria. The unknown character 2-19F is the first of four choices in the CANDIDATE CHARACTERS TEXT display 2-76F. Therefore, it also appears automatically as an ENLARGED CHARACTER 2-78F. Output is the character text and its TRANSLATION 2-79F that gives the character's Pinyin spelling, stroke number, tone, English (or another language), and part of speech of the ENLARGED CHARACTER 2-76F, formerly known as the unknown character 2-19F. (Note: To access the character text, etc. of any character in the CANDIDATE CHARACTERS TEXT display 2-76F click to transfer the chosen character text to the ENLARGED CHARACTER display 2-78F.)

A NEW SEARCH button 2-53A is used to find another user-introduced character.

Figure 2G:
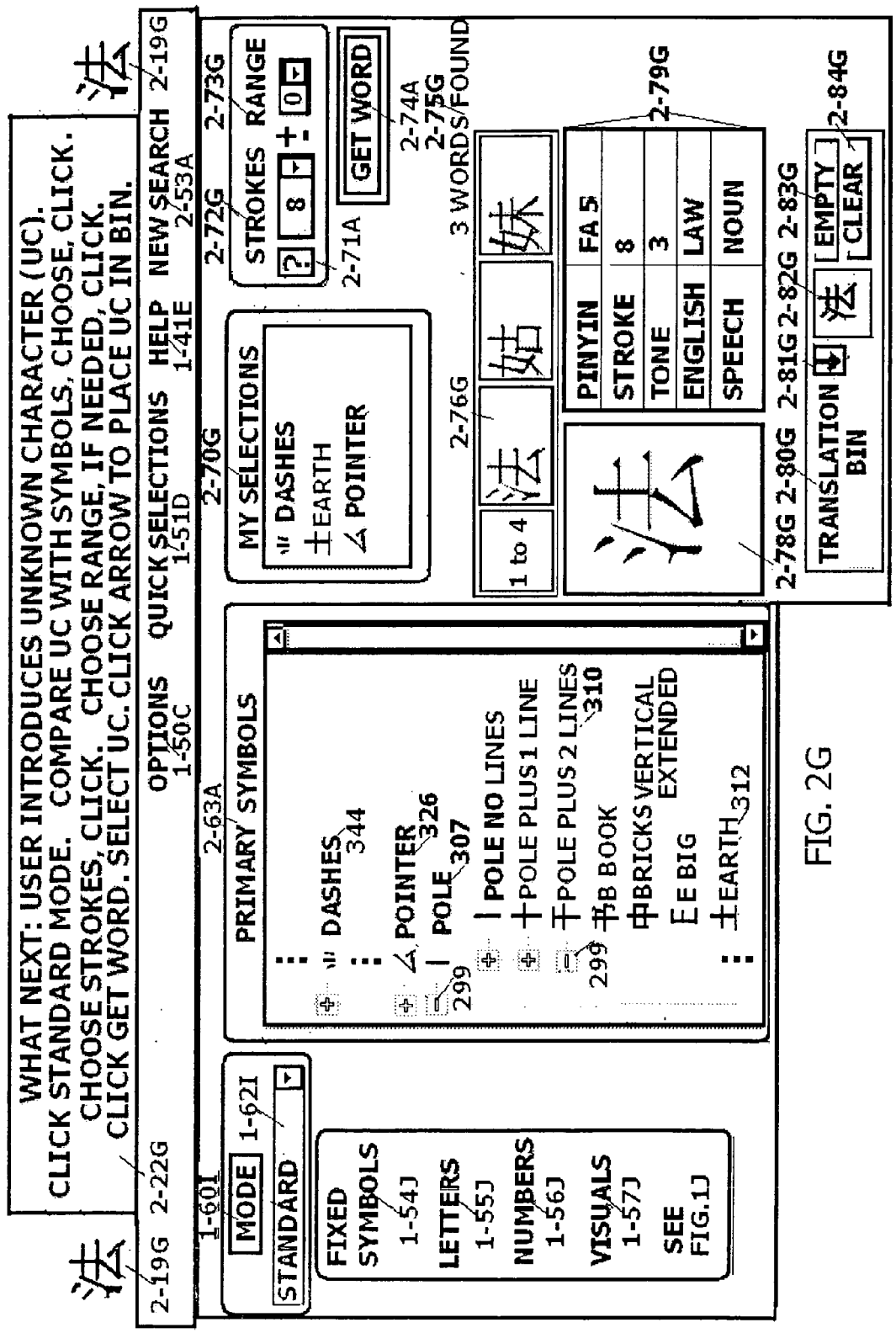
Figure 2H:
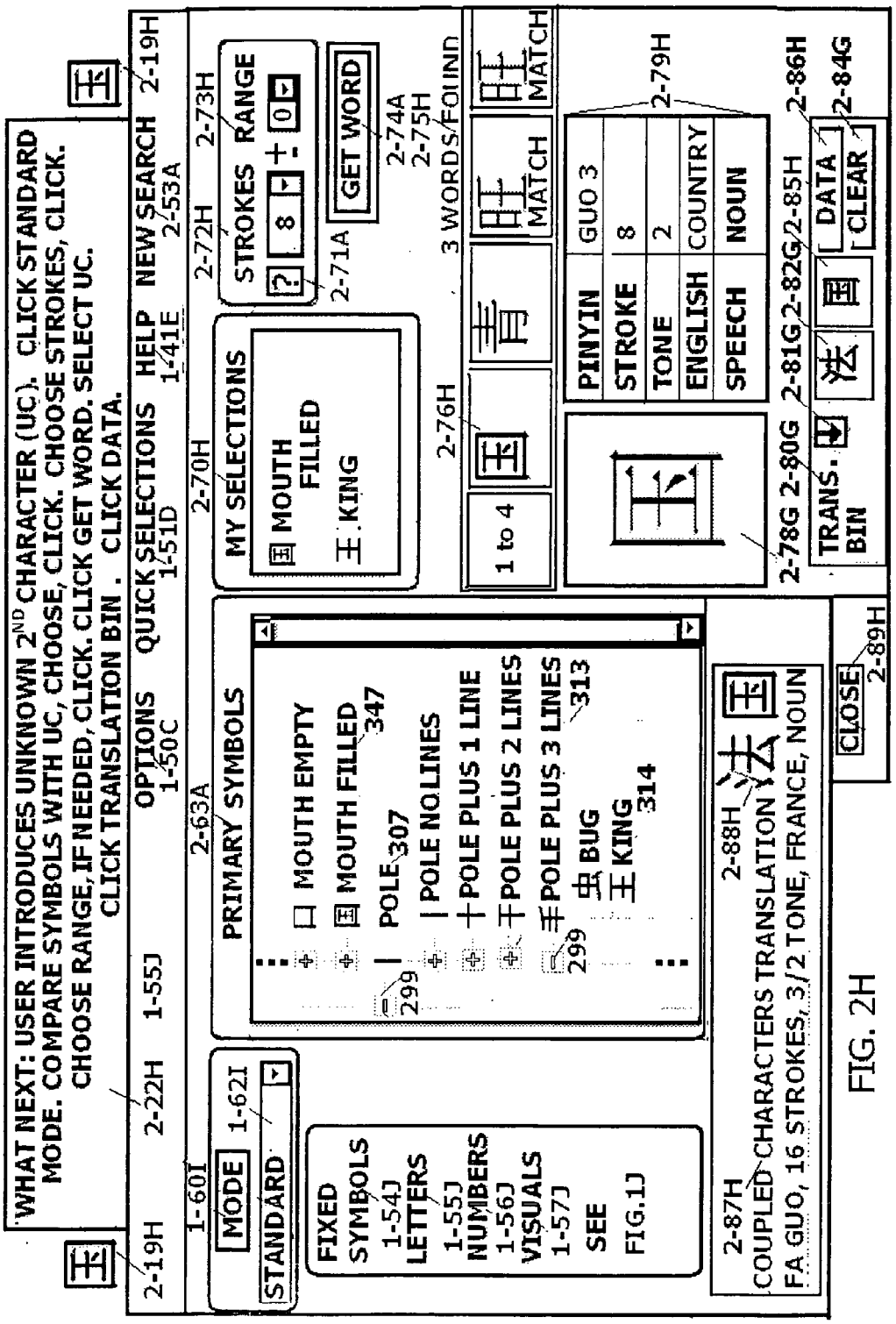

FIGS. 2G and 2H—Use the STANDARD MODE and a Combination of Related Characters and the Use of a TRANSLATION BIN to Obtain an Output of Character Text, Pinyin Spelling, and Translation of a User-Introduced, Unknown Character:

Because there are so few syllables in Chinese and because each character is only one syllable in length, most individual Chinese words are composed of two or more characters. There is no way, until the two or more characters are joined, to anticipate which characters will be combined with a partner to make a new and distinct word. Therefore, this system provides a TRANSLATION BIN into which the first word translated may be placed. As the second character is translated it will be combined with the initial character (already resting in the TRANSLATION BIN) and, when appropriate, the combination will be translated together as a single word with a different definition from either of its component parts. For example, the Pinyin zheng means government. The Pinyin bian means change. The two Pinyin words zheng bian when placed together mean coup d'etat.

FIG. 2G—Use the STANDARD MODE and a TRANSLATION BIN to Output a First Character Text, Pinyin Spelling, and Translation of a User-Introduce, Unknown Character:

EXAMPLE: A user brings to an electronic device an unknown character from outside of the system, e.g., as found in a newspaper, technical journal or on a street sign, etc. (As a part of the output from the system, the unknown character will be made available as character text for input into other software systems, e.g., Microsoft Word. The system also outputs the character's associated Pinyin spelling, stroke number, tone and translation into English or another language that precludes the need for other hard-copy or electronic translation devices.) For purpose of this example, the unknown character chosen by the user is shown on each side of the top of the display (FIG. 2G) as 2-19G. Again, a WHAT NEXT box 2-22G at the top of the figure provides simple directions. (Any user, even one who knows nothing about character configuration or Pinyin spelling, can use this simple system successfully, on an average, in less than a minute from beginning of search to output of character text, Pinyin and translation.)

STEP ONE: Select STANDARD 1-62I from a MODE drop-down menu 1-60I.

STEP TWO: Note that the unknown character has two obvious primary symbols. The first of these is 'dashes' 344, three of which appear on the left side of the unknown character 2-19G (as viewed from the perspective of the user). The second primary symbol is 'pointer' 326. (A right click on any symbol in the tree view 2-63A will present several examples of that symbol as used in different characters.) Click on each symbol name, in turn, to place the symbol in MY SELECTIONS box 2-70G. User next decides to add a secondary symbol to the mix, realizing this will reduce the number of CANDIDATE CHARACTER choices. The symbol 'pole' also appears in the unknown character 2-19G. A click on a plus sign next to the 'pole' symbol 307 leads to its secondary symbols including 'pole plus 2 lines'. Double-click that symbol name, in turn, to open to its related symbols including 'earth' 312. Click the symbol name 'earth' 312 to place it in MY SELECTIONS list box. (A handy guide to PRIMARY SYMBOLS is always available in a FIXED SYMBOLS list 1-54J located to the left of the PRIMARY SYMBOLS tree view 2-63A. The FIXED SYMBOLS list 1-54J divides the easy-to-remember PRIMARY SYMBOLS into 11 LETTER SYMBOLS 1-55J between 'B' and 'Z', three NUMBER SYMBOLS 1-56J, '4', '5' and '7', and 18 VISUAL SYMBOLS 1-57J such as 'lantern', 'pointer', etc. The FIXED SYMBOLS list 1-54J shows all of the primary symbols at one glance without scrolling. See FIG. 1J for details.)

STEP THREE: A user next counts strokes in the unknown character 2-19G and enters a count of eight in a STROKES drop-down menu 2-72G. Do not be concerned if the stroke count is not exact. One option is to use a stroke range drop-down menu to insert a user's plus or minus search number that compensates for user error in stroke counting. A stroke tutorial, "Don't Be Spooked by Strokes," FIGS. 1F to 1H, can be reached by clicking a QUESTION MARK button 2-71A that is located next to the STROKES drop-down menu 2-72G. In this example, a RANGE drop-down menu 2-73G shows a zero to indicate that the user is sure that the stroke count is accurate and that a numerical choice of range is unnecessary.

STEP FOUR: Click a GET WORD button 2-74A. A RESULTS set display 2-75G returns three candidate characters that meet the given criteria. The unknown character 2-19G appears in first place in the CANDIDATE CHARACTERS TEXT display 2-76G and is also shown in the ENLARGED CHARACTER display 2-78G. Output is the character text and its TRANSLATION 2-79G that gives the character's Pinyin spelling, stroke number, tone, English (or another language), and part of speech of the ENLARGED CHARACTER 2-76G, formerly known as the unknown character 2-19G. (Note: To access the character text, etc. of any character in the CANDIDATE CHARACTERS TEXT display 2-76G click to transfer the chosen character text to the ENLARGED CHARACTER display 2-78G.)

STEP FIVE: Click a downward-pointing arrow 2-81G to transfer the first target character 2-19G fa into a TRANSLATION BIN 2-80G to reside in a FIRST CHARACTER HOLD display 2-82G. A box marked EMPTY 2-83G indicates that there is no action, as yet, in the TRANSLATION BIN 2-80G.

STEP SIX: Click A NEW SEARCH button 2-53A to begin translation of a second target character. This action clears the activated display unit with the exception of the FIRST CHARACTER HOLD display 2-82G that now resides in the TRANSLATION BIN 2-80G. (However, as a second character is being located, the first located character text 2-82G in the TRANSLATION BIN 2-80G may be clicked at any time to yield its full translation. If the user does not wish to continue the process, click a CLEAR BIN button 2-84G.)

A NEW SEARCH button 2-53A is used to find another user-introduced, unknown character.

FIG. 2H—Use the STANDARD MODE and TRANSLATION BIN to Output a Second Character Text, Pinyin Spelling, and Translation of Combined, User-Introduced, Unknown Characters:

EXAMPLE: A user brings to the computer an unknown character from outside of the system, e.g., as found in a newspaper, technical journal or on a street sign, etc. (As a part of the output from the system, the unknown character will be made available as character text for input into other software systems, e.g., Microsoft Word. The system also outputs the character's associated Pinyin spelling, stroke number, tone and translation into English or another language that precludes the need for other hard-copy or electronic translation devices.) For purpose of this example, the unknown character chosen by the user is shown on each side of the top of the display (FIG. 2H) as 2-19H. (This will be the second target character to be placed in the TRANSLATION BIN 2-80G.) Again, a WHAT NEXT box 2-22H at the top of the figure provides simple directions. (Any user, even one who knows nothing about character configuration or Pinyin spelling, can use this simple system successfully, on an average, in less than a minute from beginning of search to output of character text, Pinyin and translation.)

STEP ONE: Now that the first translated target character 2-81G is resting in the Translation Bin 2-80G, a next step is to continue the process by translating the second target character 2-19H. Click a plus sign to the left of the primary symbol 'mouth' 345, located in a PRIMARY SYMBOLS tree view 2-63A, to open to its secondary symbols. (A minus sign 299 to the left of the primary symbol 'mouth' 345 indicates that 'mouth' has been opened to show its secondary symbols.) Double click symbol name 'mouth filled' 347 to place symbol in MY SELECTIONS list box 2-70H. Next, double click primary symbol 'pole' 307 to reach 'pole plus 3 lines' 313. Again, double click symbol name 'pole plus 3 lines' 313 to reach, in turn, its related secondary symbol 'king' 314. (Minus signs 299 to the left of the symbol 'pole' 307 as well as 'pole plus 3 lines' 313 indicate that both the primary and secondary symbols have been opened to show their related symbol 'king' 314.) (A handy guide to PRIMARY SYMBOLS is always available in a FIXED SYMBOLS list 1-54J located to the left of the PRIMARY SYMBOLS tree view 2-63A. The FIXED SYMBOLS list 1-54J divides the easy-to-remember PRIMARY SYMBOLS into 11 LETTER SYMBOLS 1-55J between 'B' and 'Z', three NUMBER SYMBOLS 1-56J, '4', '5', and '7', and 18 VISUAL SYMBOLS 1-57J such as 'lantern', 'pointer', etc. The FIXED SYMBOLS list 1-54J shows all of the primary symbols at one glance without scrolling. See FIG. 1J for details.)

STEP TWO: Double click symbol name 'king' 314 to place it in MY SELECTIONS list box 2-70H. (The user may double click any number of symbols, in turn, to place them in MY SELECTIONS list box 2-70H. To delete an unwanted symbol, select it from MY SELECTIONS list box 2-70H and double click.)

STEP THREE: A user next counts strokes in the unknown character 2-19H and enters a count of eight in a STROKES drop-down menu 2-72H. Do not be concerned if the stroke count is not exact. One option is to use a stroke range drop-down menu to insert a user's plus or minus search number that compensates for user error in stroke counting. A stroke tutorial, "Don't Be Spooked by Strokes," FIGS. 1F to 1H, can be reached by clicking a QUESTION MARK button 2-71A that is located next to the STROKES drop-down menu 2-72H. In this example, a RANGE drop-down menu 2-73H shows a zero to indicate that the user is sure that the stroke count is accurate and that a numerical choice of range is unnecessary.

STEP FOUR: Click a GET WORD button 2-74A. A RESULTS set display 2-75H indicates that four characters meet the user-chosen criteria of symbols and stroke number. The unknown character 2-19H is shown in first place in the CANDIDATE CHARACTERS TEXT display 2-76H and is also shown in the ENLARGED TARGET CHARACTER 2-78H. Output is the character text and its TRANSLATION 2-79H that gives the character's Pinyin spelling, stroke number, tone, English (or another language), and part of speech of the ENLARGED CHARACTER 2-76H, formerly known as the unknown character 2-19H. (Note: To access the character text, etc. of any character in the CANDIDATE CHARACTERS TEXT display 2-76H click to transfer the chosen character text to the ENLARGED CHARACTER display 2-78H.)

STEP FIVE: Click the TRANSLATION BIN'S 2-80G downward pointing arrow 2-81G to transfer results of the translation of the second target character guo 2-19H into the TRANSLATION BIN'S TEXT display unit 2-85H.

STEP SIX: The DATA box 2-86H indicates a correlation between the first and second target characters that now reside together in the TRANSLATION BIN. Click a TRANSLATION ADVICE DATA button 2-86H to activate a TRANSLATION COUPLED window 2-87H. The COUPLED TRANSLATION 2-88H is different from either of the two translations of its component parts. In this case, fǎ means law or statute, gùo means country, and the combined characters f ǎ gùo mean France. A user may continue to view the translation of either character at any time by clicking the CHARACTER PICTURE 2-82G or 2-85H in the TRANSLATION BIN 2-80G. The TRANSLATION BIN may be closed with the CLEAR BIN button 2-84G. A CLOSE button 2-89H closes the COUPLED CHARACTERS translation 2-87H.

(Note: A TRANSLATION BIN 2-80G may continue to be used to locate other coupled words in a sentence. For example, if the sentence Fǎ gùo shì mín zhǔ meaning France is a democracy were to be translated, the TRANSLATION COUPLED WINDOW 2-87H would show the first line as fǎ gùo meaning France and show, in a second line, the coupled characters mín zhǔ meaning democracy. The uncoupled verb shì meaning is would not be linked to any other character.)

A NEW SEARCH button 2-53A is used to find another user-introduced character.

Figure 2I:
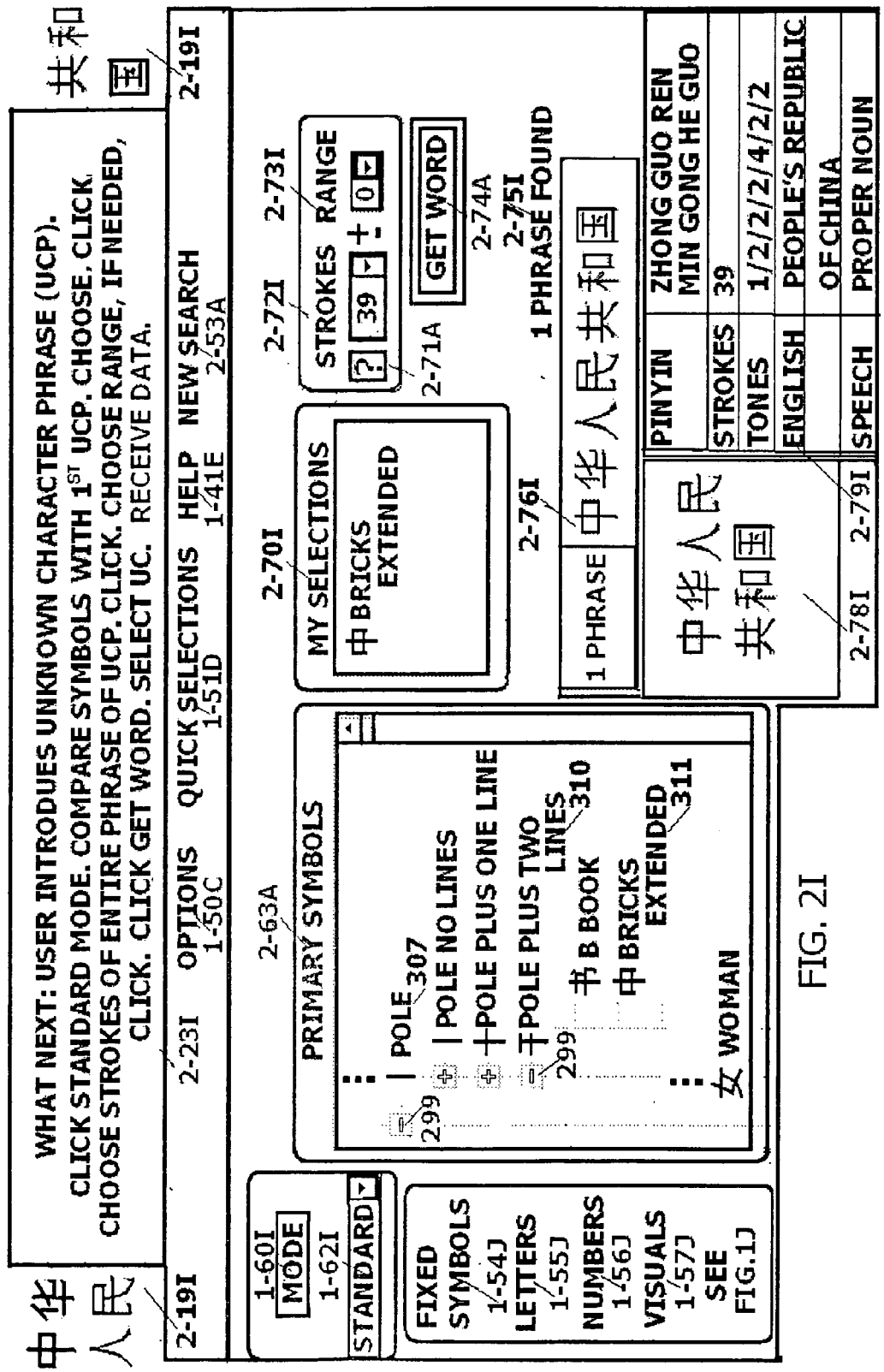

FIG. 2I—Use the STANDARD MODE and Both Primary and Secondary Symbols to Output a Character Text Phrase, Pinyin Spelling, and Translation of a User-Introduced, Unknown Character Phrase:

A Character Phrase, composed of several individual characters, is often strung together to designate a proper name or a technical term. Such phrases are simple to translate. It requires only that symbols for the first character be entered in a MY SELECTIONS list box along with a total number of strokes for the entire phrase.

EXAMPLE: A user brings to the computer an unknown character phrase from outside of the system, e.g., as found in a newspaper, technical journal or on a street sign, etc. (As a part of the output from the system, the unknown character will be made available as character text for input into other software systems, e.g., Microsoft Word. The system also outputs the character's associated Pinyin spelling, stroke number, tone and translation into English or another language that precludes the need for other hard-copy or electronic translation devices.) For purpose of this example, the unknown character phrase, chosen by the user, is shown, extending from left to right on each side of the top of the screen (FIG. 2I) as 2-19I. Again, a WHAT NEXT box 2-23I at the top of the figure provides simple directions. (Any user, even one who knows nothing about character configuration or Pinyin spelling, can use this simple system successfully, on an average, in less than a minute from beginning of search to output of character text, Pinyin and translation.)

STEP ONE: Select STANDARD 1-62I from the MODE drop-down menu 1-60I.

STEP TWO: Decide which primary symbol resembles most closely the first target character of the phrase 2-19I. To do so, refer to a PRIMARY SYMBOLS tree view 2-63A. (A right click on any symbol in the tree view 2-63A will present several examples of that symbol as used in different characters.) The choices are either 'mouth' or 'pole'. (This example uses 'pole' 307.) Select, and double click the name 'pole' 307 to open to 'pole plus 2 lines' 310. Scroll to the related symbol 'bricks extended' 311. (A minus sign 299 to the left of the primary symbol 'pole' 307 and its secondary symbol 'pole plus 2 lines' 310 indicates that these two symbols have been opened to show their related symbol 'bricks extended' 311.) (A handy guide to PRIMARY SYMBOLS is always available in a FIXED SYMBOLS list 1-54J located to the left of the PRIMARY SYMBOLS tree view 2-63A. The FIXED SYMBOLS list 1-54J divides the easy-to-remember PRIMARY SYMBOLS into 11 LETTER SYMBOLS 1-55J between B' and 'Z', three NUMBER SYMBOLS 1-56J, '4', '5' and '7', and 17 VISUAL SYMBOLS 1-57J such as 'lantern', 'pointer', etc. The FIXED SYMBOLS list 1-54J shows all of the primary symbols at one glance without scrolling. See FIG. 1J for details.)

STEP THREE: Double click symbol name 'bricks extended' 311 to place the symbol in MY SELECTIONS list box 2-70I. (The user may double click any number of symbols, in turn, to place them in MY SELECTIONS list box. To delete an unwanted symbol, select it from MY SELECTIONS list box 2-70I and double click.)

STEP FOUR: A user next counts strokes in the unknown character 2-19I and enters a count of 39 in a STROKES drop-down menu 2-72I. Do not be concerned if the stroke count is not exact. One option is to use a stroke range drop-down menu to insert a user's plus or minus search number that compensates for user error in stroke counting. A stroke tutorial, "Don't Be Spooked by Strokes," FIGS. 1F to 1H, can be reached by clicking a QUESTION MARK button 2-71A that is located next to the STROKES drop-down menu 2-72I. In this example, a RANGE drop-down menu 2-73I shows a zero to indicate that the user is sure that the stroke count is accurate and that a numerical choice of range is unnecessary.

STEP FIVE: Click a GET WORD button 2-74A. A RESULTS set display 2-75I reports a single character phrase. It is shown in both the CANDIDATE CHARACTERS display 2-76I and in the ENLARGED CHARACTER display 2-78I. Output is the character text and its TRANSLATION 2-79I that gives the character's Pinyin spelling, stroke number, tone, English (or another language), and part of speech of the ENLARGED CHARACTER 2-76I, formerly known as the unknown character 2-19I. (Note: To access the character text, etc. of any character in the CANDIDATE CHARACTERS TEXT display 2-76I click to transfer the chosen character text to the ENLARGED CHARACTER display 2-78I. (Note: There is a "reverse proportion" rule at work: the larger the number of strokes in a character or a character phrase: the faster the results will be obtained.)

A NEW SEARCH button 2-53A is used to find another target character.

Detailed Descriptions . . . FIGS. 3a and 3b: Side Mode

Primary and secondary symbols are often located in conspicuous positions at an unknown character's left side (from the viewer's standpoint). Take advantage of side position symbols for a quick translation of even the most complicated unknown characters.

FIG. 3A: Use the SIDE MODE and a Distinctive Primary Side Symbol to Output Character Text, Pinyin Spelling, and Translation of a User-Introduced, Unknown Character:

EXAMPLE: A user brings to an electronic device an unknown character with a distinctive primary side symbol. The character is brought from outside of the system, e.g., as found in a newspaper, technical journal or on a street sign, etc. (As a part of the output from the system, the unknown character will be made available as character text for input into other software systems, e.g., Microsoft Word. The system also outputs the character's associated Pinyin spelling, stroke number, tone and translation into English or another language that precludes the need for other hard-copy or electronic translation devices.) For purpose of this example, the unknown character chosen by a user is shown on each side of the top of the screen (FIG. 3A) as 3-19A. Again, a WHAT NEXT box 3-24A at the top of the figure provides simple directions. (Any user, even one who knows nothing about character configuration or Pinyin spelling, can use this simple system successfully, on an average, in less than a minute from beginning of search to output of character text, Pinyin and translation.)

STEP ONE: Select SIDE 1-120I from a MODE drop-down menu 1-60I.

STEP TWO: From a PRIMARY SIDE SYMBOLS tree view 3-121A, select a primary side symbol 'woman side' 302 that matches the 'woman' symbol that appears at the left side of the target character 3-19A. (A Reminder: All character positions are described from the perspective of the user.)

STEP THREE: Double click the symbol name 'woman side' 302 to place the symbol in MY SELECTIONS list box 3-70A. (The user may double click any number of symbols, in turn, to place them in MY SELECTIONS list box. To delete an unwanted symbol, select it from MY SELECTIONS list box 3-70A and double click.)

STEP FOUR: A user next counts strokes in the unknown character 3-19A, and enters a count of 18 in a STROKES drop-down menu 3-72A. Do not be concerned if the stroke count is not exact. One option is to use a stroke range drop-down menu to insert a user's plus or minus search number that compensates for user error in stroke counting. A stroke tutorial, "Don't Be Spooked by Strokes," see FIGS. 1F to 1H can be reached by clicking a QUESTION MARK button 2-71A that is located next to the STROKES drop-down menu 3-72A. In this example, a RANGE drop-down menu 3-73A shows a zero to indicate that the user is sure that the stroke count is accurate and that a numerical choice of range is unnecessary.

STEP FIVE: Click a GET WORD button 2-74A. A RESULTS set display 3-75A shows two candidate characters in the CANDIDATE CHARACTERS TEXT display 3-76A that match the given criteria of symbol and stroke number. Click the second character text to transfer it to an ENLARGED CHARACTER text display 3-78A. Output is the character text and its TRANSLATION 3-79A that gives the character's Pinyin spelling, stroke number, tone, English (or another language), and part of speech of the ENLARGED CHARACTER 3-76A, formerly known as the unknown character 3-19A. (Note: To access the character text, etc. of any character in the CANDIDATE CHARACTERS TEXT display 3-76A click to transfer the chosen character text to the ENLARGED CHARACTER display 3-78A.)

A NEW SEARCH button 2-53A is used to find another user-introduced character.

FIG. 3B—Use the SIDE MODE and a Secondary Side Symbol to Output a Character Text, Pinyin Spelling, and Translation of a User-Introduced, Unknown Character:

EXAMPLE: A user brings to the computer an unknown character that has a distinctive secondary side symbol as a part of its configuration. The character is brought from outside of the system, e.g., as found in a newspaper, technical journal or on a street sign, etc. (As a part of the output from the system, the unknown character will be made available as character text for input into other software systems, e.g., Microsoft Word. The system also outputs the character's associated Pinyin spelling, stroke number, tone and translation into English or another language that precludes the need for other hard-copy or electronic translation devices.) For purpose of this example, the unknown character chosen by the user is shown on each side of the top of the screen (FIG. 3B) as 3-19B. Again, a WHAT NEXT box 3-24A at the top of the figure provides simple directions. (Any user, even one who knows nothing about character configuration or Pinyin spelling, can use this simple system successfully, on an average, in less than a minute from beginning of search to output of character text, Pinyin and translation.)

STEP ONE: Select SIDE 1-120I from the MODE drop-down menu 1-60I.

STEP TWO: A user refers to a PRIMARY SIDE SYMBOLS tree view 3-121A. Decide which primary symbol most closely resembles the left side symbol of the target characters 3-19B. Choose the primary symbol 'T' 327 from the PRIMARY SIDE SYMBOLS tree view 3-121A. Click a plus sign on the left side of the primary symbol 'T' to open to its secondary symbols. (In FIG. 3B, a minus sign 299, on the left side of the Primary Symbol 'T', indicates that the PRIMARY SYMBOL 'T' has already been opened.) Scroll down the secondary symbols of 'T' to reach 'T figurative side' 328 and double click the symbol name to place the symbol in MY SELECTIONS list box 3-70B. (User may double click any number of symbols, in turn, to place them in MY SELECTIONS list box. To delete an unwanted symbol, select it from MY SELECTIONS list box 3-70B and double click.)

STEP THREE: A user next counts strokes in the unknown character 3-19B. User enters a count of 25 in a STROKES drop-down menu 3-72A. Do not be concerned if the stroke count is not exact. One option is to use a stroke range drop-down menu to insert a user's plus or minus search number that compensates for user error in stroke counting. A stroke tutorial, "Don't Be Spooked by Strokes," see FIGS. 1F to 1H can be reached by clicking a QUESTION MARK button 2-71A that is located next to the STROKES drop-down menu 3-72B. In this example, a RANGE drop-down menu 3-73B shows a zero to indicate that the user is sure that the stroke count is accurate and that a numerical choice of range is unnecessary.

STEP FOUR: The final step is to click a GET WORD button 2-74A. A RESULTS box 3-75B reports three characters that meet the criteria of symbol and stroke number. The unknown character is in first place in both the CANDIDATE CHARACTERS TEXT display 3-76B and in the ENLARGED TARGET CHARACTER 3-78B. Output is the character text and its TRANSLATION 3-79B that gives the character's Pinyin spelling, stroke number, tone, English (or another language), and part of speech of the ENLARGED CHARACTER 3-76B, formerly known as the unknown character 3-19B. (Note: To access the character text, etc. of any character in the CANDIDATE CHARACTERS TEXT display 3-76B click to transfer the chosen character text to the ENLARGED CHARACTER display 3-78B.)

A NEW SEARCH button 2-53A is used to find a new user-introduced character.

Detailed Descriptions . . . FIGS. 4a and 4b: Top Mode

Primary and secondary symbols are often located in conspicuous positions at the top of a character. The user may take advantage of the fact that there are only a few such symbols. This leads to a quick translation.

FIG. 4A—Use a TOP MODE and a Primary Top Symbol to Output Character Text, Pinyin Spelling, and Translation of a User-Introduced, Unknown Character:

EXAMPLE: A user brings to an electronic device an unknown character with a distinctive primary top symbol. The character is brought from outside of the system, e.g., as found in a newspaper, technical journal or on a street sign, etc. (As a part of the output from the system, the unknown character will be made available as character text for input into other software systems, e.g., Microsoft Word. The system also outputs the character's associated Pinyin spelling, stroke number, tone and translation into English or another language that precludes the need for other hard-copy or electronic translation devices.) For purpose of this example, an unknown character chosen by a user is shown on each side of the top of the screen (FIG. 4A) as 4-19A. Again, a WHAT NEXT box 4-25A at the top of the figure provides simple directions. (Any user, even one who knows nothing about character configuration or Pinyin spelling, can use this simple system successfully, on an average, in less than a minute from beginning of search to output of character text, Pinyin and translation.)

STEP ONE: Select TOP 1-124I from the MODE drop-down menu, 1-60I.

STEP TWO: Refer to an ALL TOP SYMBOLS tree view 4-125A to locate a primary symbol that most resembles the top of the target character 4-19A. Choose the primary symbol 'lantern top' 331.

STEP THREE: Double click symbol name 'lantern top' to place the symbol in MY SELECTIONS list box 4-70A. (User may double click any number of symbols, in turn, to place them in MY SELECTIONS list box. To delete an unwanted symbol, select it from MY SELECTIONS list box 4-70A and double click.)

STEP FOUR: A user next counts strokes in the unknown character 4-19A. User enters a count of six in a STROKES drop-down menu 4-72A. Do not be concerned if the stroke count is not exact. One option is to use a stroke range drop-down menu to insert a user's plus or minus search number that compensates for user error in stroke counting. A stroke tutorial, "Don't Be Spooked by Strokes," see FIGS. 1F to 1H can be reached by clicking a QUESTION MARK button 2-71A that is located next to the STROKES drop-down menu 4-72A. In this example, a RANGE drop-down menu 4-73A shows a zero to indicate that the user is sure that the stroke count is accurate and that a numerical choice of range is unnecessary.

STEP FIVE: The final step is to click a GET WORD button 2-74A. A RESULTS set display 4-75A, reports four target characters found that meet the criteria of symbols and stroke number. The unknown character is displayed in first place in the CANDIDATE CHARACTERS TEXT display 4-76A and also appears in the ENLARGED CHARACTER display 4-78A. Output is the character text and its TRANSLATION 4-79A that gives the character's Pinyin spelling, stroke number, tone, English (or another language), and part of speech of the ENLARGED CHARACTER 4-76A, formerly known as the unknown character 4-19A. (Note: To access the character text, etc. of any character in the CANDIDATE CHARACTERS TEXT display 4-76A click to transfer the chosen character text to the ENLARGED CHARACTER display 4-78A.)

A NEW SEARCH button 2-53A is used to find another new user-introduced character.

FIG. 4B—Use a TOP MODE and a Secondary Top Symbol to Output Character Text, Pinyin Spelling, and Translation of a User-Introduced, Unknown Character:

EXAMPLE: A user brings to the computer an unknown character with a distinctive secondary top symbol. The character is brought from outside of the system, e.g., as found in a newspaper, technical journal or on a street sign, etc. (As a part of the output from the system, the unknown character will be made available as character text for input into other software systems, e.g., Microsoft Word. The system also outputs the character's associated Pinyin spelling, stroke number, tone and translation into English or another language that precludes the need for other hard-copy or electronic translation devices.) For purpose of this example, the unknown character chosen by the user is shown on each side of the top of the screen (FIG. 4B) as 4-19B. Again, a WHAT NEXT box 4-25A at the top of the figure provides simple directions. (Any user, even one who knows nothing about character configuration or Pinyin spelling, can use this simple system successfully, on an average, in less than a minute from beginning of search to output of character text, Pinyin and translation.)

STEP ONE: Select TOP 1-124I from the MODE dropdown menu, 1-6OI.

STEP TWO: Refer to an ALL TOP SYMBOLS tree view 4-125A to locate a primary symbol that most resembles the top of the target character 4-19B. Choose a primary symbol 'pole doubled' 332 and double click to reach its Secondary Symbol 'grid/grass' 333.

STEP THREE: Double click the secondary symbol name 'grid/grass' to place the symbol in MY SELECTIONS list box 4-70B. (The user may click any number of symbols, in turn, to place the symbol in MY SELECTIONS list box. To delete an unwanted symbol, select it from MY SELECTIONS list box 4-70B and click.)

STEP FOUR: A user next counts strokes in the unknown character 4-19B. User enters a count of five in a STROKES drop-down menu 4-72B. Do not be concerned if the stroke count is not exact. One option is to use a stroke range drop-down menu to insert a user's plus or minus search number that compensates for user error in stroke counting. A stroke tutorial, "Don't Be Spooked by Strokes," see FIGS. 1F to 1H can be reached by clicking a QUESTION MARK button 2-71A that is located next to the STROKES drop-down menu 4-72B. In this example, a RANGE drop-down menu 4-73B shows a zero to indicate that the user is sure that the stroke count is accurate and that a numerical choice of range is unnecessary.

STEP FIVE: The final step is to click a GET WORD button 2-74A. A RESULTS set display 4-75B indicates there are three characters found that meet the given criteria of symbol and stroke number. The target character is in first place in the CANDIDATE CHARACTERS TEXT display 4-76B as-well-as in the ENLARGED CHARACTER display 4-78B. Output is the character text and its TRANSLATION 4-79B that gives the character's Pinyin spelling, stroke number, tone, English (or another language), and part of speech of the ENLARGED CHARACTER 4-76B, formerly known as the unknown character 4-19B. (Note: To access the character text, etc. of any character in the CANDIDATE CHARACTERS TEXT display 4-76B click to transfer the chosen character text to the ENLARGED CHARACTER display 4-78B.)

A NEW SEARCH button 2-53A is used to find another new user-introduced character.

Detailed Descriptions . . . FIG. 5: Bottom Mode

Prominent symbols are often located in conspicuous positions at the bottom of a target character. They are easy to find because there are only eight primary bottom symbols with a few of their secondary symbols.

FIG. 5—Use the BOTTOM MODE and a Bottom Secondary Symbol to Output Character Text, Pinyin Spelling, and Translation of a User-Introduced, Unknown Character:

EXAMPLE: A user brings to the computer an unknown character with a distinctive secondary bottom symbol. The character is brought from outside of the system (e.g., as found in a newspaper, technical journal or on a street sign, etc. (As a part of the output from the system, the unknown character will be made available as character text for input into other software systems, e.g., Microsoft Word. The system also outputs the character's associated Pinyin spelling, stroke number, tone and translation into English or another language that precludes the need for other hard-copy or electronic translation devices.) For purpose of this example, the unknown character chosen by the user is shown on each side of the top of the screen (FIG. 5) as 5-19. A WHAT NEXT box 5-26 at the top of the figure provides simple directions. (Any user, even one who knows nothing about character configuration or Pinyin spelling, can use this simple system successfully, on an average, in less than a minute from beginning of search to output of character text, Pinyin and translation.)

STEP ONE: Select BOTTOM 1-128I from the MODE drop-down menu 1-60I.

STEP TWO: Refer to an ALL BOTTOM SYMBOLS tree view 5-129. Decide which one of eight primary bottom symbols looks most like the bottom of the target character 5-19. It is the Primary Symbol 'dashes' 334. Click the plus sign to the left of 'Primary Symbol 'dashes'. (In FIG. 5 a minus sign 299 on the Primary Symbol 'dashes' left side indicates that the symbol has been opened to show the Secondary Symbol of 'dashes'.) Double click the Secondary Symbol name 'black' 335 to place the symbol in MY SELECTIONS list box 5-70. (A user may double click any number of symbols, in turn, to place them in MY SELECTIONS list box. To delete an unwanted symbol, select it from MY SELECTIONS list box 5-70 and double click.)

STEP THREE: A user next counts strokes in the unknown character 5-19. User enters a count of 17 in a STROKES drop-down menu 5-72. Do not be concerned if the stroke count is not exact. One option is to use a stroke range drop-down menu to insert a user's plus or minus search number that compensates for user error in stroke counting. A stroke tutorial, "Don't Be Spooked by Strokes," see FIGS. 1F to 1H can be reached by clicking a QUESTION MARK button 2-71A that is located next to the STROKES drop-down menu 5-72. In this example, a RANGE drop-down menu 5-73 shows a zero to indicate that the user is sure that the stroke count is accurate and that a numerical choice of range is unnecessary.

STEP FOUR: The final step is to click a GET WORD button 2-74A. The RESULTS set display 5-75 indicates there are three characters that meet the criteria of symbols and stroke number, the second of which is the unknown character as shown in the CANDIDATE CHARACTERS TEXT display 5-76. Click to place the unknown character in the ENLARGED CHARACTER display 5-78. Output is the character text and its TRANSLATION 5-79 that gives the character's Pinyin spelling, stroke number, tone, English (or another language), and part of speech of the ENLARGED CHARACTER 5-76, formerly known as the unknown character 5-19. (Note: To access the character text, etc. of any character in the CANDIDATE CHARACTERS TEXT display 5-76 click to transfer the chosen character text to the ENLARGED CHARACTER display 5-76.)

A NEW SEARCH button 2-53A is used to find another new user-introduced character.

Detailed Descriptions . . . FIGS. 6a to 6c: Pair Mode

Chinese Characters often contain pairs of primary and/or secondary symbols. Pairs of an unknown character can be located through the PAIR MODE.

FIG. 6A—Use the PAIR MODE and a Pair of a Primary Symbol to Output Character Text, Pinyin Spelling, and Translation of a User-Introduced, Unknown Character:

EXAMPLE: A user brings to the computer an unknown character containing a pair of distinctive primary symbols. The character is brought from outside of the system, e.g., as found in a newspaper, technical journal or on a street sign, etc. (As a part of the output from the system, the unknown character will be made available as character text for input into other software systems, e.g., Microsoft Word. The system also outputs the character's associated Pinyin spelling, stroke number, tone and translation into English or another language that precludes the need for other hard-copy or electronic translation devices.) For purpose of this example, the unknown character chosen by the user is shown on each side of the top of the screen (FIG. 6A) as 6-19A. A WHAT NEXT box 6-27A at the top of the figure provides simple directions. (Any user, even one who knows nothing about character configuration or Pinyin spelling, can use this simple system successfully, on an average, in less than a minute from beginning of search to output of character text, Pinyin and translation.)

STEP ONE: Select PAIR MODE 1-132 from the MODE drop-down menu 1-60I.

STEP TWO: Select from PRIMARY PAIR SYMBOLS tree view 6-133A a primary symbol that is found as a pair in the unknown character 6-19A. In this case, choose the primary symbol 'roof/base' 304, two of which are found in the unknown character 6-19A.

STEP THREE: Double click symbol name 'roof/base' to place the symbol in MY SELECTIONS list box 6-70A. (The user may double click any number of symbols, in turn, to place them in MY SELECTIONS list box. To delete an unwanted symbol, select it from MY SELECTIONS list box 6-70A and double click.)

STEP FOUR: A user next counts strokes in the unknown character 6-19A. User enters a count of seven in a STROKES drop-down menu 6-72A. Do not be concerned if the stroke count is not exact. One option is to use a stroke range drop-down menu to insert a user's plus or minus search number that compensates for user error in stroke counting. A stroke tutorial, "Don't Be Spooked by Strokes," see FIGS. 1F to 1H can be reached by clicking a QUESTION MARK button 2-71A that is located next to the STROKES drop-down menu 6-72A. In this example, a RANGE drop-down menu 6-73A shows a zero to indicate that the user is sure that the stroke count is accurate and that a numerical choice of range is unnecessary.

STEP FIVE: The final step is to click a GET WORD button 2-74A. The RESULTS set display 6-75A indicates that there are four characters that meet the criteria of symbol and stroke number. The last character in the CANDIDATE CHARACTER TEXT DISPLAY 6-76A matches the unknown character 6-19A. Click to place the chosen character in the ENLARGED CHARACTER display 6-78A. Output is the character text and its TRANSLATION 6-79A that gives the character's Pinyin spelling, stroke number, tone, English (or another language), and part of speech of the ENLARGED CHARACTER 6-76A, formerly known as the unknown character 6-19A. (Note: To access the character text, etc. of any character in the CANDIDATE CHARACTERS TEXT display 6-76A click to transfer the chosen character text to the ENLARGED CHARACTER display 6-78A.)

A NEW SEARCH button 2-53A is used to find another new user-introduced, unknown character.

FIG. 6B—Use the PAIR MODE and a Pair of a Secondary Symbol to Output Character Text, Pinyin Spelling, and Translation of a User-Introduced, Unknown Character:

EXAMPLE: A user brings to the computer an unknown character displaying a pair of one secondary symbol. The character is brought from outside of the system, e.g., as found in a newspaper, technical journal or on a street sign, etc. (As a part of the output from the system, the unknown character will be made available as character text for input into other software systems, e.g., Microsoft Word. The system also outputs the character's associated Pinyin spelling, stroke number, tone and translation into English or another language that precludes the need for other hard-copy or electronic translation devices.) For purpose of this example, the unknown character as chosen by the user is shown on each side of the top of the screen (FIG. 6B) as 6-19B. A WHAT NEXT box 6-27A at the top of the figure provides simple directions. (Any user, even one who knows nothing about character configuration or Pinyin spelling, can use this simple system successfully, on an average, in less than a minute from beginning of search to output of character text, Pinyin and translation.)

STEP ONE: Select PAIR MODE 1-132I from the MODE drop-down menu 1-60I.

STEP TWO: Refer to PRIMARY PAIR SYMBOLS tree view 6-133A. Look for a primary symbol that resemble the pair of symbols in the target character 6-19B. There are two such primary symbols: the 'J' and the 'roof/base'. This example uses 'J' 322. Select 'J' 322 from the PRIMARY PAIR SYMBOLS tree view 6-133A. (When the plus button on the left side of the primary symbol 'J' is clicked, a minus button 299 appears along with all secondary symbols of 'J'.)

STEP THREE: Scroll the list of the secondary symbols of the 'J' primary symbol to locate a symbol 'fly' 324. Double click the symbol name 'fly' to place the symbol in MY SELECTIONS list box 6-70B. (The user may double click any number of symbols, in turn, to place them in MY SELECTIONS list box. To delete an unwanted symbol, select it from MY SELECTIONS list box 6-70B and double click.)

STEP FOUR: A user next counts strokes in the unknown character 6-19B. User enters a count of 13 in a STROKES drop-down menu 6-72B. Do not be concerned if the stroke count is not exact. One option is to use a stroke range drop-down menu to insert a user's plus or minus search number that compensates for user error in stroke counting. A stroke tutorial, "Don't Be Spooked by Strokes," see FIGS. 1F to 1H can be reached by clicking a QUESTION MARK button 2-71A that is located next to the STROKES drop-down menu 6-72B. In this example, a RANGE drop-down menu 6-73B shows a zero to indicate that the user is sure that the stroke count is accurate and that a numerical choice of range is unnecessary.

STEP FIVE: The final step is to click A GET WORD button 2-74A. A RESULT set display 6-75B shows that two characters were found that match the criteria. The unknown character is shown in first place in a CANDIDATE CHARACTERS TEXT display 6-76B and is also shown in an ENLARGED TARGET CHARACTER list box 6-78B. Output is the character text and its TRANSLATION 6-79B that gives the character's Pinyin spelling, stroke number, tone, English (or another language), and part of speech of the ENLARGED CHARACTER 6-76B, formerly known as the unknown character 6-19B. (Note: To access the character text, etc. of any character in the CANDIDATE CHARACTERS TEXT display 6-76B click to transfer the chosen character text to the ENLARGED CHARACTER display 6-78B.)

A NEW SEARCH button 2-53A is used to find another new user-introduced, unknown character.

FIG. 6C—Use a PAIR MODE and a Pair of Secondary Symbols of a Primary Symbol 'mouth' to Output Character Text, Pinyin Spelling, and Translation of a User-Introduced, Unknown Character:

A primary symbol 'mouth' is shown as a small square. Many secondary symbols of 'mouth' already look like pairs. These include, for example, the symbol 'bricks horizontal' that resembles two squares stacked on top of each other. Treat all such pairs of a 'mouth' primary symbol as if they were a single. It requires two such pairs to make a true pair in this context. This is illustrated in the example below.

EXAMPLE: A user brings to the computer an unknown character with a pair of a secondary symbol of the primary symbol 'mouth'. The character is brought from outside of the system, e.g., as found in a newspaper, technical journal or on a street sign, etc. (As a part of the output from the system, the unknown character will be made available as character text for input into other software systems, e.g., Microsoft Word. The system also outputs the character's associated Pinyin spelling, stroke number, tone and translation into English or another language that precludes the need for other hard-copy or electronic translation devices.) For purpose of this example, the unknown character chosen by the user is shown on each side of the top of the screen (FIG. 6C) as 6-19C. A WHAT NEXT box 6-27A at the top of the figure provides simple directions. (Any user, even one who knows nothing about character configuration or Pinyin spelling, can use this simple system successfully, on an average, in less than a minute from beginning of search to output of character text, Pinyin and translation.)

STEP ONE: Select PAIR MODE 1-132I from a MODE drop-down menu 1-60I.

STEP TWO: Refer to a PRIMARY PAIR SYMBOLS tree view 6-133A. Look for a primary symbol that most closely resembled two stacked squares depicted in the target character 6-19C. (The primary symbol 'mouth' 345 is the choice.) Select and click the symbol name 'mouth' to open to its secondary symbols.

STEP THREE: Scroll the list to locate a secondary symbol 'mouth filled' 347. Click a plus sign to the left of the symbol name 'mouth filled' to open to its related secondary symbols. (A minus sign 299 to the left of both the mouth and the mouth filled symbols indicate that the symbols have been opened to show secondary symbols.) Scroll to 'bricks horizontal' 353 and double click the symbol name to place 'bricks horizontal' in MY SELECTIONS list box 6-70C. (The user may double click any number of symbols, in turn, to place them in MY SELECTIONS list box. To delete an unwanted symbol, select it from MY SELECTIONS list box 6-70C and double click.)

STEP FOUR: A user next counts strokes in the unknown character 6-19C. User enters a count of nine in a STROKES drop-down menu 6-72C. Do not be concerned if the stroke count is not exact. One option is to use a stroke range drop-down menu to insert a user's plus or minus search number that compensates for user error in stroke counting. A stroke tutorial, "Don't Be Spooked by Strokes," see FIGS. 1F to 1H can be reached by clicking a QUESTION MARK button 2-71A that is located next to the STROKES drop-down menu 6-72C. In this example, a RANGE drop-down menu 6-73C shows a zero to indicate that the user is sure that the stroke count is accurate and that a numerical choice of range is unnecessary.

STEP FIVE: As the final step, click a GET WORD button 2-74A. A RESULT set display 6-75C indicates that three characters meet the criteria. The unknown character is shown in first place in the CANDIDATE CHARACTERS TEXT display 6-76C and is also displayed in the ENLARGED CHARACTER display 6-78C. Output is the character text and its TRANSLATION 6-79C that gives the character's Pinyin spelling, stroke number, tone, English (or another language), and part of speech of the ENLARGED CHARACTER 6-76C, formerly known as the unknown character 6-19C. (Note: To access the character text, etc. of any character in the CANDIDATE CHARACTERS TEXT display 6-76C click to transfer the chosen character text to the ENLARGED CHARACTER display 6-78C.)

A NEW SEARCH button 2-53A is used to find another new user-introduced character.

Detailed Descriptions . . . FIGS. 7A and 7B: Twin Character Symbol Mode

Twin character symbols show two identical Chinese characters that have been placed together. In some cases such characters form a new, cohesive word that has a different meaning from that of each character when used alone.

FIG. 7A—Use a TWIN CHARACTERS SYMBOL MODE to Output Character Text, Pinyin Spelling, and Translation of Two, User-Introduced, Unknown Identical Characters with Identical Primary Symbols:

EXAMPLE: A user brings to the computer two unknown, identical twin characters. The characters are brought from outside of the system, e.g., as found in a newspaper, technical journal or on a street sign, etc. (As a part of the output from the system, the unknown character will be made available as character text for input into other software systems, e.g., Microsoft Word. The system also outputs the character's associated Pinyin spelling, stroke number, tone and translation into English or another language that precludes the need for other hard-copy or electronic translation devices.) For purpose of this example, the unknown, twin character as chosen by the user is shown on each side of the top of the screen (FIG. 7A) as 7-19A. A WHAT NEXT box 7-28A at the top of the figure provides simple directions. (Any user, even one who knows nothing about character configuration or Pinyin spelling, can use this simple system successfully, on an average, in less than a minute from beginning of search to output of character text, Pinyin and translation.)

STEP ONE: Click TWIN CHARACTER SYMBOL 1-136I from the MODE drop-down menu 1-60I.

STEP TWO: Select from a TWIN CHARACTER SYMBOL tree view 7-137A a primary symbol that matches the pair found in the target character 7-19A. In this case, select the primary symbol 'J' 325.

STEP THREE: Double click the symbol name 'J' 325 to place the symbol in MY SELECTIONS list box 7-70A. (User may double click any number of symbol names, in turn, to place them in MY SELECTIONS list box. To delete an unwanted symbol, select it from MY SELECTIONS list box 7-70A and double click.)

STEP FOUR: A user next counts strokes in the unknown character 7-19A. User enters a count of 20 in a STROKES drop-down menu 7-72A. Do not be concerned if the stroke count is not exact. One option is to use a stroke range drop-down menu to insert a user's plus or minus search number that compensates for user error in stroke counting. A stroke tutorial, "Don't Be Spooked by Strokes," see FIGS. 1F to 1H can be reached by clicking a QUESTION MARK button 2-71A that is located next to the STROKES drop-down menu 7-72A. In this example, a RANGE drop-down menu 7-73A shows a zero to indicate that the user is sure that the stroke count is accurate and that a numerical choice of range is unnecessary.

STEP FIVE: The final step is to click a Get Word button 2-74A. A RESULTS set display 7-75A indicates that only one character meets the input criteria of symbol and stroke number. The results are shown in both a CANDIDATE CHARACTERS TEXT display 7-76A and in an ENLARGED CHARACTER display 7-78A. Output is the character text and its TRANSLATION 7-79A that gives the character's Pinyin spelling, stroke number, tone, English (or another language), and part of speech of the ENLARGED CHARACTER 7-76A, formerly known as the unknown character 7-19A. (Note: To access the character text, etc. of any character in the CANDIDATE CHARACTERS TEXT display 7-76A click to transfer the chosen character text to the ENLARGED CHARACTER display 7-78A.) A NEW SEARCH button 2-53A is used to find another new user-introduced character FIG. 7B—Use a TWIN CHARACTERS SYMBOL MODE to Output Character Text, Pinyin Spelling, and Translation of Two Identical, User-Introduced, Unknown Characters Having Identical Secondary Symbols:

EXAMPLE: A user brings to the computer two unknown, identical twin characters that contain identical secondary symbols. The character is brought from outside of the system (e.g., as found in a newspaper, technical journal or on a street sign, etc. (As a part of the output from the system, the unknown character will be made available as character text for input into other software systems, e.g., Microsoft Word. The system also outputs the character's associated Pinyin spelling, stroke number, tone and translation into English or another language that precludes the need for other hard-copy or electronic translation devices.) For purpose of this example, the unknown character chosen by the user is shown on each side of the top of the screen (FIG. 7B) as 7-19B. A WHAT NEXT box 7-28A at the top of the figure provides simple directions. (Any user, even one who knows nothing about character configuration or Pinyin spelling, can use this simple system successfully, on an average, in less than a minute from beginning of search to output of character text, Pinyin and translation.)

STEP ONE: Click TWIN CHARACTER 1-136I from the MODE drop-down menu 1-60I.

STEP TWO: Refer to a PRIMARY TWIN CHARACTER SYMBOL tree view 7-137A. Select primary symbol 'B' 336 that most closely resembles the 'b small' 337 of the target character 7-19B.

STEP THREE: Double click the name of primary symbol 'B' in the PRIMARY TWIN CHARACTER SYMBOL tree view 7-137A to open to the 'B' secondary symbols. (When a plus button on the left side of the primary symbol 'B' has been clicked, a minus button 299 appears along with all the secondary symbols of 'B'.) The symbol 'b small' 337 appears. It is also displayed as an unknown twin target character 7-19B. Double click the symbol name 'b small' 337 to place the symbol in MY SELECTIONS list box 7-70B. (The user may double click any number of symbols, in turn, to place them in MY SELECTIONS list box. To delete an unwanted symbol, select it from MY SELECTIONS list box 7-701B and double click.)

STEP FOUR: A user next counts strokes in the unknown character 7-19B. User enters a count of 22 in a STROKES drop-down menu 7-72B. Do not be concerned if the stroke count is not exact. One option is to use a stroke range drop-down menu to insert a user's plus or minus search number that compensates for user error in stroke counting. A stroke tutorial, "Don't Be Spooked by Strokes," see FIGS. 1F to 1H can be reached by clicking a QUESTION MARK button 2-71A that is located next to the STROKES drop-down menu 7-72B. In this example, a RANGE drop-down menu 7-73B shows a zero to indicate that the user is sure that the stroke count is accurate and that a numerical choice of range is unnecessary.

STEP FIVE: The final step is to click a GET WORD button 2-74A. A RESULTS set display 7-75B indicates that only one character meets the criteria of symbol and stroke number. The results are displayed in both a CANDIDATE CHARACTERS TEXT display 7-76B and an ENLARGED CHARACTER display 7-78B. Output is the character text and its TRANSLATION 7-79B that gives the character's Pinyin spelling, stroke number, tone, English (or another language), and part of speech of the ENLARGED CHARACTER 7-76B, formerly known as the unknown character 7-19B. (Note: To access the character text, etc. of any character in the CANDIDATE CHARACTERS TEXT display 7-76B click to transfer the chosen character text to the ENLARGED CHARACTER display 7-78B.)

A NEW SEARCH button 2-53A is used to find another new user-introduced character.

Detailed Descriptions . . . FIG. 8: Triple Symbol Mode

Three or more examples of the same symbol sometimes appear in a Chinese character. This occurs with just seven symbols. These are: 'bricks', 'gate', 'heart', 'mouth', 'roof/base', 'seven', and 'tree'. They are distinctive and easy to find.

FIG. 8—Use a TRIPLE SYMBOL MODE to Output Character Text, Pinyin Spelling, and Translation of a Character Having Three of the Same Symbol in a User-Introduced, Unknown Character:

EXAMPLE: A user brings to the computer an unknown character with three of a kind of the same symbol. The character is brought from outside of the system, e.g., as found in a newspaper, technical journal or on a street sign, etc. (As a part of the output from the system, the unknown character will be made available as character text for input into other software systems, e.g., Microsoft Word. The system also outputs the character's associated Pinyin spelling, stroke number, tone and translation into English or another language that precludes the need for other hard-copy or electronic translation devices.) For purpose of this example, an unknown character chosen by a user is shown on each side of the top of the screen (FIG. 8) as 8-19. A WHAT NEXT box 8-29 at the top of the figure provides simple directions. (Any user, even one who knows nothing about character configuration or Pinyin spelling, can use this simple system successfully, on an average, in less than a minute from beginning of search to output of character text, Pinyin and translation.)

STEP ONE: Select TRIPLE SYMBOL 1-140I from the drop-down MODE menu 1-60I.

STEP TWO: Refer to an ALL TRIPLE SYMBOL tree view 8-141 to locate a symbol that is also shown in the target character 8-19. In this case, select a 'heart' symbol 338.

STEP THREE: Double click the symbol name 'heart' 338 to place the symbol in the MY SELECTIONS list box 8-70. (A user may double click any number of symbols, in turn, to place them in MY SELECTIONS list box. To delete an unwanted symbol, select it from MY SELECTIONS list box 8-70 and double click.)

STEP FOUR: A user next counts strokes in the unknown character 8-19. User enters a count of 15 in a STROKES drop-down menu 8-72. Do not be concerned if the stroke count is not exact. One option is to use a stroke range drop-down menu to insert a user's plus or minus search number that compensates for user error in stroke counting. A stroke tutorial, "Don't Be Spooked by Strokes," see FIGS. 1F to 1H can be reached by clicking a QUESTION MARK button 2-71A that is located next to the STROKES drop-down menu 8-72. In this example, a RANGE drop-down menu 8-73 shows a zero to indicate that the user is sure that the stroke count is accurate and that a numerical choice of range is unnecessary.

STEP FIVE: As a final step, click a GET WORD button 2-74A. A RESULTS set display 8-75 shows there is just one triple character that meets the criteria of symbol and stroke number. The result appears in both the CANDIDATE CHARACTERS TEXT display 8-76, and in the ENLARGED CHARACTER display 8-78. Output is the character text and its TRANSLATION 8-79 that gives the character's Pinyin spelling, stroke number, tone, English (or another language), and part of speech of the ENLARGED CHARACTER 8-76, formerly known as the unknown character 8-19. (Note: To access the character text, etc. of any character in the CANDIDATE CHARACTERS TEXT display 8-76 click to transfer the chosen character text to the ENLARGED CHARACTER display 8-78.)

A NEW SEARCH button 2-53A is used to find another user-introduced character.

Detailed Descriptions . . . FIGS. 9a to 9c: Write-in Mode, Alphabetic Tree View, and Mixed Modes One of the basic concepts of this System is to provide a fast, computer-friendly method that allows free access to the entire database. With a WRITE-IN MODE, along with a free choice of all prior modes, all parts of the system have now become accessible. It is the user's choice to go anywhere, swiftly and logically, and with any mixture of methods and modes.

FIG. 9A—Use a WRITE-IN MODE When a Symbol Name is Known to Output Character Text, Pinyin Spelling, and Translation of a User-Introduced, Unknown Characters:

A user, once familiar with the basic program, finds it effortless to recall a number of the symbol names. These include all letter symbols: 'B', 'E', 'small i', 'J', 'K', 'P', 'small r', 'T', 'X', 'Y', and 'Z'; all number symbols: '4', '5', and '7'; and a surprising assortment of visual symbols such as: 'arrow', 'cookie cutter', 'gate', 'mouth', and 'monster' among others. Armed with this information, it is now a joy to experience the freedom of the WRITE-IN MODE.

EXAMPLE: A user brings to the computer an unknown character with one familiar symbol that will be located using the WRITE-IN MODE. The character is brought from outside of the system, e.g., as found in a newspaper, technical journal or on a street sign, etc. (As a part of the output from the system, the unknown character will be made available as character text for input into other software systems, e.g., Microsoft Word. The system also outputs the character's associated Pinyin spelling, stroke number, tone and translation into English or another language that precludes the need for other hard-copy or electronic translation devices.) For purpose of this example, the unknown character chosen by the user is shown on each side of the top of the screen (FIG. 9A) as 9-19A. A WHAT NEXT box 9-30A at the top of the figure provides simple directions. (Any user, even one who knows nothing about character configuration or Pinyin spelling, can use this simple system successfully, on an average, in less than a minute from beginning of search to output of character text, Pinyin and translation.)

STEP ONE: Click WRITE-IN 1-144H from the MODE drop-down menu 1-60I.

STEP TWO: If a user knows the name of the symbol 'rocket' 349, he/she fills in a SYMBOL blank space 9-145A with the word rocket. (Note: If the symbol name 'rocket' is not known, the user returns to the MODE drop-down menu 1-60I and select STANDARD 1-62I. Or, another way to locate symbol 'rocket' 349 is to refer to an ALPHABETIC SYMBOLS tree view 9-148A, located in WRITE-IN 1-144I, selected from MODE drop-down menu 1-60I.) Click ADD TO SELECTIONS button 9-146A to transfer WRITE-IN symbol 'rocket' to MY SELECTIONS list box 9-70A. (After each new write-in placed in the SYMBOL blank space 9-145A, a click of an ADD TO SELECTIONS button 9-146A will transfer the chosen symbol to MY SELECTIONS list box 9-70A. To delete an unwanted symbol, select it from MY SELECTIONS list box 9-70A and double click.)

STEP THREE: A user next counts strokes in the unknown character (brought by the user from outside of the system) that is here marked as 9-19A. User enters a count of 12 in a STROKES drop-down menu 9-72A. Do not be concerned if the stroke count is not exact. One option is to use a stroke range drop-down menu to insert a user's plus or minus search number that compensates for user error in stroke counting. A stroke tutorial, "Don't Be Spooked by Strokes," see FIGS. 1F to 1H can be reached by clicking a QUESTION MARK button 2-71A that is located next to the STROKES drop-down menu 9-72A. In this example, a RANGE drop-down menu 9-73A shows a zero to indicate that the user is sure that the stroke count is accurate and that a numerical choice of range is unnecessary.

STEP FOUR: Click a GET WORD button 2-74A. A RESULTS set display 9-75A shows there are two words that meet the criteria of symbols and strokes. The unknown character 9-78A is in first place in both a CANDIDATE CHARACTERS TEXT display 9-76A and an ENLARGED CHARACTER display 9-78A. Output is the character text and its TRANSLATION 9-79A that gives the character's Pinyin spelling, stroke number, tone, English (or another language), and part of speech of the ENLARGED CHARACTER 9-76A, formerly known as the unknown character 9-19A. (Note: To access the character text, etc. of any character in the CANDIDATE CHARACTERS TEXT display 9-76A click to transfer the chosen character text to the ENLARGED CHARACTER display 9-78A.)

A NEW SEARCH button 2-53A is used to find another new user-introduced character.

FIG. 9B—Use a WRITE-IN MODE to Show Variations Within a Given Symbol:

In addition to the ALPHABETIC SYMBOLS tree view that appears when WRITE-IN 1-144I is selected from the MODE drop-down menu 1-60I, another tree view feature of the WRITE-IN MODE is a list of all variations of any given symbol. For example, a search of the symbol 'roof/base' yields eleven symbols, some of which has roof/base buried within the definition, e.g., 'fist roof/base' and 'porter staple roof/base'.

EXAMPLE: A user decides to locate all associated symbols of the symbol 'arrow'. FIGS. 9-19B shows the symbol 'arrow' for which variations will be listed. A WHAT NEXT box 9-31B at the top of the figure provides simple directions.

STEP ONE: Open WRITE-IN 1-144I in a MODE drop-down menu 1-60I.

STEP TWO: In a SYMBOL blank space 9-145B write in the word arrow 350.

STEP THREE: Click a SEARCH button 9-147B. The tree view 9-149B presents all associated locator symbols for 'arrow' 350. These include both those that appear alphabetically such as 'arrow cap', and 'arrow pair' as well as an entry that has 'arrow' imbedded within it, namely 'seven arrow side.'

FIG. 9C—Use MIXED MODES to Output Character Text, Pinyin Spelling, and Translation of a User-Introduced Unknown Character:

Now that some of the principal MODES (STANDARD, SIDE, TOP, BOTTOM, PAIR, TWIN CHARACTERS, TRIPLE SYMBOL, and WRITE-IN) have been introduced, it is evident that these modes can be mixed together as swift and logical routes to the translation of a target character.

EXAMPLE: A user brings to the computer an unknown character to be located by using mixed modes. The character is brought from outside of the system, e.g., as found in a newspaper, technical journal or on a street sign, etc. (As a part of the output from the system, the unknown character will be made available as character text for input into other software systems, e.g., Microsoft Word. The system also outputs the character's associated Pinyin spelling, stroke number, tone and translation into English or another language that precludes the need for other hard-copy or electronic translation devices.) For purpose of this example, the unknown character chosen by the user is shown on each side of the top of the screen (FIG. 9C) as 9-19C. A WHAT NEXT box 9-32C at the top of the figure provides simple directions. (Any user, even one who knows nothing about character configuration or Pinyin spelling, can use this simple system successfully, on an average, in less than a minute from beginning of search to output of character text, Pinyin and translation.)

STEP ONE: Click TOP 1-124I from the MODE drop-down menu 1-60I.

STEP TWO: Use an ALL TOP SYMBOLS tree view 1-125A to select the primary symbol 'pole' 307 to open to its secondary symbol 'pole plus 1 line' 308 and onward to its related secondary symbol of 'mountain' 316, that also appears at the top of the unknown character 9-19C. (A minus button 299 appears at the left of the two 'pole' symbols to show that their secondary symbols are open.) Select the secondary symbol 'mountain' 316 and double click the symbol name to place it in MY SELECTIONS list box 9-70C. (The user may double click any number of symbols, in turn, to place them in MY SELECTIONS list box. To delete an unwanted symbol, select it from MY SELECTIONS list box 9-70C and double click.)

STEP THREE: Look again at the target character 9-19C to note that it also contains a PAIR. Click PAIR 1-132I from the MODE drop-down menu 1-60I. Use a PRIMARY PAIR SYMBOLS tree view 6-133A to select the primary symbol 'gate' 340, a pair of which appears in the unknown symbol. Double click the symbol name 'gate' to place it in MY SELECTIONS list box 9-70C.

STEP FOUR: A user next counts strokes in the unknown character 9-19C. User enters a count of 11 in a STROKES drop-down menu 9-72C. Do not be concerned if the stroke count is not exact. One option is to use a stroke range drop-down menu to insert a user's plus or minus search number that compensates for user error in stroke counting. (A stroke tutorial, "Don't Be Spooked by Strokes," see FIGS. 1F to 1H can be reached by clicking a QUESTION MARK button 2-71A that is located next to the STROKES drop-down menu 9-72C. In this example, a RANGE drop-down menu 9-73C shows a zero to indicate that the user is sure that the stroke count is accurate and that a numerical choice of range is unnecessary.

STEP FIVE: Click the GET WORD button 2-74A. A RESULTS set display 9-75C shows that only one word contains the input criteria. The unknown character 9-19C is already in first place in both the CANDIDATE CHARACTERS TEXT display 9-76C and in the ENLARGED CHARACTER display 9-78C. Output is the character text and its TRANSLATION 9-79C that gives the character's Pinyin spelling, stroke number, tone, English (or another language), and part of speech of the ENLARGED CHARACTER 9-78C, formerly known as the unknown character 9-19C. (Note: To access the character text, etc. of any character in the CANDIDATE CHARACTERS TEXT display 9-76C click to transfer the chosen character text to the ENLARGED CHARACTER display 9-78C.)

(Note: The last set of CANDIDATE CHARACTER TEXT display 9-151C of FIG. 9C contains seven entries that result if only the top symbol 'mountain' 316 were to be used to locate the target character 9-19C. It is the user's choice to decide which path might be most effective.)

A NEW SEARCH button 2-53A is used to find another new, user-introduced character text.

Detailed Descriptions . . . FIGS. 10a to 10d: Browser Mode

A BROWSER MODE is like suddenly shifting gears in an engine to a different but equally-powerful medium. Direct queries of the database may be made in three directions: locator symbols, Pinyin words, and English words.

FIG. 10A—Use the BROWSER MODE and Symbol Data to Study the Specific Symbol of 'tree'.

One of the functions of a BROWSER MODE is to use its symbol data to drink in information about relationships.

EXAMPLE: A user decided to browse through locator symbol 'tree'. A WHAT NEXT box 10-33A at the top of the figure provides simple directions.

STEP ONE: User selects BROWSER 1-154I from the MODE drop-down menu 1-60I.

STEP TWO: Below the MODE menu is a word SEARCH followed by a blank space 10-156A. Write in the word tree.

STEP THREE: Click a drop-down menu called IN COLUMN and select SYMBOL DATA 10-157A, from among the three choices.

STEP FOUR: Click FIND button 10-160A. The screen presents 979 records of characters that have the locator 'tree' as a part of their structure. Scroll through entries to discover that:

(1) The symbol 'tree', itself, is actually a part of an array of characters that refers to various things associated with wood.

(2) Many other related characters, in which the 'tree' symbol is incorporated, refer to agricultural or figurative terms including hé, $2^{nd}$ tone for grain, běn, $3^{rd}$ tone for plant root, and mè, $4^{th}$ tone for dust.

(3) Other characters extend the idea of the symbol 'tree' as used in ancient writing practices, including zhá, $2^{nd}$ tone for hand-written, and shù, $4^{th}$ tone for skill.

(4) Some characters join different ideas to that of the symbol 'tree'. For example, the word xiāo, 1st tone, is a pictorial of a bird sitting in a tree and means owl, brave or valiant.

FIG. 10A shows samples of the 979 entries for the symbol 'tree' and their translations 10-161A to 10-167A.

RESET button 10-155A may be clicked to clear the BROWSER 1-154I for another BROWSER search. To choose a different mode, click MODE 1-60I.

FIG. 10B—Use the BROWSER MODE and Symbol Data to Study the Specific Symbol of 'tree pair'.

EXAMPLE: A user chooses to browse through symbol data for 'tree pair'. A WHAT NEXT box 10-33A at the top of the figure provides simple directions.

(Note: If a user were to scroll down to the end of 'tree' locators, the 'tree pair' locators would be reached automatically.)

STEP ONE: To initiate a search for 'tree pair' entries, select BROWSER 1-154I from the MODE drop-down menu 1-60I.

STEP TWO: Below the MODE menu is the word SEARCH followed by a blank space 10-156B. Write in the words 'tree pair'.

STEP THREE: Click drop-down menu called IN COLUMN and select SYMBOL DATA 10-157A, from among the first three choices.

STEP FOUR: Click FIND button 10-160A to browse 'tree pair'. The entries show that:

(1) Two trees together lín, $2^{nd}$ tone, make a forest.

(2) Other variations for a pair of trees change the meaning to: má, $2^{nd}$ tone, tingling. lí, $2^{nd}$ tone, pear, and mèng, $4^{th}$ tone, to dream.

(3) One particularly interesting combination is a character showing a pair of trees and the water radical. (A radical is an associative compound used, at times, as an indexed key referring to either a sound or a function of a given Chinese character.) It has two separate meanings. The character lín in the second tone means 'to be caught in the rain, to sprinkle, or to take a shower. The same character lín in the fourth tone means gonorrhea.

(4) Another interesting combination is the use of the 'woman' symbol. A woman sitting under two trees means covetous or greedy.

Click RESET button 10-155A to clear the BROWSER 1-154I for another BROWSER search. To choose a different mode, click MODE 1-60I FIG. 10C—Browse the Symbol Data to Study the Twin Character of the Symbol 'tree'.

Because there are so few syllables in Chinese and because each Chinese character is only one syllable in length, identical characters are often used together with a meaning that is different from that of the single character.

EXAMPLE: Browse the 'tree' symbol in its Twin Character form. (The 'What Next' 10-33A at the top of the figure provides simple directions.)

(Note: If the user were to scroll down to the end of the 'tree triple symbol' locators the 'tree twin character' symbols would automatically be reached.)

STEP ONE: Click BROWSER 1-154I selected from the drop-down MODE menu 1-60I.

STEP TWO: Below the MODE menu is the word 'Search' followed by a blank space 10-156C. Write in the words 'tree twin.

STEP THREE: Click the drop-down menu called 'in column' and select 'Symbol Data' 10-157A, from among the three choices.

STEP FOUR: Click the 'FIND' button 10-160A to open the Browser. There is only one twin character that contains the 'tree' symbol 10-161A to 10-167A. The character mèi, $4^{th}$ tone, when used alone means match-maker. However mei mei used as a twin character means younger sister.

Figure 10C:
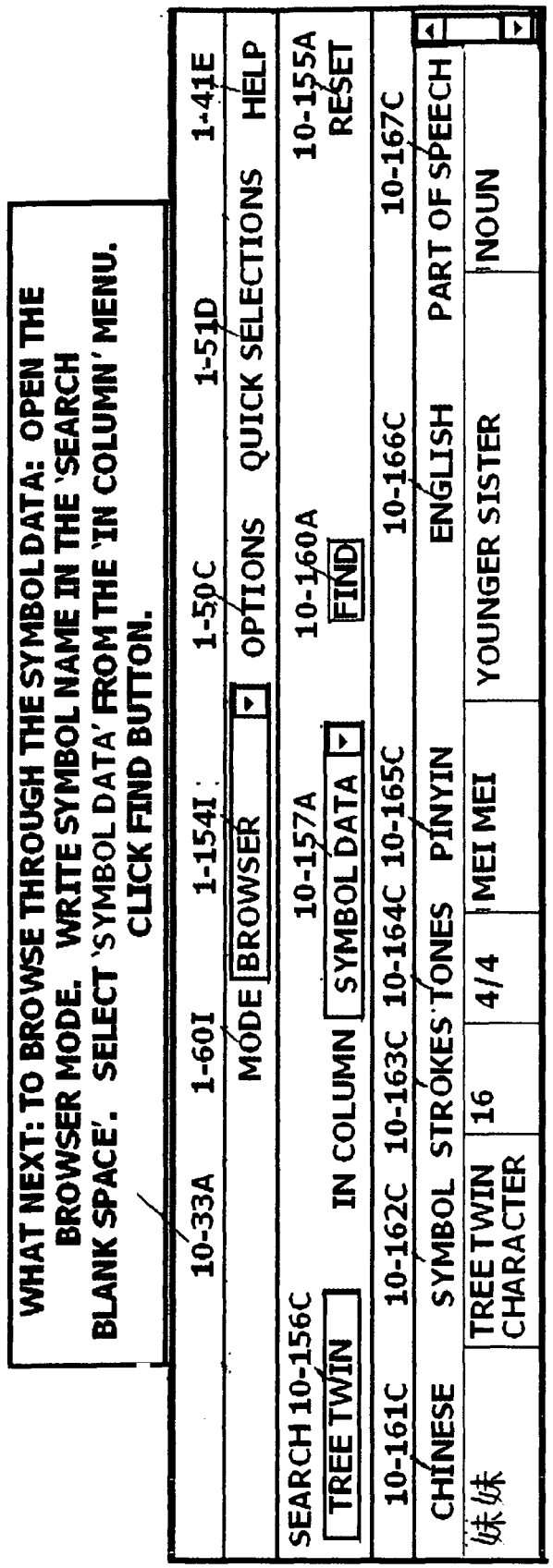

FIG. 10C shows the one tree twin character and its translation 10-161C to 10-167C.

Click the Reset button 10-155A to clear the BROWSER 1-154I for another BROWSER search. To choose a different mode, click the MODE 1-60I button.

FIG. 10D—Use the BROWSER MODE and Symbol Data to Study 'tree triple symbol'.

EXAMPLE: A user chooses to browse a 'tree triple symbol'. A WHAT NEXT box 10-33A at the top of the figure provides simple directions.

(Note: If a user were to continue to scroll past the end of the 'tree pair' symbols, the 'tree triple' symbols would automatically be reached.)

STEP ONE: Select BROWSER 1-154I from the MODE drop-down menu 1-60I.

STEP TWO: Below the MODE menu is a word SEARCH followed by a blank space 10-156D. Write in the word 'tree triple'.

STEP THREE: Click drop-down menu called IN COLUMN and select SYMBOL DATA 10-157A, the first of three choices.

STEP FOUR: Click FIND button 10-160A to browse the 'tree triple' symbol to find that there are only four single or combined characters in this category. They fall into a class of adjectives signifying an overgrowth such as: overgrown, somber, corrupt, decadent, and forest.

FIG. 10D shows all 'tree triple' characters and their translations 10-161D to 10-167D.

Click RESET button 10-155A to clear the BROWSER 1-154I for another BROWSER search. Click MODE 1-60I to choose a different mode.

Detailed Descriptions . . . FIGS. 11a to 11c: Browser Mode, Pinyin Data

The Pinyin Data component of the BROWSER MODE can be used:

a) To study diversity of characters that are spoken with the same sound but have different character pictures and Pinyin translations.

b) To study the evolution of Pinyin words from their simplest to most complex forms, e.g., the many different characters called huan, with their extended forms of chang huan and huan hu.

c) To study locator symbols of a single character or character phrase to understand their generic source and as an aid to memorization.

FIG. 11A—Use the BROWSER MODE and Pinyin Data to Locate and Study a Single Pinyin Word with the Same Sound but Represented by Different Characters with Multiple Meanings:

EXAMPLE: Study different Pinyin characters that all have the sound of huan. A WHAT NEXT box 11-34A at the top of the figure provides simple directions.

STEP ONE: After a user has chosen a Pinyin target word, in this case huan, he/she selects BROWSER 1-154I from the MODE drop-down menu 1-60I.

STEP TWO: Below the MODE menu is a line reading SEARCH followed by a blank space 11-156A. Write in the Pinyin word huan.

STEP THREE: Click IN COLUMN drop-down menu and select PINYIN DATA 11-158A from among the three choices.

STEP FOUR: Select and check EXACT WORD box 11-168A. This means that only the records for the word huan, itself, will be shown in their simplest forms (However, the huan records with combined characters beginning with the letter 'h', such as huan hu or huan jia, will follow immediately after the sixteen single huan records. If such words are to be located directly, without first locating a parent word, check EXTENDED WORDS box 11-169A, described in FIG. 11B.)

STEP FIVE: Click the FIND button 10-160A. FIG. 11A shows a sample of 16 characters that answer to the sound of the Pinyin word huan. Translation records are shown in 11-161A and 11-163A to 11-167A.

Click the RESET button 10-155A to clear the BROWSER 1-154I for another BROWSER search. To choose a different mode, click the MODE 1-60I button.

FIG. 11B—Use the BROWSER MODE to Locate and Study Extended Words of a Single Pinyin Sound:

EXAMPLE: Locate different Pinyin compound characters of huan. A WHAT NEXT box 11-35B at the top of the figure provides simple directions.

(Note: If the single character that represents huan, has already been identified, the user may continue to scroll to see the complex characters of huan that begin with the letter 'h'. However, to locate all EXTENDED WORDS of huan follow instructions below.)

STEP ONE: After a user has chosen a Pinyin word, in this case huan, select BROWSER 1-154I from the MODE drop-down menu 1-60I.

STEP TWO: Below the MODE menu is a line reading SEARCH followed by a blank space 11-156B. Write in the Pinyin word huan.

STEP THREE: Click IN COLUMN drop-down menu and select PINYIN DATA 11-158A from among the choices.

STEP FOUR: To reach related compound characters of huan check EXTENDED WORD box 11-169A. Next click the FIND button 10-160A. The screen shows a first compound character chang huan. Click the FIND button 10-160A again to reach five huan characters that begin with 'h'. Scroll to the end of the five huan characters and click beyond these to reach xi huan. After a final click produces zhi huan, the screen presents a notice that the end of the search has been reached. FIG. 11B shows all compound characters of the Pinyin word huan. Translations are given in columns 11-161B and 11-163B to 11-167B.

Click the RESET button 10-155A to clear the BROWSER 1-154I for another BROWSER search. To choose a different mode, click the MODE 1-60I button.

FIG. 11C—Use the BROWSER MODE to Study All Locator Symbols Associated with a Single Pinyin Word:

Associating a character with its locator symbols helps to understand the structure of a character and serves as an aid to memorization.

EXAMPLE: Study a target character gou si. A WHAT NEXT box 11-36C at the top of the figure provides simple directions.

STEP ONE: After a Pinyin target character has been chosen, in this case gou si, select BROWSER 1-154I from the MODE drop-down menu 1-60I.

STEP TWO: Below the MODE menu is a line reading SEARCH followed by a blank space 11-156C. Write in the Pinyin word gou si.

STEP THREE: Click the IN COLUMN drop-down menu and select PINYIN DATA 11-158A from among the choices.

STEP FOUR: Check EXACT WORD box 11-168A.

STEP FIVE: Because this is to be a study of symbols associated with a given word, check SHOW SYMBOLS box 11-178C.

STEP SIX: Click the FIND button 10-160A.

A PINYIN database opens to show the distribution of all of the locator symbols and the translation of the 66 entries for gou si 11-161C to 11-167C. Browsing through gou si locator records will bring insight into the construction of the character. For example, all the locators associated with the Pinyin word gou si., from the first locator 'bowl bottom' to the last locator symbol 'window', show how the characters are constructed. Thinking in terms of the individual symbols that make up the components of a character makes it easier to remember how to write it. FIG. 11C presents a sample of the gou si character and its locator symbols.

It is easier to understand the logic behind the meaning of two joined characters if the user also understands the character structure and meaning of each of its separate Pinyin words. To do so, use STANDARD MODE to translate first gou and then the second component si. The result show the character text as well as the Pinyin and translation for the first word gòu (8 strokes, $4^{th}$ tone) as: to build, to construct, to make, to plot. The results for the second word show sī: (9 strokes, $1^{st}$ tone), line of thought, to consider, to distribute. The combined words gòu sī (17 strokes, 4/1 tones) mean to design; to meditate.

Click the RESET button 10-155A to clear the BROWSER 1-154I for another BROWSER search. To choose a different mode, click the MODE button 1-60I.

Detailed Descriptions . . . FIGS. 12*a* to 12*c*: Browser Mode, English Data BROWSER MODE English Data shows the translation, structure, and idioms of English words when translated into Pinyin. English words are located either in exact or expanded definitions.

FIG. 12A—Use the BROWSER MODE to Obtain Character Text, Pinyin, and Exact Translations of an English Word into Chinese:

EXAMPLE: A user wishes to translate an English Word build by using the BROWSER MODE. A WHAT NEXT box 12-39A at the top of the figure provides simple directions.

STEP ONE: Click BROWSER 1-154I, reached through the MODE drop-down menu 1-60I.

STEP TWO: In the blank space under SEARCH 12-156A enter the word build.

STEP THREE: Select, from the IN COLUMN drop-down menu, the words ENGLISH DATA and click to place them in blank space 12-159A.

STEP FOUR: Check EXACT WORD box 11-168A for a translation of the word build. This means that only the record for build will be shown in its simplest form.

STEP FIVE: Click FIND button 10-160A. The BROWSER opens to show the character text, Pinyin and translations 12-161A and 12-163A to 12-167A of the word build.

Click the RESET button 10-155A to clear the BROWSER 1-154I for another BROWSER search. To choose a different mode, click the MODE button 1-60I.

FIG. 12B—Use the BROWSER MODE to Obtain Character Text, Pinyin, and Extended Translations (i.e., all Related Definitions) of an English Word into Chinese:

EXAMPLE: The user wishes to translate an English word build and include all related definitions, e.g., building. A WHAT NEXT box 12-40B at the top of the figure provides simple directions.

STEP ONE: Click BROWSER 1-154I reached through the MODE drop-down menu 1-60I.

STEP TWO: In the blank space under SEARCH 12-156B enter the word build.

STEP THREE: Select, from IN COLUMN drop-down menu, the words ENGLISH DATA and click to place them in the blank space 12-159A.

STEP FOUR: Click EXTENDED WORDS 11-169A to signify that all words associated with the word build are to be located.

STEP FIVE: Click the FIND Button 10-160A. The BROWSER moves from the exact word entries to a first related definition of build to show jian 16 with the meaning of build in the sense of create or establish.

STEP SIX: Each additional click of the FIND button 10-160A shows a new related entry that includes a form of the word build in its definition. Examples are: yuan (9 strokes, $4^{th}$ tone) meaning public building, and lou (13 strokes, $2^{nd}$ tone) meaning multi-storied building. (The screen presents a notice when the end of a search has been reached.)

FIG. 12B gives a sample of the character text, Pinyin, and translations of some of the 23 extended words associated with build 12-161B and 12-163B to 12-167B.

Click the RESET button 10-155A to clear the BROWSER 1-154I for another BROWSER search. To select a different mode click the MODE 1-60I button.

Detailed Descriptions . . . FIGS. 13*a* and 13*b* Measure Word Mode

There are over one hundred measure words in the Chinese language. A measure word is a grammatical insert that separates a noun from a numeral that modifies it. For example: to translate three hats into Chinese, it is required that the word three, sān be separated from the word hat, mào. by the measure word dǐng. Therefore, the translation for three hats is sān dǐng mào. Nouns are gathered into measure word groups. Therefore, the measure word for both pen and rifle is zhī because they belong to a class of noun that refers to cylindrical, slim articles. In another example, the measure word for cannon is zūn. Normally the word zūn is used as a noun or verb to mean honor or respect. Perhaps zūn was pressed into use as a measure word for the new concept of cannon that was so fearful as to merit great respect. The Chinese, along with others who attempt to learn their language, learn each measure word at the same time the noun is learned. Dictionaries do not provide a list of measure words nor are they attached to the dictionary definition of individual nouns. However, this "System for Reading Chinese Characters in Seconds" has gathered all measure words into a master list.

FIG. 13A—Use MEASURE WORD MODE to Obtain Character Text, Pinyin, and Translations for a Specific Measure Word:

EXAMPLE: Locate a measure word that serves for the word book. A WHAT NEXT box 13-42A at the top of the figure provides simple directions.

STEP ONE: Click MEASURE WORD 1-170I reached through the MODE drop-down menu 1-60I.

STEP TWO: In the blank space under SEARCH 13-156A enter the word book.

STEP THREE: Click the FIND button 10-160A.

FIG. 13A gives the measure word used with the noun book together with its character text, Pinyin, and translation 13-161A and 13-163A to 13-167A.

Click the RESET button 10-155A to clear the MEASURE WORD 1-170I screen for another MEASURE WORD search. To select a different mode click the MODE drop-down menu 1-60I.

FIG. 13B—Obtain Target Character Pictures, Pinyin, and Translations while Browsing an Entire List of Measure Words:

To understand the different categories of Measure Words, study the entire list of 127 words to determine the sets into which various nouns have been placed. A WHAT NEXT box 13-43B at the top of the screen provides simple directions.

EXAMPLE: Browse through the list of measure word sets.

STEP ONE: Click MEASURE WORD 1-170I reached through the MODE drop-down menu 1-60I.

STEP TWO: Click the FIND Button 10-160A.

FIG. 13B presents a measure word list 13-161B and 13-163A to 13-167B.

Click the RESET button 10-155A to clear MEASURE WORD 1-170I for another MEASURE WORD search. To select a different mode click the MODE drop-down menu 1-60I.

Detailed Descriptions . . . FIGS. 14*a* and 14*b*: User-Generated Mode

Although the existing database already contains an extensive technical vocabulary (e.g., geophysics, chemistry, agriculture, and engineering) other vocabularies specific to the needs of an individual user (e.g., medicine) may be added to the database with the USER-GENERATED MODE.

FIG. 14A—Add a New Word To the Database Using a USER-GENERATED MODE:

EXAMPLE: A user may choose to add the technical term computer (dian nao) to the software database for later retrieval. (The word computer is already in the database. This shows how it was .accomplished.) A WHAT NEXT box 14-44A at the top of the figure provides simple directions.

STEP ONE: Click USER-GENERATED 1-180I in the MODE drop-down menu 1-60I. Under the heading HIGHLIGHT PINYIN WORD #1 14-181A enter the Pinyin word #1 dian in the blank space 14-182A. (A software program is required to enter Chinese characters into a computer. There are many such programs available through the internet such as the free download program called "Microsoft Input Method Editors.")

STEP TWO: Click PINYIN SEARCH #1 button 14-183A. Records appear for 16 Pinyin words that are all pronounced as dian but have different character pictures. Under column Pinyin #1 14-184A, click dian 1 to highlight the Pinyin word for electric. (Because there are many different characters that have the same sound, each character is given a locator number in the database. Therefore, dian 1 refers to the first dian character.) With this "System for Reading Chinese Characters in Seconds" it is not necessary to be able to recognize the Chinese character configuration in order to input the proper character. Simply choose the proper Pinyin word from the context of its translation. Because the input word is to be computer the most logical choice is that of electricity rather than rule of law or tavern.

STEP THREE: Under the heading HIGHLIGHT PINYIN WORD #2 14-190A enter the second Pinyin word nao in blank space #2 14-191A.

STEP FOUR: Click PINYIN SEARCH #2 button 14-192A. If the first entry in the PINYIN #2 column 14-193A is not the sought-after Pinyin word, scroll downward to find the required word. In this case the word is nao 4 that is translated as brain.

STEP FIVE: Now that the component parts of dian nao have been located, click COMBINE WORDS 14-199A.

STEP SIX: In a section of the screen called NEW ENGLISH 14-204A, replace the words electricity and brain with the word computer.

STEP SEVEN: Click SAVE 14-234A. The USER-GENERATED WORD computer is now a part of the database and is ready for retrieval.

Click the RESET button 14-235A to enter another USER-GENERATED word. To choose a different mode click the MODE 1-60I button.

FIG. 14B—Retrieve a User-Generated Word from the Database Using the Browser Mode:

All words added by a user may be retrieved by direct entry into the database through many of the prior modes that have been discussed. This example demonstrates how the BROWSER MODE may be used to obtain quick results.

EXAMPLE: Locate the USER-GENERATED English word computer. A WHAT NEXT box 14-45B at the top of the figure provides simple directions.

STEP ONE: Click BROWSER 1-154I reached through the MODE drop-down menu 1-60I.

STEP TWO: In the blank space under SEARCH 14-156B, enter the word computer.

STEP THREE: Select, from the IN COLUMN drop-down menu, the term ENGLISH DATA 12-159A and click to enter it into the blank space.

STEP FOUR: If only a Pinyin translation of the single word computer is wanted, check the EXACT WORD box 11-168A. If, however, all of the related definitions for computer are being sought, select and check the EXTENDED WORDS box 11-169A. (This example shows that the EXTENDED WORDS box 11-169A has been activated.)

STEP FIVE: Click the FIND button 10-160A. A database opens to highlight the entry of the word computer with a translation of dian nao, the word that was originally added by the user.

STEP SIX: Click the FIND button 10-160A a second time and the system responds with a second record that has computer as a part of its translation. This is the Pinyin translation for electronic computer. After a third click of the FIND button 10-160A and a response with the translation of computer terminal, a message appears to say that the search is complete. FIG. 14B displays all three records that contain the word computer 14-161B and 14-163B to 14-167B.

Click the RESET button 10-155A to clear the BROWSER 1-154I for another browser search. To select a different mode click the MODE 1-60I button.

Detailed Descriptions . . . FIGS. 15*a* to 15*c*: Games Mode

Because there are many Chinese words that sound alike, although written with different characters, fanciful and imaginative stories and amazing puns may be composed in English using only one, single Chinese sound and a few helping words. The ammunition for such games comes in the form of word game lists, story telling formats, board games, and cutouts.

FIG. 15A—Use a Chinese Pinyin 'Word Game List' to Compose English Word Games and Puns:

(Note: There is no knowledge of or particular skill in Chinese required when playing these games. Agility with words and a good imagination are helpful attributes. However, while enjoying a game, one is also learning about Chinese word relationships.)

EXAMPLE: Construct a WORD GAME UST using only tang words. All of the 16 tang words that comprise a WORD GAME LIST are spelled the same but have different meanings, and are represented by distinctly different characters. A WHAT NEXT box 15-49A at the top of the figure provides simple directions.

HOW TO PLAY THE GAME: One game might be played by distributing to each player a copy of the same WORD GAME UST. Each player will make up a different story based on the same WORD GAME LIST and a few helping words, such as prepositions. (Rules may vary according to the desires of a group. However, one way to choose a winner could be to select the person using the fewest number of helping words.) An alternative game might be played when a different WORD GAME LIST is distributed to each player so that many different, fanciful or amusing stories will be presented.

SUPPLIES: Needed for the word game will be one or more WORD GAME LISTS (detailed steps for construction are shown below) and dice, playing cards or similar devices to determine the order of play.

STEP ONE: To compose a WORD GAME LIST, in this case using the Chinese Pinyin word tang, select and click GAMES MODE 1-206I from the MODE drop-down menu 1-60I.

STEP TWO: Place the word tang in the SEARCH blank space 15-207A.

STEP THREE: Click the drop-down menu called IN COLUMN and select the second choice PINYIN DATA 15-208A.

STEP FOUR: Activate EXACT WORD button 15-215A to obtain records for the single Pinyin word tang. (A check to the left of EXTENDED WORDS 15-216A would expand the choice to include tang compound words such as ke tang).

STEP FIVE: Click the FIND button 15-209A. FIG. 15A presents examples of the extent of the varieties of words that are translated from the Pinyin word tang. (See translations 15-221A to 15-226A.) These include: broth, hot water, soup; the Tang Dynasty; suppose, and wild plum tree. Such words will be used to make a WORD GAME LIST.

Click the RESET button 15-210A to clear the GAME MODE 1-206I for a new WORD GAME LIST search. To select a different mode click the MODE button 1-60I.

FIG. 15B—Compose a Tang Story Using the Tang WORD GAME LIST and a Few Helping Words:

EXAMPLE: Tell a story using only the words on the Tang Story WORD GAME LIST. A WHAT NEXT box 15-47B at the top of the figure provides simple directions.

FIG. 15B, "The Tang Story" 15-230B uses only words that appear on the Tang WORD GAME LIST 15-221A to 15-226A, with the addition of a few non-tang helping words. FIG. 15B recounts the story in Pinyin 15-231B, in Chinese characters 15-232B, and in English 15-233B. The English version 15-233B is also presented below. (Each English word, shown underlined and in bold type, is pronounced as tang in Chinese.)

A Praying Mantis 15-233*b*

"If a praying mantis of great dignity lies down on an embankment near a pond under a wild plum tree and the mantis' breast blocks the flow of semi-fluid hot water, dripping like scalding candy through a gun barrel into a pond near the Tang Dynasty clan's meeting place: Do you suppose her breast was scalded?" Excellent fun!

FIG. 15C—Use of Symbols for a Children's Game:

Most of the Chinese symbols that are used to locate Pinyin translations are, in themselves, quaint and interesting enough to stir the curiosity of children. A quick scan of an ALPHABETIC GAME SYMBOLS tree view 15-235C (located through the GAMES 1-206I MODE 1-60I) shows that the symbols abound with interesting shapes and names to spur the imagination of children. For example: draw a square box, put it next to a second box, stack a third box on top, shove the boxes under what looks like a tree ('tree symbol'), or put them in a forest (more trees) or hide them in a deep undergrowth (many trees). The faces of small children light up. During the game the children have learned that the box is actually the Chinese word for mouth, and that the tree character stands for wood. Most of them will even understand the abstract idea that a pile of boxes stands for a variety of things (separate articles gathered together). Children's imaginations for play can go far with such information and they will want to venture into new discoveries in the forest of the ALPHABETIC GAME SYMBOLS tree view 15-235C. This game is particularly appealing when the characters are rendered as paper cutouts, or are used as three dimensional blocks that can be moved and stacked. Many games for both children and adults can be converted to be played on game boards, hand-held electronic devices or computers.

EXAMPLE: Construct a SYMBOL FAVORITES box 15-236C to be used in story-telling. A WHAT NEXT box 15-52C at the top of the figure provides simple directions.

STEP ONE: Click on GAMES 1-206I from the MODE drop-down menu 1-60I. Use ALPHABETIC GAME SYMBOLS tree view 15-235C to locate symbols with amusing titles and shapes.

STEP TWO: Double click interesting symbol names to transfer them to a SYMBOL FAVORITES list 15-236C.

STEP THREE: Refer to the SYMBOL FAVORITES list 15-236C to compose a fanciful story as demonstrated in A CHILD'S STORY 15-237C.

The symbol names themselves often put smiles on the faces of both children and adults, such as: cookie cutter, drum, kite, star and monster, as well as such mundane things as: arrow, chair, pointer, and rocket.

(Note: ALPHABETIC GAME SYMBOLS 15-235C can also be used when constructing games for adults. Symbol names will catch the user's attention because they are clearly-represented images. Two such symbols, among many, are: bug and ghost. In another example, when the user sees a somewhat strange symbol 'monster', with a symbol 'mouth' on its left side, an association to its English translation into the verb to kiss would be hard to forget. Such browsing among the ALPHABETIC GAME SYMBOLS tree view 15-235C can become an adult diversion.

In addition, computer and board games can be based on a Chinese village with Chinese geographic place names as well as such things as cards and/or miniature figures to show the Chinese characters and Pinyin names for houses, building, pagodas, roads, bridges, street lights, fields, irrigation works, rice paddies, farms, crops, and domestic and wild animals. Such games could be played with WORD GAME LISTS similar to the tang word game, or could become full-blown computer or board games.

To create another game click the Reset button 15-220C. To select a different mode click the MODE drop-down menu 1-60I.

Detailed Descriptions . . . FIGS. 16*a* and 16*b*: Other Languages, Other Writing Systems FIGS. 16A and 16B demonstrate the use of this "System for Reading Chinese Characters in Seconds" with other languages (e.g., European, Asian, Indian, Arabic) and other writing systems based on oriental ideograms (e.g., Traditional Chinese and Japanese Kanji).

FIG. 16A—Use the STANDARD MODE to Obtain a Character Text, its Pinyin, and French Language Translation:

EXAMPLE: A user brings to an electronic device an unknown character from outside of the system, e.g., as found in a newspaper, technical journal or on a street sign, etc. As a part of output from the system, the unknown character will be found and made available as character text for input into other software systems, e.g., Microsoft Word. The system also outputs the character's associated Pinyin spelling, stroke number, tone and, in this example, a French language translation. For purpose of this example, the unknown character chosen by a user is shown on each side of the top of the screen (FIG. 16A) as 16-20A. Again, a WHAT NEXT box 16-58A at the top of the figure provides simple directions. (Any user, even one who knows nothing about character configuration or Pinyin spelling, can use this simple system successfully.)

STEP ONE: Click OPTIONS 1-50C to choose and click 'Other Languages' to, in turn, choose and click French from a drop-down menu.

STEP TWO: Click STANDARD (STANDARD) 1-62I from the MODE (MODE) drop-down menu labeled as 1-60I.

STEP THREE: Decide which primary symbol resembles most closely the unknown character 16-20A. Refer to a PRIMARY SYMBOLS (SYMBOLES PRINCIPALS) tree view 16-255A. (A FIXED SYMBOLS (SYMBOLES) list 16-272K, located to the left of the PRIMARY SYMBOLS list, is also a handy reference tool. It shows all of the primary symbols at one glance without scrolling. See FIG. 1J.) Scroll the PRIMARY SYMBOL tree view 16-255A to the primary symbol 'B' 336. Click the plus sign to the left of the primary symbol 'B' 336 to open to its secondary symbol 'B Book' ('B Livre') 342. (A minus sign 299 is shown to the left of the primary symbol 'B' 336 to indicate that a primary symbol has been opened to display its secondary symbols.)

STEP FOUR: 'B Book' CB Livre') 342 is a Secondary Symbol under the Primary Symbol 'B'. Double click the symbol name to place it into a MY SELECTIONS (MES SELECTIONS) list box 16-260A. (The user may double click any number of symbols, in turn, to place them in the MY SELECTIONS list box. To delete an unwanted symbol, select it from the MY SELECTIONS list box 16-260A and double click.)

STEP FIVE: A user next counts strokes in the unknown character (brought by the user from outside of the system, and here marked as 16-20A) and enters a count of 4 in a STROKES drop-down menu 16-261A. Do not be concerned if the stroke count is not exact. A stroke tutorial, "Don't Be Spooked by Strokes," ("Chiffre du Trait: Pas Important") FIGS. 1F to 1H, can be readied by clicking a QUESTION MARK (QUESTION) button 16-267A that is located next to the STROKES (CHIFFRE du TRAIT) drop-down menu 16-261A. A RANGE (GAMME) drop-down menu 16-262A shows a zero in this example to indicate that the user is sure that the stroke count is accurate and that a numerical choice of range is unnecessary.

STEP SIX: The final step is to click a GET WORD (RE-CHERCHER) button 16-270A. A RESULTS (RESULTAT) display 16-263A indicates that there is one character that meets the selected criteria. The results are shown in a CANDIDATE CHARACTERS TEXT (PETIT DESSIN) display 16-264A and in the ENLARGED CHARACTER TEXT (GRAND DESSIN) display 16-265A. The TRANSLATION (TRADUCTION) 16-266A shows the character text, Pinyin word, and dictionary definition of the target character.

A NEW SEARCH (REINITIALISER) button 16-259A is used to find another user-introduced character. To select a different mode click MODE 16-253A button.

FIG. 16B—Obtain a Target Character Picture in the Traditional Chinese Writing System, its Pinyin, and Translation Using the STANDARD MODE:

There are several, different oriental writing systems that are based on ideograms to build all or part of their written language. These character picture writing systems include: Simplified Chinese, Traditional Chinese, and Japanese Kanji, among others. The Simplified Chinese writing system was introduced into the People's Republic of China after the Communist Revolution in 1949. Its advantages were: fewer strokes for most individual characters, and easier memorization. The more complicated Traditional Chinese Characters writing system continues to be used by the Chinese on the Island of Taiwan, by some overseas Chinese, and is taught in many universities around the world for either scholarly or political reasons. Also, that part of the Japanese written language called Kanji continues to use ideograms that originated with Traditional Chinese. (FIG. 16B demonstrates how this "System for Reading Chinese Characters in Seconds" translates Traditional Chinese Characters.

EXAMPLE: A user brings to the computer an unknown character from outside of the system (e.g., as found in a newspaper, technical journal or on a street sign, etc.). The character is written in Traditional Chinese Characters. This means that the character has more strokes and different character configuration from the same word would have if written in Simplified Chinese Characters. As a part of the output from the system, the unknown character will be found and made available to the user in both Traditional and Simplified text for input into other software systems (e.g., Microsoft Word). The system also outputs the associated Pinyin spelling, stroke number, tone and English (or other language) translation. For purpose of this example, the unknown character chosen by the user is shown on each side of the top of the screen (FIG. 16B) as 16-19B. A WHAT NEXT box 16-59B at the top of the figure provides simple directions. (Any user, even one who knows nothing about character configuration or Pinyin spelling, can use this simple system successfully.)

STEP ONE: Click STANDARD 1-62I from the MODE drop-down menu 1-60I.

STEP TWO: Decide which primary symbol resembles most closely the first part of compound unknown character 16-19B. To do so, refer to PRIMARY SYMBOLS tree view 1-63A. (A FIXED SYMBOLS list 1-54J, located to the left of the PRIMARY SYMBOLS tree view, is also a handy reference tool. It shows all primary symbols, at one glance without scrolling, that may be needed to locate the symbol when using the PRIMARY SYMBOLS tree view 1-63A. See FIG. 1I for details.) Begin by selecting the primary symbol 'mouth' 317. Click the plus sign next to the symbol 'mouth' to open to its secondary symbol 'mouth filled' 318. Again, click the plus sign next to the secondary symbol 'mouth filled' 318 to open to its related secondary symbol 'bricks horizontal' 321. Double-click the name 'bricks horizontal' to add the symbol 'bricks horizontal' to MY SELECTIONS list box 16-70B. (A plus sign to the left of the Primary Symbol 'mouth filled' changed to a minus sign 299 when the secondary tree view was opened.)

STEP THREE: Decide which other primary symbol resembles most closely the first target character 16-19B. To do so, refer to either PRIMARY SYMBOLS tree view 1-63A or to the FIXED SYMBOLS list 1-54J. Select letter symbol 'T' 329 and click the plus sign to open to its secondary symbols. Scroll to the secondary symbol 't small print' 330 and double click the symbol name to add it to MY SELECTIONS list box 16-70B. (A plus sign to the left of the Primary Symbol 'T' changed to a minus sign 299 when the secondary tree view was opened.)

STEP FOUR: Look at the second part of the character. Decide which primary symbol resemble, that has not already been used, most closely resembles the unknown character 16-19B. To do so, refer to either the PRIMARY SYMBOLS tree view 1-63A or to the FIXED SYMBOLS list 1-54J Select a visual symbol 'gate' 339 and click its plus sign to open to its secondary symbols. Scroll to the secondary symbol 'gate half' 343 and click the symbol name to add it to the MY SELECTIONS list box 16-70B. (A plus sign to the left of the Primary Symbol 'gate' changed to a minus sign 299 when the secondary tree view was opened.

STEP FIVE: The user counts 17 strokes in both components of the target character 16-19B. He/she is not concerned if the stroke count is not exact. (For complete information about stroke counting, click the QUESTION MARK button 2-71A that appears next to the STROKE drop-down menu 16-72B, to open "Don't Be Spooked by Strokes" 1-101F.) User selects and clicks the number 17 from the STROKE drop-down menu 16-72B. If unsure of the exact number of strokes in the target character, the user also selects a number from the RANGE drop-down menu 16-73B to compensate for user error.

STEP SIX: The final step is to click a GET WORD button 2-74A. The RESULTS set display 16-75B shows that there is only one set of target characters that meets the required criteria. The CANDIDATE CHARACTERS TEXT display 16-76B and the ENLARGED CHARACTER TEXT display 16-78A both show the Traditional Chinese written target characters. (A Simplified Chinese written text component is shown in parenthesis 16-110B.) A TRANSLATION box 16-79A shows the selected character text, its Pinyin spelling, its stroke number, its tone, its English (or other language) translation and its Part of Speech. (All characters are presented in text form and may be copied for use in other software programs.)

(Note: "The Economist" issue of Apr. 25, 2009 reviewed the People's Republic of China's strong intention to modify the existing simplified characters writing system to conform more closely to the traditional writing system. Strong opposition to this idea in the People's Republic of China is based both on deep issues of cultural and political identify as well as on such practical concerns as how hard the new character forms will be to learn and how much it will cost to convert. However, if such is the decision, modifications can be readily incorporated in this "System for Reading Chinese Characters in Seconds.")

A NEW SEARCH button 2-53A is used to find another user-introduced character.

Detailed Descriptions . . . FIGS. 17*a* and 17*b*: Dictionary Mode

FIGS. 17A and 17B illustrate a Pinyin/English and English/Pinyin Character Dictionary: Chinese and other users of the language often carry a hand-held device with them to see exactly how a character is written before using it in correspondence or other texts. (Does it have two or three dashes on its left? Does it have two or three horizontal lines in its body? These are details sometimes forgotten.) In other instances, foreign users of the Chinese language often refer to the Internet, hand-held electronic devices or hard-copy dictionaries to input Pinyin and search for a translation into another language. Therefore, this "System for Reading Chinese Characters in Seconds" also offers a dictionary as a convenient addition for a user.

FIG. 17A—Obtain a Character Picture, its Pinyin Spelling, and Translation of a Pinyin to English Word Using the DICTIONARY MODE:

EXAMPLE: A user might wish to translate a Pinyin word zi dian into English and to display its character text. A WHAT NEXT box 17-61A at the top of the figure provides simple directions.

STEP ONE: Select DICTIONARY 1-276I from the MODE drop-down menu 1-60I.

STEP TWO: Click to place a check in the box that is located to the left of PINYIN WORD 17-277A.

STEP THREE: In a blank space to the right of WHAT WORD? 17-279A enter the word zi dian.

STEP FOUR: Click the SEARCH button 17-280A.

FIG. 17A, illustrates the details of the translation 17-282A to 17-287A for the Pinyin words zi dian.

To locate another translation click ANOTHER WORD button 17-281A. To select a different mode click the MODE button 1-60I.

FIG. 17B—Obtain a Character Picture, its Pinyin Spelling, and Translation of an English to Pinyin Word Using the DICTIONARY MODE:

EXAMPLE: A user may wish to translate an English word encircle into Pinyin and display its character text. A WHAT NEXT box 17-77B at the top of the figure provides simple directions.

STEP ONE: Select DICTIONARY 1-276I from the MODE drop-down menu 1-60I.

STEP TWO: Click to place a check in the box that is located to the left of ENGLISH WORD 17-278B.

STEP THREE: In a blank space to the right of WHAT WORD? 17-279B enter the word encircle.

STEP FOUR: Click the SEARCH button 17-280A.

FIG. 17B, illustrates the details of the translation 17-282B to 17-287B for the English word encircle.

To locate another translation use the ANOTHER WORD button 17-281A. To select a different mode click the MODE 1-60I button.

ADVANTAGES

The reader will see from the above that several advantages of one or more aspects are as follows: I have provided a computer readable system by which:

A single operation from first input to final output can be accomplished, on average, in less than one minute.

Anyone, even with no prior knowledge of Chinese character writing, can read an unknown Chinese character.

Character text, enormously difficult to reproduce in an electronic device, is immediately available for use in other software programs.

Pinyin and translation output from this system precludes the need for further use of other electronic or hard-copy translation devices.

A user brings to the electronic device a character of his/her choice, such as those found in a technical document, a newspaper, or on a street sign.

The 32 easy-to-remember primary symbols, used as input, are familiar to all users of Western languages and (as discovered by the inventor) are also included in all Chinese characters.

The system provides a method to add special-use technical and scientific terms to the database.

The system provides a method to build glossaries of organizations and geographic place names.

The system provides a method to play games.

The system provides a list of measure words, unavailable in dictionaries or grammars, to be inserted between nouns and their numeral modifiers to insure proper grammar use.

The system provides, as no other system has succeeded in doing, a way to flag two or more identical Chinese characters that have different definitions or are spoken with different sounds (as occurs in about 15 percent of all Chinese characters).

The system adds to its speed by the simultaneous input of symbols to allow non-linear queries of the database.

A translation bin is provided to couple together compound characters, the meaning of which when joined differs from the meaning of the individual component parts.

The unknown character to be acted upon may be composed of a complicated character phrase that is identified simply by applying symbol criteria to only the first character and stroke criteria to the entire phrase.

The system can be developed in any computer language for any software program and used on any electronic device (e.g., transportable hand-held computerized devises, personal computers, telecommunication devises, etc.) to be available to anyone, anywhere, and at any time.

Thus the scope of the embodiment should be determined by the appended claims and their legal equivalents, rather than by the examples given.

I claim:

1. A method to output from an electronic device a Chinese or other Oriental character text, Pinyin spelling and translation into English or another language, brought by a user using said electronic device and entering one or more of a selection of symbols, a stroke number, and a stroke range number, comprising:

provide said electronic device with a graphical user interface showing a plurality of modes, a place to input a mode selection, a plurality of symbols, a place to input a symbol selection, a place to input character stroke count, and a place to input stroke range count;

selecting a mode from said plurality of modes on said graphical user interface;

entering said selected mode in said place to input a mode selection;

selecting, from said plurality of symbols, one or more symbol that is found in an unknown character brought by said user using said electronic device;

entering said selected one or more symbol in said place to input a symbol selection;

counting strokes of said unknown character;

entering a stroke count of said unknown character in said place to input character stroke count;

selecting and entering a stroke range count in said place to input a stroke range count;

processing, by said electronic device, said unknown character based on said stroke count and said stroke range count to provide as output a plurality of candidate character texts;

selecting a character text from said plurality of candidate character texts for said unknown character brought by the user using said electronic device;

receiving for the selected character text an output of an enlarged character text, Pinyin word, stroke number, tone, and translation.

2. The method of claim 1 wherein one or more characters or a character phrase is brought by a user using said electronic device and is acted upon using a chosen mode.

3. The method of claim 1 wherein said output is retained in a translation bin to be matched subsequently with an output from a second character, and providing output for character number one, character number two, and/or for both characters together.

4. The method of claim 1 wherein said output includes identical character texts that are flagged as having different Pinyin spellings, different tones, and/or different translations.

5. The method of claim 1 wherein said character is brought by a user using said electronic device and output is translated into English or another World language.

6. The method of claim 1 wherein said character written in the traditional Chinese writing method is brought by a user using said electronic device and is acted upon using a chosen mode.

7. The method of claim 1 wherein said character with a distinctive symbol on its side, top, or bottom is brought by a user using said electronic device and is acted upon using a side, top, or bottom mode.

8. The method of claim 1 wherein said character with a pair or three-of-a-kind of the same symbol is brought by a user using said electronic device and is acted upon using a pair or a triple symbol mode.

9. The method of claim 1 wherein a compound character, composed of two identical characters, is brought by a user using said electronic device and is acted upon using a twin character mode.

10. The method of claim 1 wherein said character brought by a user using said electronic device is acted upon using a write-in mode.

11. The method of claim 1 wherein said character brought by a user using said electronic device is acted upon, sequentially, by a plurality of modes.

12. The method of claim 1 wherein a symbol name is entered into a browser mode of said electronic device with an output of a suite of character texts, Pinyin spellings, and translations associated with a specific symbol.

13. The method of claim 1 wherein a Pinyin word is entered into a browser mode of said electronic device to yield an output of a suite of different character texts, different tones, and translations for the same Pinyin spelling.

14. The method of claim 1 wherein a Pinyin word is entered into a browser mode of said electronic device to yield an output of a suite of character texts, tones, and translations for words that includes the same Pinyin spelling.

15. The method of claim 1 wherein an English word is entered into a browser mode of said electronic device to yield an output of a suite of different translations.

16. The method claim 1 wherein an English word is entered into a browser mode of said electronic device to yield an output of a suite of different character texts with different Pinyin spellings, tones, and/or translations associated with extended meanings of an English word.

17. The method of claim 1 wherein a user using said electronic device inputs a measure word mode to output all measure words, their character texts, Pinyin words and translations.

18. The method of claim 1 wherein a user using said electronic device inputs a frequently-used noun with output of the noun's specific measure word.

19. The method of claim 1 wherein a user using said electronic device inputs, through a user-generated mode, a Pinyin word for later retrieval.

20. The method of claim 1 wherein a user using said electronic device retrieves a user-generated word through a standard or a browser mode.

21. The method of claim 1 wherein a user using said electronic device devises and constructs word games, stories, and board games using a game mode.

22. The method of claim 1 wherein a user using said electronic device in a dictionary mode receives output of character text, Pinyin word, and translation of English to Pinyin or Pinyin to English.

23. A computer program stored in a non-transitory computer readable system to execute and perform the method of claim 1.

* * * * *